US006192325B1

(12) United States Patent
Piety et al.

(10) Patent No.: US 6,192,325 B1
(45) Date of Patent: Feb. 20, 2001

(54) METHOD AND APPARATUS FOR ESTABLISHING A PREDICTIVE MAINTENANCE DATABASE

(75) Inventors: Kenneth R. Piety; Christopher G. Hilemon; Todd W. Reeves; Miodrag Glumac, all of Knoxville; Michael D. Rich, Powell, all of TN (US)

(73) Assignee: CSI Technology, Inc., Wilmington, DE (US)

( * ) Notice: Under 35 U.S.C. 154(b), the term of this patent shall be extended for 0 days.

(21) Appl. No.: 09/153,690

(22) Filed: Sep. 15, 1998

(51) Int. Cl.[7] .................................................. G06F 15/00
(52) U.S. Cl. .......................... 702/184; 702/183; 702/185; 714/5; 714/40
(58) Field of Search .................................. 702/182–186, 702/56; 714/5, 40; 700/276

(56) References Cited

U.S. PATENT DOCUMENTS

| | | | |
|---|---|---|---|
| 4,612,620 | * 9/1986 | Davis et al. | 702/184 |
| 4,885,707 | * 12/1989 | Nichol et al. | 702/56 |
| 5,404,506 | 4/1995 | Fujisawa et al. | 395/600 |
| 5,566,092 | * 10/1996 | Wang et al. | 702/185 |
| 5,596,507 | * 1/1997 | Jones et al. | 702/276 |
| 5,602,761 | * 2/1997 | Spoerre et al. | 702/183 |
| 5,633,811 | 5/1997 | Canada et al. | 364/576 |
| 5,663,894 | 9/1997 | Seth et al. | 364/508 |
| 5,680,025 | 10/1997 | Bowers, III et al. | 318/806 |

(List continued on next page.)

OTHER PUBLICATIONS

General Parameter Neural Networks With Fuzzy Self–Organization by Daouren Akhmetov and Yasuhiko Dote; Proceedings of the Artificial Neural Networks in Engineering (ANNIE 1996) Conference, vol. 6, Nov. 10–13, 1996, pp. 191–196.

Human Performance In Fault Diagnosis: Can Expert Systems Help? by Gitte Lindgaard; Interacting with Computers; vol. 7 No. 3, Sep. 1995—Elsevier Science Ltd. B.V; pp. 254–272.

An Architecture For The Development Of Real–Time Fault Diagnosis Systems Using Model–Based Reasoning by Gardiner A. Hall, James Schuetzle, David LaVallee and Uday Gupta; Telematics and Informatics; vol. 9 Nos. 3/4, pp. 163–172, Summer/Fall 1992 Pergamon Press Ltd.

(List continued on next page.)

*Primary Examiner*—Marc S. Hoff
*Assistant Examiner*—Bryan Bui
(74) *Attorney, Agent, or Firm*—Luedeka, Neely & Graham, P.C.

(57) ABSTRACT

The invention provides a computerized method and apparatus which enables a user, even one who has little or no predictive maintenance skills, to establish a predictive maintenance database that defines information needed to monitor equipment in accordance with a predictive maintenance plan. The type of equipment components to be monitored and associated physical characteristics of the components are input to a computer as an equipment configuration, which may include one or more interconnected components. The computer includes a knowledge base that defines relationships between monitoring practices, component types, and physical characteristic information for component types. A predictive maintenance database is constructed for the components using the inference engine operating on the knowledge base, the selected component type, and the selected physical characteristic information. Multiple measurement technologies may be specified for each component. Preferably, for each measurement technology specified, the predictive maintenance database includes measurement points, an analysis parameter set, and an alarm limit set. Equipment configurations may be defined by the user, or they may be stored in a configuration/component warehouse with little or no configuration definition required of the user.

51 Claims, 54 Drawing Sheets

U.S. PATENT DOCUMENTS

| | | | |
|---|---|---|---|
| 5,696,885 | 12/1997 | Hekmatpour | 395/54 |
| 5,710,723 | 1/1998 | Hoth et al. | 364/551.01 |
| 5,734,893 | 3/1998 | Li et al. | 395/615 |
| 5,852,793 | * 12/1998 | Board et al. | 702/183 |
| 5,963,884 | * 10/1999 | Billington et al. | 702/56 |

OTHER PUBLICATIONS

Fault Diagnosis Using Quantitative and Qualitative Knowledge Integration by Hassen Benkhedda and Ron J. Patton; IEE Conference Publication, No. 427/2, 1996, pp. 849–854.

A Hybrid Implicit/Explicit Automated Reasoning Approach For Condition–Based Maintenance by Amulya K. Garga, Ph.D.; ASNE Intelligent Ships Symposium II, Philadelphia, Nov. 25–26, 1996.

Automated Fault Diagnosis Using A Discrete Event Systems Framework by Sanjiv Bavishi and Edwin K. P. Chong; IEEE International Symposium On Intelligent Control &endash; Proceedings, Aug. 16–18, 1994, pp. 213–218.

Knowledge Based Diagnosis: Dealing With Fault Modes And Temporal Constraints by G. Acosta; IECON Proceedings (Industrial Electronics Conference) vol. 2, 1994, pp. 1419–1424.

On–Line Fault Detection And Diagnosis Obtained By Implementing Neural Algorithms On A Digital Signal Processor by Andrea Bernieri, Giovanni Betta, and Consolatina Liguori; IEEE Transactions on Instrumentation and Measurement, vol. 45, No. 5, Oct. 1996, pp. 894–898.

A Combined Fuzzy–Logic & Physics–Of–Failure Approach To Reliability Prediction by Marius Bazu, IEEE Transactions on Reliability, vol. 44, No. 2, Jun. 1995, p. 237.

Object–Oriented Expert Systems For Fault Diagnosis by liung Chang; Proceedings of the IEEE Conference on Systems,Man, and Cybernetics, vol. 5, 1993, pp. 102–107.

A New Approach To Estimation Of Signal Components For Fault Detection by P. K. Dash and S. Rauta; Journal Of Institution Electronics and Telecommunication Engineers, vol. 42, No. 1, Jan.–Feb. 1996, pp. 21–26.

* cited by examiner

Fig. 17

| Periodic Vib. Meas. Pnt. [001] Parameters - DE05 |
| --- |

| Point Information Sensor/Signal Info |
| --- |

Probe Type : [Casing ▲]
Sensor Orientation : [Vertical ▶]
Sensor Position : [Outboard ▶]
Provide Sensor Power ? : [☑]
Sensor Sensitivity (V/EU) : [0.1]
DC Offset in Volts : [0.0]
Signal Group Number : [0]
Signal Channel Number : [0]
Measurement is Set to Auto-Range
Plotting Full Scale Range : [0.0]
HFD Full Scale Range : [5.0]
Lowest Valid Signal Level : [0.001414]
Highest Valid Signal Level : [14.14]
Integration Mode Override : [Analog ▶]
Overall Mode Override : [Digital ▶]

*Fig. 36*

| Select PERIODIC AP Set - PK01 - PK01 | |
|---|---|
| Set | Description |
| 1 | AC MTR,ROLLING BRG (1600) |
| 2 | PEAKVUE (BRG, HP=2000) (1600) |
| 3 | ELEC CURRENT-ROTOR BAR COND (60) |
| 4 | FLUX COIL-2 POLE IND MTR (60) |
| 5 | HF FLX CL-2 POLE IND MTR |
| 6 | AC MTR,ROLLING BRG (800) |
| 7 | SHAFT CURRENT MEASURE (60) |
| 8 | SHAFT VOLTAGE MEASURE (60) |
| 9 | PEAKVUE (BRG, HP=1000) (800) |
| 10 | PUMP,ROLLING BRG (800) |
| 11 | GEAR SET,26-50 (800) |
| 12 | PEAKVUE (GEAR, HP=5000) (1600) |
| 13 | GEAR SET,51-100 (400) |
| 14 | PUMP,ROLLING BRG (400) |
| 15 | PEAKVUE (BRG, HP=500) (400) |

Fig. 37

| Periodic Analysis Parameter Set [001] - DE06 | | | |
|---|---|---|---|
| Spectrum Parameters | Signal Processing Parms | Waveform Parameters | |

Set Description: AC MTR,ROLLING BRG (1600)

Spectral Frequency Setup : Order ▲

Low Frequency Signal Conditioning Limit ( Hz ) : 2.0

Upper Freq ( Hz/ORDER) : 70.5

Lower Freq ( Hz/ORDER) : 0.0

Number of Lines : 1600 ▶

Number of Averages : 5

Spectral Averaging Mode : Normal Mode ▶

Window Type : Hanning ▲

Spectral Weighting : None ▲

Perform 1/3 Octave Analysis? ☐

Number of Analysis Parameters: 12

Fig. 38

| Analysis Parameter Set 1 - AC MTR,ROLLING BRG (1600) - DE06 | | | | |
|---|---|---|---|---|
| Description | Parameter Units Type | Type of Parameter | Lower Frequency | Upper Frequency |
| PEAK TO PEAK | DFLTU | P-P Wav | 0.0 | 0.0 |
| CREST FACTOR | DFLTU | Crest | 0.0 | 0.0 |
| SUBHARMONICS | DFLTU | ORD INT | 0.0 | 0.8 |
| 1xTS | DFLTU | ORD INT | 0.8 | 1.4 |
| 2xTS | DFLTU | ORD INT | 1.4 | 2.4 |
| 3-8xTS | DFLTU | ORD INT | 2.4 | 8.4 |
| 9-25xTS | DFLTU | ORD INT | 8.4 | 25.4 |
| 25-75xTS | DFLTU | ORD INT | 25.4 | 75.0 |
| 2xLINE FREQ | DFLTU | Hz INT | 115.0 | 125.0 |
| 1K-20kHz | DFLTU | Hz vHFD | 1000.0 | 20000.0 |
| ROTOR BAR PASS | DFLTU | ORD INT | 63.0 | 73.0 |
| STATOR SLOT | DFLTU | ORD INT | 49.0 | 59.0 |

Fig. 39

| Select PERIODICAL Set - PK01 - PK01 | |
|---|---|
| Set | Description |
| 1 | AC MTR,ROLLING BRG (MODERATE) |
| 2 | PEAKVUE (MODERATE) |
| 3 | SKIN TEMP/CLASS A INS/TEFC |
| 4 | ROLLER ELEMENT BEARING TEMP |
| 5 | COUPLING TEMPERATURE |
| 6 | TERMINAL HOUSING TEMP |
| 7 | SHAFT CURRENT ALARMS |
| 8 | SHAFT VOLTAGE ALARMS |
| 9 | OBSERVED FACTORS-MOTOR COND |
| 10 | PUMP,ROLLING BRG (MODERATE) |
| 11 | GEAR SET,26-50 (MODERATE) |
| 13 | GEAR SET,51-100 (MODERATE) |

| Periodic Alarm Limit Set [001] - DE08 | | | | | | |
|---|---|---|---|---|---|---|
| Set Description : AC MTR,ROLLING BRG (MODERATE) | | | | | | |
| Maximum Deviations ("Bs") : 3.0 | | | | | | |
| | UNITS CODE | ALARM TYPE | FAULT "D" | ALERT "C" | WEAK SIDE "Lo/Hi" | BASELINE RATIO "Br" |
| OVERALL | VELOC ▶ | DU-A ▶ | 0.5 | 0.4 | 0.0 | 2.0 |
| PARAMETER 1 | ACCEL ▶ | DU-A ▶ | 4.0 | 2.0 | 0.0 | 2.0 |
| PARAMETER 2 | ACCEL ▶ | DU-A ▶ | 6.0 | 4.0 | 0.0 | 2.0 |
| PARAMETER 3 | VELOC ▶ | DU-A ▶ | 0.2 | 0.1 | 0.0 | 2.0 |
| PARAMETER 4 | VELOC ▶ | DU-A ▶ | 0.4 | 0.35 | 0.0 | 2.0 |
| PARAMETER 5 | VELOC ▶ | DU-A ▶ | 0.3 | 0.25 | 0.0 | 2.0 |
| PARAMETER 6 | VELOC ▶ | DU-A ▶ | 0.25 | 0.2 | 0.0 | 2.0 |
| PARAMETER 7 | VELOC ▶ | DU-A ▶ | 0.2 | 0.15 | 0.0 | 2.0 |
| PARAMETER 8 | VELOC ▶ | DU-A ▶ | 0.15 | 0.1 | 0.0 | 2.0 |
| PARAMETER 9 | VELOC ▶ | DU-A ▶ | 0.4 | 0.3 | 0.0 | 2.0 |
| PARAMETER 10 | ACCEL ▶ | DU-A ▶ | 2.0 | 1.0 | 0.0 | 2.0 |
| PARAMETER 11 | VELOC ▶ | DU-A ▶ | 0.4 | 0.25 | 0.0 | 2.0 |
| PARAMETER 12 | VELOC ▶ | DU-A ▶ | 0.4 | 0.25 | 0.0 | 2.0 |

| USER PID CODE | SI PID CODE | CSI DESCRIPTION | OPERATIONAL SIGNIFICANCE | | | | | SLEEVE BRG | ROLLER BRG | PROBE TYPE | 2120 |
|---|---|---|---|---|---|---|---|---|---|---|---|
| | | | 1 | 2 | 3 | 4 | 5 | | | | |
| | *1V | * OUTBOARD VERTICAL | ✓ | ✓ | ✓ | ✓ | ✓ | | | CASING | |
| | *1H | * OUTBOARD HORIZONTAL | ✓ | ✓ | ✓ | ✓ | | | | CASING | |
| | *1P | * OUTBOARD HORIZONTAL PEAKVUE | ✓ | ✓ | | | | | | CASING | |
| | *1A | * OUTBOARD AXIAL | ✓ | ✓ | ✓ | ✓ | | X | | CASING | |
| | *2V | * INBOARD VERTICAL | ✓ | ✓ | ✓ | ✓ | | | | CASING | |
| | *2H | * INBOARD HORIZONTAL | ✓ | ✓ | ✓ | ✓ | ✓ | | | CASING | |
| | *2P | * INBOARD HORIZONTAL PEAKVUE | ✓ | ✓ | | | | X | | CASING | |
| | *2A | * INBOARD AXIAL | ✓ | ✓ | | | | | | CASING | |

Fig. 53

METHOD AND APPARATUS FOR ESTABLISHING A PREDICTIVE MAINTENANCE DATABASE

TECHNICAL FIELD

The present invention relates generally to predictive maintenance of machines. More particularly, it relates to establishing and executing predictive maintenance programs for machines.

BACKGROUND

A highly specialized art, commonly referred to as "predictive maintenance", has evolved in an effort to predict when a machine will fail or requires maintenance so that corrective measures can be taken on an "as needed" basis. In a typical predictive maintenance program, periodic inspections of the machinery are made in order to assess the current operating condition of the machine. Data collected during the periodic inspections is typically stored and trended over time as an additional measure of the machine's operational health. The periodic inspections often involve multiple technologies including oil sampling and analysis, infrared thermography analysis, and vibrational analysis. For example, vibrational analysis is usually accomplished with the aid of a portable instrument which senses and processes vibration generated by the machine. These portable instruments, which are often referred to as data collectors or data analyzers, typically include a vibration transducer attached to what is essentially a highly specialized hand-held computer. The maintenance technician places the vibration transducer against a predefined test point of the machine. In a typical application, the resultant machine vibration signal produced by the transducer is provided to the data collector where the data is processed (and perhaps analyzed) according to predefined conditions and stored for later downloading to a machine database which has been previously set up on a host computer. The host computer analyzes the vibration data for faults or other anomalous conditions and machine data is stored in the database.

Machines within a facility are typically monitored according to a route which is generated by a maintenance technician and programmed into the data collector with the aid of the host computer. The route typically includes a list of machines, measurement test points, and setup conditions for each test point. There are usually many machines in the route with many test points on each machine, and for each test point there may be specified a vibration frequency range to be analyzed, a type of analysis to be performed, a particular type or set of data to be measured and stored, and similar other data collection and analysis parameters. In response to commands from the user, the hand held instrument prompts the user for the identity of the machine and the test point to be monitored, and it automatically sets up the instrument, for example, to accept the specified frequency range for the test point, perform the specified analysis and store the specified type or set of data. A Fast Fourier Transform analysis may be performed on a pre-selected frequency range of the data and all or part of the resulting frequency spectrum may be stored and displayed. As the user progresses through the many machines and the corresponding test points, he collects and stores measured data which is subsequently transferred to the host computer for long term storage and further analysis.

In a typical predictive maintenance program as described above, the user or maintenance technician defines each test point for each machine, including the location for each test point, analysis parameters sets including the type and quantity of data to take for each test point, the type of analysis to be performed on the data, frequency ranges, alarm levels, and the like. The locations of the test points and the parameters or settings chosen for each test point vary depending on the type, size and combinations of machines. For example, a motor driving a fan may have different test points and settings than the same motor driving a pump. Defining a predictive maintenance program of this type for such a large number of different machines requires a great deal of expertise on the part of the maintenance technician. Such expertise is typically gained only through years of experience and/or extensive training including training on how to select a probe/sensor, which parameters to measure for a particular machine, locations corresponding to the most data rich points for measuring particular parameters, frequency ranges, analysis alarm limits, and other such information. The maintenance technician must define the measurements points, analysis parameter sets, and alarm limit sets, and he must integrate these items into a useable database setup. Further complicating the maintenance technician's task is the fact that knowledge and expertise gained through the experience of engineers and technicians is too often not shared among users and others skilled in the art. More common is the situation where expertise is lost as a result of job changes and the like. Even when expertise is documented in user's manuals or lab notebooks, a great deal of studying and understanding is required in order for the information to be put to proper use.

The difficulty and complexity of providing the settings for each measurement point may be more fully appreciated by considering the settings disclosed for measurement point examples in the following detailed description. While a relatively small number of examples are discussed herein, it will be understood that a typical predictive maintenance database will have hundreds of measurement points with each measurement point typically having multiple settings. In predictive maintenance databases involving vibration, each measurement point will typically have many settings, often 50 or more.

Clearly, the proficiency and skill required to define an acceptable predictive maintenance program for a machine is beyond the abilities of a layperson. Because of the complexity involved and the expertise needed to properly set up an adequate predictive maintenance program or model, data technicians have been known to simply use the default settings provided by vendors of data collection/analysis instruments.

SUMMARY

What is needed, therefore, is a simplified method and apparatus for creating a predictive maintenance database. The solution should include the integration of machine database setup with the use of multiple measurement technologies, and it should be capable of pooling the scattered expertise of predictive maintenance modelers and significantly reducing the level of skill and expertise needed to establish an adequate predictive maintenance program.

With regard to the foregoing and other objects, the invention in one aspect provides a method for establishing a predictive maintenance database that defines information needed to monitor components in accordance with a predictive maintenance plan. In the method, a component type corresponding to a particular component to be monitored is identified, and physical characteristic information is also identified which corresponds to the identified component type and the particular component to be monitored. A knowledge base in the computer defines relationships between monitoring practices, component types and physical characteristic information for component types, and an inference engine operates in part on the knowledge base to construct predictive maintenance databases. Information for a predictive maintenance database is constructed for each component to be monitored using the inference engine operating on the knowledge base, the selected component type and the selected physical characteristic information.

In accordance with the above method, the database information for the predictive maintenance database may be constructed in a number of ways based on a number of factors. For example, the database information may be constructed in part to correspond to a defined type of data to be measured for the identified component type and/or defined measurement points on the component from which data will be measured. An analysis parameter set may also be defined by the constructing step, including setup parameters for use by a data collection instrument to collect data in accordance with the predictive maintenance database. Additionally, an alarm limit set may be defined by the constructing step including alarm limits delineating normal and abnormal component operation for data measured in accordance with the database. Further, constructing the database information may include recommending a plurality of measurement points for measuring operating characteristics of the component in accordance with the predictive maintenance plan.

Additional steps in the method may include specifying a recommended type of component operating characteristic to be measured at each of the plurality of measurement points, and specifying a recommended alarm limit delineating normal and abnormal operation for a recommended type of component operating characteristic to be measured at a particular one of the plurality of measurement points. An image of the component being monitored may be displayed with locations being designated on the component image corresponding to one or more of the plurality of measurement points. An operational significance of the selected component type may be specified. The selected component type and the selected physical characteristics may be stored and later used for establishing further predictive maintenance databases. When collecting data in accordance with the predictive maintenance program, a user is prompted to place an appropriate measurement device at a measurement point to measure a component operating characteristic.

The present invention also provides a programmable apparatus for establishing a predictive maintenance database defining information needed to monitor components in accordance with a predictive maintenance plan. In the apparatus, a knowledge base defines relationships between monitoring practices, component types and physical characteristic information for component types. A data processor is connected to the memory and includes an inference engine for operating in part on the knowledge base to construct database information for a predictive maintenance database. Based on user input provided through a user interface, the data processor is programmed to identify a component type corresponding to a particular component to be monitored, identify physical characteristic information corresponding to the identified component type and the particular component to be monitored, and construct information for a predictive maintenance database for each component to be monitored using the inference engine operating on the knowledge base, the identified component type and the identified physical characteristic information.

In accordance with another aspect of the preferred method, a plurality of component groups are displayed, and a user is prompted to select at least one of the component groups. User input identifies a selected component group corresponding to a particular component to be monitored. A plurality of component types is displayed corresponding to the selected group, and the user is prompted to select at least one of the component types. A user input is received identifying a selected component type corresponding to the particular component to be monitored. Physical characteristic types are displayed corresponding to the selected component type, and the user is prompted to provide physical characteristic information corresponding to the physical characteristic types to further define a component to be monitored. Physical characteristic information provided by the user is accepted. A knowledge base is provided in the computer and defines relationships between monitoring practices and component types and physical characteristic information for component types. An inference engine is also provided in the computer for constructing database information for predictive maintenance databases based in part on the knowledge base. The knowledge base is used to select measurement specifications based on the selected component type and the physical characteristic information provided by the user. The database information is constructed using the inference engine operating on the knowledge base, the selected component type, the selected physical characteristic information, and the user defined measurement specifications.

The present invention also provides a method for associating a machine component with physical information in a computer to define a component configuration for use in establishing a predictive maintenance database for the component configuration. This method involves identifying a component type corresponding to a particular component to be monitored where the particular component to be monitored has a plurality of physical component parameters. Information is specified which corresponds to one or more of the plurality of physical component parameters. For example, the specified information may include the operating speed of the particular component to be monitored. A component configuration is produced from the identified component type and the specified information.

The method may further include the steps of associating with the component type at least one of a plurality of measurement technologies. Database information for predictive maintenance database is then constructed based on the identified component type, the specified information, and said one or more selected measurement technologies.

Another method according to the present invention involves graphically associating a plurality of machine components in a computer to define an equipment configuration for use in establishing a predictive maintenance database for the equipment configuration. In this method, a first component type is identified which corresponds to a first component to be monitored. A second component type is likewise identified which corresponds to a second component to be monitored. For each of the first and second component types, component information is specified which corresponds to physical characteristics of the component. Component configurations are produced for each of the first and second components based on the specified component types and component information. A physical coupling between the two components is defined, and an equipment configuration is produced from the two equipment configurations and the physical coupling.

In accordance with a further aspect of the invention, there is provided a method for establishing a predictive maintenance database in a computer that defines information needed to monitor components in accordance with a predictive maintenance plan. The method includes identifying a component type corresponding to a particular component to be monitored. A master file of information is provided in the computer which includes at least component identification information and corresponding predictive maintenance database information that specifies the types of measurements needed by the predictive maintenance plan for each component in the master file. The master file is searched for component identification information corresponding to the identified component type to produce at least one set of component identification information, and a set of component identification information is selected from the at least one set of component identification information. Finally, database information is constructed for a predictive maintenance database for the component to be monitored using the set of selected component identification information and the predictive database information corresponding to the set of selected component identification information.

The master file of information may include component identification information in the form of the name of component manufacturers, component model numbers, or both. The component identification information may also physical criteria corresponding to physical characteristics of components.

Predictive maintenance database information may include measurement point locations identifying points on components where predictive maintenance data is to be measured in accordance with the predictive maintenance plan. Types of measurement analyses to be performed in accordance with the predictive maintenance plan may also be included as predictive maintenance database information.

Searching of the master file for component identification information may be accomplished by searching based on manufacturer name and model number. The master file may also be searched based on physical criteria of the component.

BRIEF DESCRIPTION OF THE DRAWINGS

The above and other features, aspects and advantages of the present invention will now be discussed in the following detailed description and appended claims considered in conjunction with the accompanying drawings in which:

FIG. 17 is a user interface screen from which known bearings can be looked up and imported into the component definition;

FIG. 36 is a user interface screen of the database viewing program showing additional detailed measurement point information;

FIG. 37 is a user interface screen of the database viewing program showing a list of analysis parameters created by the main program;

FIG. 38 is a user interface screen of the database viewing program showing analysis parameter details for time waveform and frequency spectrum data collection;

FIG. 39 is a user interface screen of the database viewing program showing additional analysis parameter details for frequency ranges in which measurements are taken;

FIG. 40 is a user interface screen of the database viewing program showing a list of alarm limits which correspond to the analysis parameters of FIG. 37;

FIG. 41 is a user interface screen of the database viewing program showing amplitude limits defining multiple levels of alarming;

FIG. 49 is a user interface screen showing motor measurement points;

FIG. 53 is a table of candidate measurement points for an AC induction motor showing how operational significance relates to measurement point selection.

DETAILED DESCRIPTION OF A PREFERRED EMBODIMENT

Figure 1:
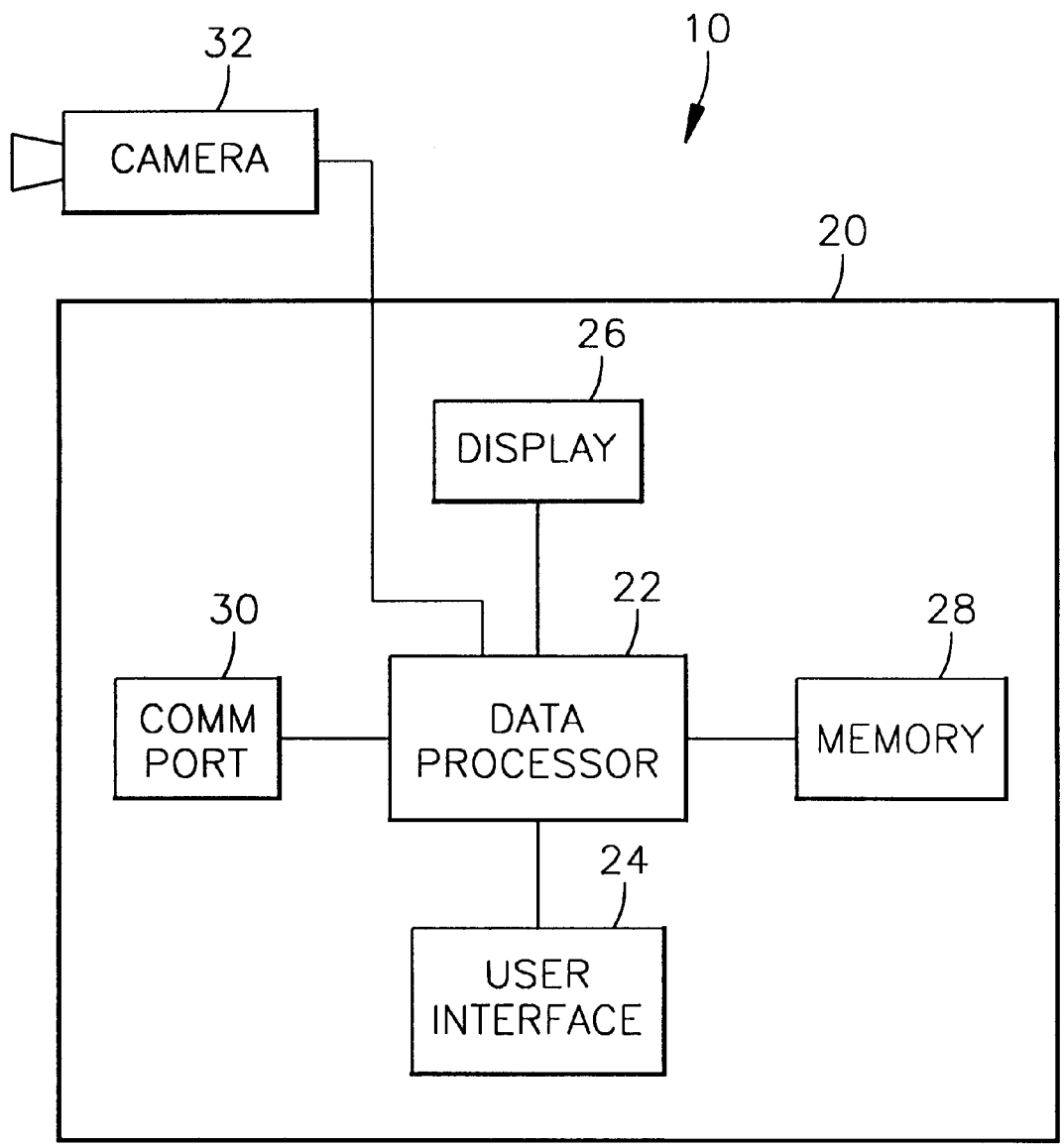
FIG. 1 is a functional block diagram of a programmable apparatus for use in establishing a predictive maintenance database in accordance with the present invention.

With reference now to the drawings in which like reference characters designate like or similar parts throughout the several views, FIG. 1 shows in block diagram form a programmable apparatus 10 for establishing a predictive maintenance database defining information needed to monitor equipment (such as electric motors, pumps, bearings, and the like) for anomalous or faulty operation in accordance with a predictive maintenance plan. The apparatus 10 includes a computer 20 having a data processor 22 and associated memory 28, a display 26, and a user interface 24 (such as a mouse and/or keyboard) for inputting user information and commands to the data processor 22. A communications port 30, such as a serial infrared data port, is provided to enable the computer 20 to communicate with a peripheral device. When images of monitored equipment are desired, a digital camera 32 may be provided for capturing digital images of equipment which are provided to the data processor 22 for processing and display on the display 26.

In a preferred embodiment, the data processor 22 is a Pentium™ processor running Windows™ 95 or Windows™ NT Workstation as the operating system. When programmed in accordance with the invention, the computer 20 provides a straightforward, user-friendly environment in which users, including inexperienced maintenance technicians, can quickly and efficiently create a predictive maintenance database or create an area or component that may be incorporated into an existing predictive maintenance database.

As an initial matter, defining a few terms commonly used herein should be helpful. By use of the term "area" herein, what is meant is a location within a site such as a building. A "site" is a grouping of areas. A site is usually equated with a plant. A "component" is an item to be monitored in accordance with appropriate predictive maintenance principles. Motors, engines, gearboxes, pumps, fans, and like items are examples of components. A "configuration" is a detailed definition of one component or of two or more interconnected components, such as a motor driving a pump. "Equipment" is rather broadly defined as including components, groups of components, and configurations. For rotating machinery, the term "equipment" may be used to refer to a machine train consisting of components connected via a coupling. "Operational Significance" is a general rating that indicates the relative criticality of proper operation of equipment to the activities of the site. Values for operational significance include "critical", "essential", "important", "secondary", and "non-essential".

Figure 2:
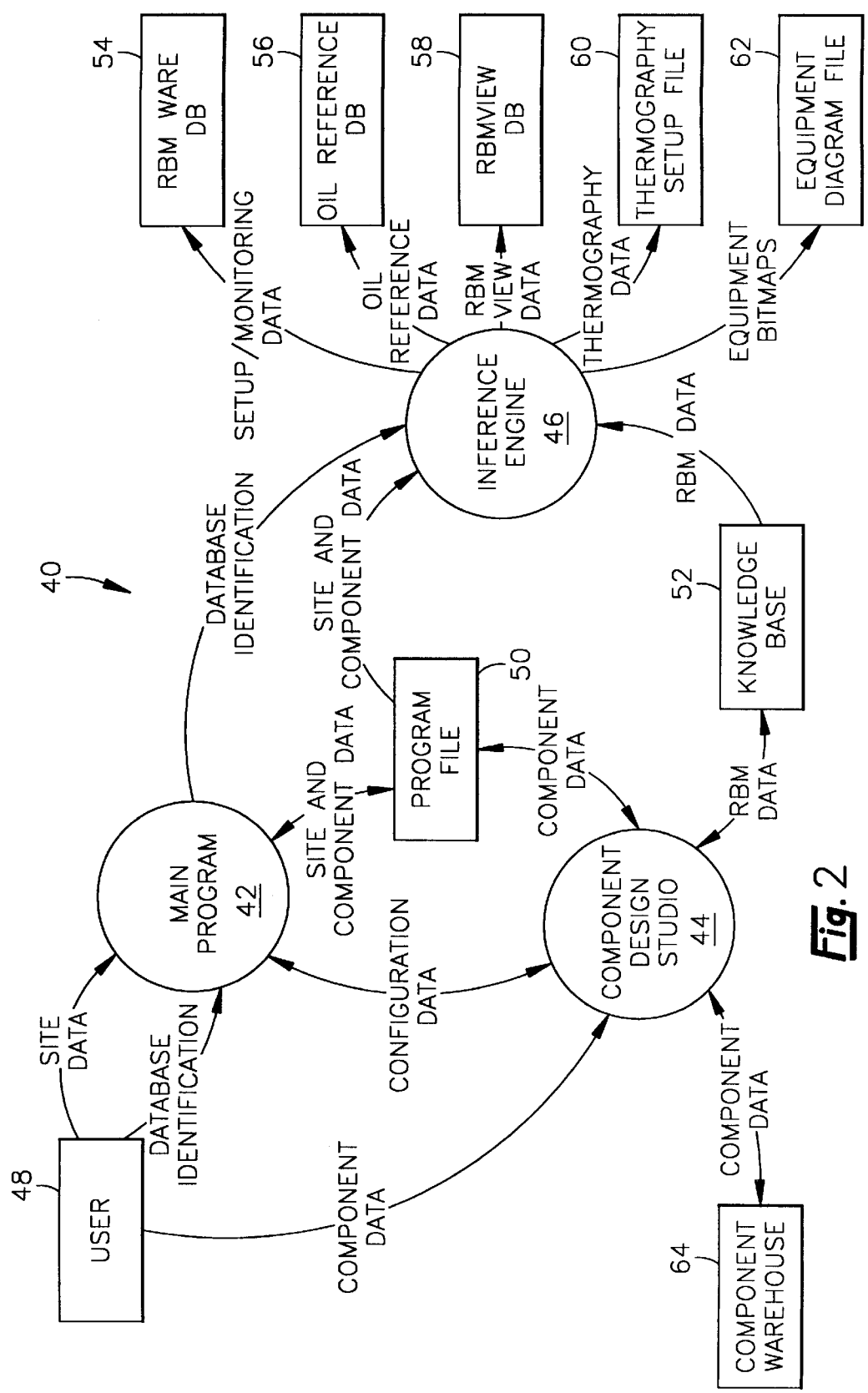
FIG. 2 is a flow diagram of a program for controlling operation of the apparatus of FIG. 1.

Operation of the computer 20 to establish a predictive maintenance database in accordance with a preferred embodiment of the invention is illustrated in the flow diagram of FIG. 2 (hereinafter referred to as the "program 40"). As will be seen, the program 40 combines user input with stored information to create new predictive maintenance database files, or to modify or edit an existing predictive maintenance database file, in a fraction of the time and effort previously required with conventional approaches.

The program includes three major subsystems—a main program 42, a component design studio 44, and an inference engine 46. The main program 42 accepts site information from the user 48 and assists the user 48 in describing the site information. It leads the user 48 through the creation of areas and equipment that match the topology of the site to be monitored. The user 48 may also provide information relative to the monitoring technologies to be applied and the monitoring hardware to be used as part of the predictive maintenance plan implemented by the predictive maintenance database.

The component design studio 44 is a drag-and-drop graphical user interface tool that enables the user 48 to define new equipment and edit existing equipment, including components and configurations, for predictive maintenance databases. It enables the user 48 to graphically associate machine components, such as a pump being driven by a motor. Component and configuration definitions can be stored and reused for further equipment definitions. The component design studio 44 also prompts the user 48 for information relating to physical characteristics of the equipment to be monitored. For example, if the equipment to be monitored is an electric motor, physical characteristic information would preferably include the spatial orientation of the motor (i.e., vertical or horizontal), number of poles, number of stator bars, rated running speed, and other information. The physical characteristics information may also be stored and reused for further equipment definitions.

In a preferred embodiment, the graphical user interface (GUI) is a standard Microsoft Windows™ Single Document Interface (SDI) application. The application includes a main window that may contain one or more data views. One of these views is a tree that shows the hierarchy of items created by the user. Other views, based on the currently selected tree item, show the properties of the selected item and provide access to other user interfaces which aid the user 48 in creating and modifying equipment definitions and databases.

Common configurations and component definitions may be stored in one or more component warehouse databases 64 which can be accessed by the component design studio 44, thus eliminating the need for the user 48 to create configuration and component definitions for equipment that has been previously defined and stored in a component warehouse database 64. For configurations, component identifiers and connectivity information are stored in the warehouse 64. For components, the physical characteristics are stored in the warehouse 64. In a preferred embodiment, two types of warehouses are available to the user 48. One type of warehouse is a read-only warehouse containing a large number of ready to use component and/or configuration definitions and is provided by the program supplier as an integral part of the program 40. A second type of warehouse is one that is created by the user 48 for storing configurations and components not included in the read-only warehouse.

The main program 42 and component design studio 44 produce a single program data file 50 that includes information entered by the user 48 including site information and equipment definition information. This information may be modified by the user 48 until the user 48 is satisfied with its completeness and accuracy. At that time, the user 48 may request that the program data file 50 be passed on to the inference engine 46.

The inference engine 46 performs the task of taking user input relating to the physical characteristics of components and combining it with predictive maintenance knowledge to determine the best monitoring setup for those components. In this regard, the inference engine 46 receives the program data file 50 and creates a predictive maintenance database file by operating on data contained in the program data file 50 in conjunction with data and information contained in a knowledge base 52. Information contained in the predictive maintenance database file may be viewed and edited by a database program 54, which in a preferred embodiment is an RBMware™ predictive maintenance database program available from Computational Systems, Inc. of Knoxville, Tenn. The inference engine 46 also enables the user to edit existing predictive maintenance database files 54.

The knowledge base 52 contains empirical knowledge and information gained through years of experience in monitoring equipment. The primary references which had the most significant impact on the contents of the knowledge base 52 include observations of "best practices" by engineers experienced in the art of predictive maintenance. The various teachings of numerous text books and industry periodicals also shaped the contents of the knowledge base 52, including that portion of the knowledge base 52 which generates analysis parameter sets and alarm limit sets. Accordingly, predictive maintenance databases created by the program 40 will far exceed the quality of databases created by a novice, and will likewise deliver the experienced user 48 quality databases which have been standardized across equipment types.

The information contained in the knowledge base 52 defines a relationship between physical characteristics of a component type and optimal monitoring practices as determined from experience. For example, information in the knowledge base 52 includes measurement points for placement of sensors, types of sensors to place at the measurement points, and setup criteria for the measurement instrument (such as number of frequency lines, frequency filtering of sensor signals, frequency bands of interest, alarm limits, and the like). The number and types of measurement points created depends on the component's type and operational significance. For equipment which includes bearings, there will typically be three vibration measurement points per bearing located in each of the three directions (horizontal, vertical, and axial). Information contained in the knowledge base 52 may be edited to reflect advances in predictive maintenance know-how.

Analysis parameter sets, defining the types and amounts of data to be measured, setup criteria, and the like, are partially predefined in the knowledge base. The analysis parameter sets are different for different types of components and are used to setup a data collection instrument to collect data in an optimal way. The predefined analysis parameter sets are applicable for most components of a given type (motors, turbines, pumps, fans, and the like) and are organized into families of similar components.

For each of the component types, a core group of sleeve and rolling element bearing analysis parameter sets exist. These analysis parameter sets are somewhat dependent on turning speed. The selection of a specific analysis parameter set is based on component type, measurement point RPM, bearing type, and similar information. The analysis parameter sets typically are unaffected by adjacent components and coupling information.

For rotating equipment, the number of lines of resolution for frequency analysis is variable based on the reference turning speed of the equipment. This enables the user 48 to have good frequency resolution over a wide range of operating speeds.

Alarm limit sets, defining criteria for generating fault alarms for parameters contained in the analysis parameter sets, are grouped by components similar to the analysis parameter sets. They are based on the type of equipment being monitored and the type of environment in which the equipment is operated. Each component type includes a family of alarm limit sets with each alarm limit family having a plurality of alarm grades, and some families may be accessed by multiple components. For example, in one embodiment, a family of alarm limit sets for AC induction motors is also used by AC synchronous motors. In addition, some alarm values are based on several factors such as driven component type, component RPM, and component weight and horsepower. Different levels of alarm severity are also assigned for some component types.

The selection of an alarm limit set is also effected by alarm criteria which may be input by the user. Alarm criteria is preferably based on the operating environment of the equipment. Values for alarm criteria include "smooth", "moderate", and "rough" where a "smooth" alarm criteria represents a low threshold for alarming and "rough" represents a high threshold for alarming.

The inference engine 46 provides the capability for integration of multiple measurement technologies including vibration monitoring technology, motor monitoring technology, oil monitoring technology 56 and thermography 60. In operation, the program 40 prompts the user 48 to specify a particular type of measurement technology to be applied. The user 48 provides information relative to the specified measurement technology, and the program 40 creates a predictive maintenance database file applying the measurement technology to a specified piece of equipment to be monitored. Multiple measurement technologies may be applied to each piece of equipment.

Data analysis for purposes of predictive maintenance is highly dependent on the quality of the collected data. Unfortunately, many new users 48 do not have the knowledge and experience needed to properly configure a predictive maintenance database to be able to perform beneficial analysis. The present invention provides a user interface to the program 40 which enables the user 48 to easily answer questions and to provide information used by the program 40 in constructing predictive maintenance database files. The program 40 is designed to "fail safe" in the sense that, no matter how much or how little information the user 48 knows about the equipment, the program 40 is able to create meaningful analysis parameter sets and alarm limit sets for quality data collection.

A computer 20 running a program 40 in accordance with the invention receives the user inputs and creates a predictive maintenance database complete with equipment definition information, measurement points, analysis parameter sets, alarm limit sets, and equipment configuration information needed for expert analysis systems to perform detailed analysis on data that is collected. The following Example 1 describes a typical process for creating a predictive maintenance database for a boiler feed pump located within a site. Typically, a separate predictive maintenance database file is created for each site and each piece of equipment to be monitored within the site is included in the database file. Example 2 describes how the program enables the user 48 to reuse previously configured components when adding new equipment configurations to the database or editing existing equipment configurations in the database. Example 3 provides a detailed explanation of how the inference engine 46 creates analysis parameter sets, alarm limit sets, and measurement points based on rules defined in the knowledge base 52 and/or the inference engine 46. As will be seen from the following examples, the program 40 enables the user 48 to successfully create a predictive maintenance database even if the user 48 knows very little about the equipment and needs to select the default answers provided by the program 40.

In considering the knowledge base 52 and the inference engine 46, it is important to understand that there is not a unique correct way to monitor equipment. There are many correct ways to monitor a particular piece of equipment or a particular configuration, and there are many incorrect ways to do so. Thus, the knowledge base 52 and the inference engine 46 may vary widely, so long as they operate together to specify one of the correct setups for monitoring the specified equipment. The examples discussed below illustrate a correct knowledge base 52 and inference engine 46, but the examples should not be construed as limiting the invention to any one knowledge base 52 or inference engine 46. In particular, rules for defining measurement points, analysis parameter sets, and alarm limit sets may exist in either or both of the knowledge base 52 and inference engine 46.

EXAMPLE 1

FIGS. 3–32 are images of user interface screens, or screen shots, of a typical "run" through the program 40 for creating a predictive maintenance database for a boiler feed pump. The screens are displayed to the user 48 at display 26 and generally prompt the user 48 for information which assists the program 40 in creating the database.

Figure 3:
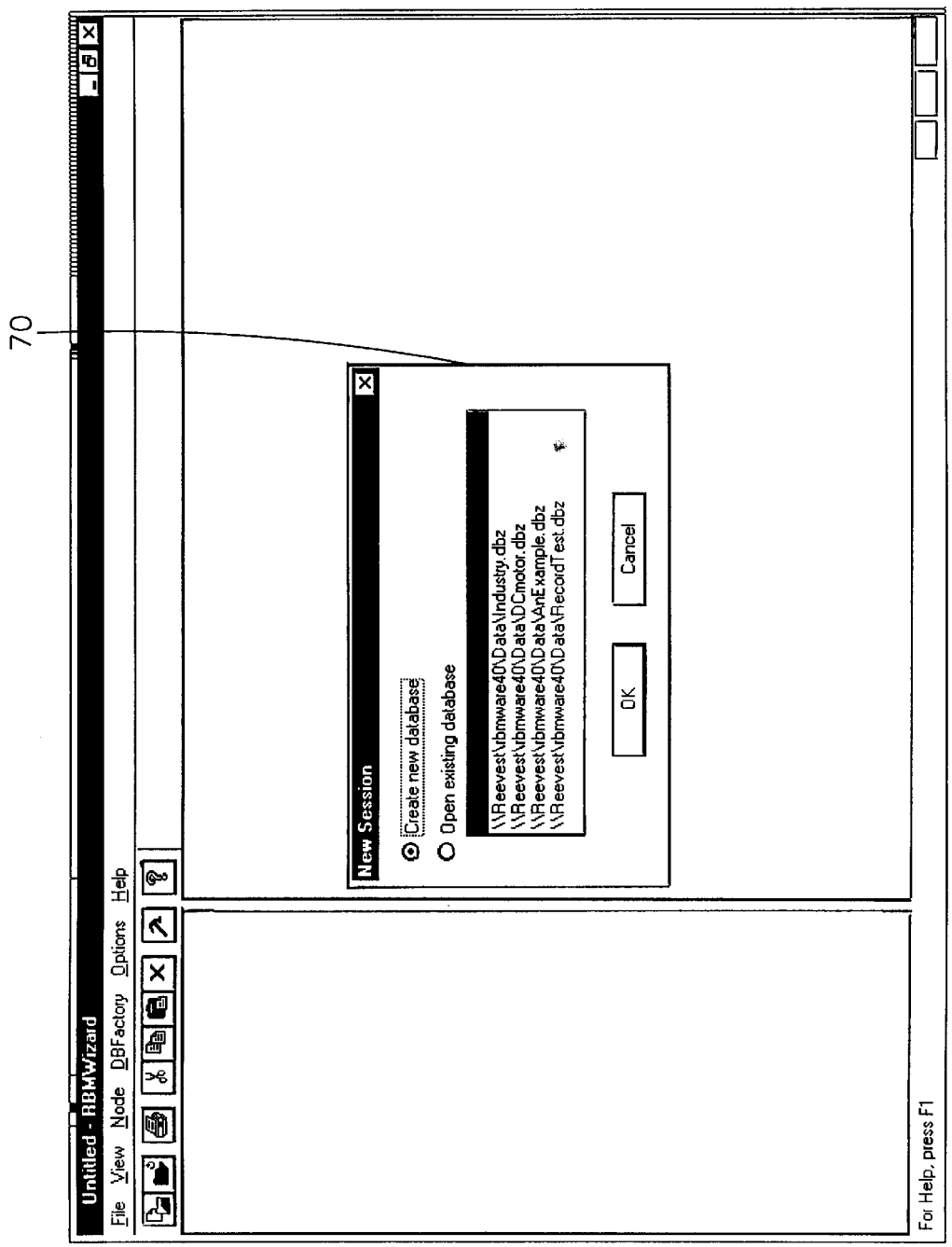
FIG. 3 is a user interface screen which enables the user to initiate creation of a new predictive maintenance database and to initiate modification of an existing predictive maintenance database in accordance with the present invention.

In FIG. 3, the user 48 is asked whether he wishes to create a new predictive maintenance database or open an existing database for editing. Existing database files which the user 48 may select are listed in window 70. In this example, the user 48 has opted to create a new database.

Figure 4:
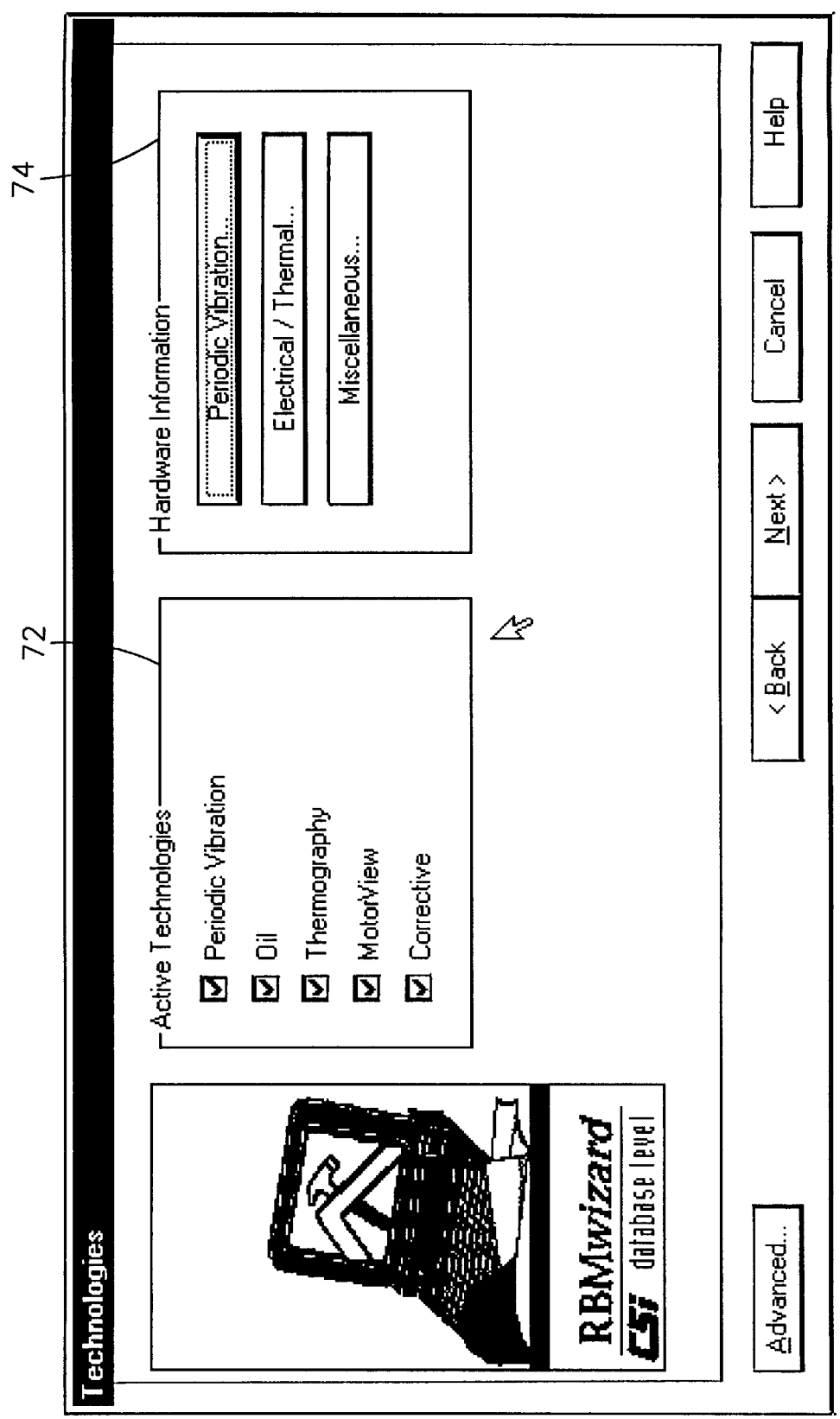
FIG. 4 is a user interface screen prompting the user to select predefined predictive maintenance technologies to be incorporated into the creation of a new predictive maintenance database.

To create the new database, the program 40 will need to know which measurement technologies should be applied and which types of measurement hardware should be used. FIG. 4 prompts the user 48 to provide this information. In window 72, the user 48 is asked to specify measurement technologies and in window 74 the user 48 is asked to specify measurement hardware information. In FIG. 4, the user 48 has selected all measurement technologies including periodic vibration, oil analysis, thermography, Motor-View™ (an electrical motor analysis program available from Computational Systems, Inc. of Knoxville, Tenn.), and corrective analysis (a group of monitoring technologies available from Computational Systems, Inc. under the trade name UltraManager™). In window 74, the user 48 has selected "periodic vibration". This selection takes the user 48 to another screen from which the user 48 selects specific periodic vibration hardware.

Figure 5:
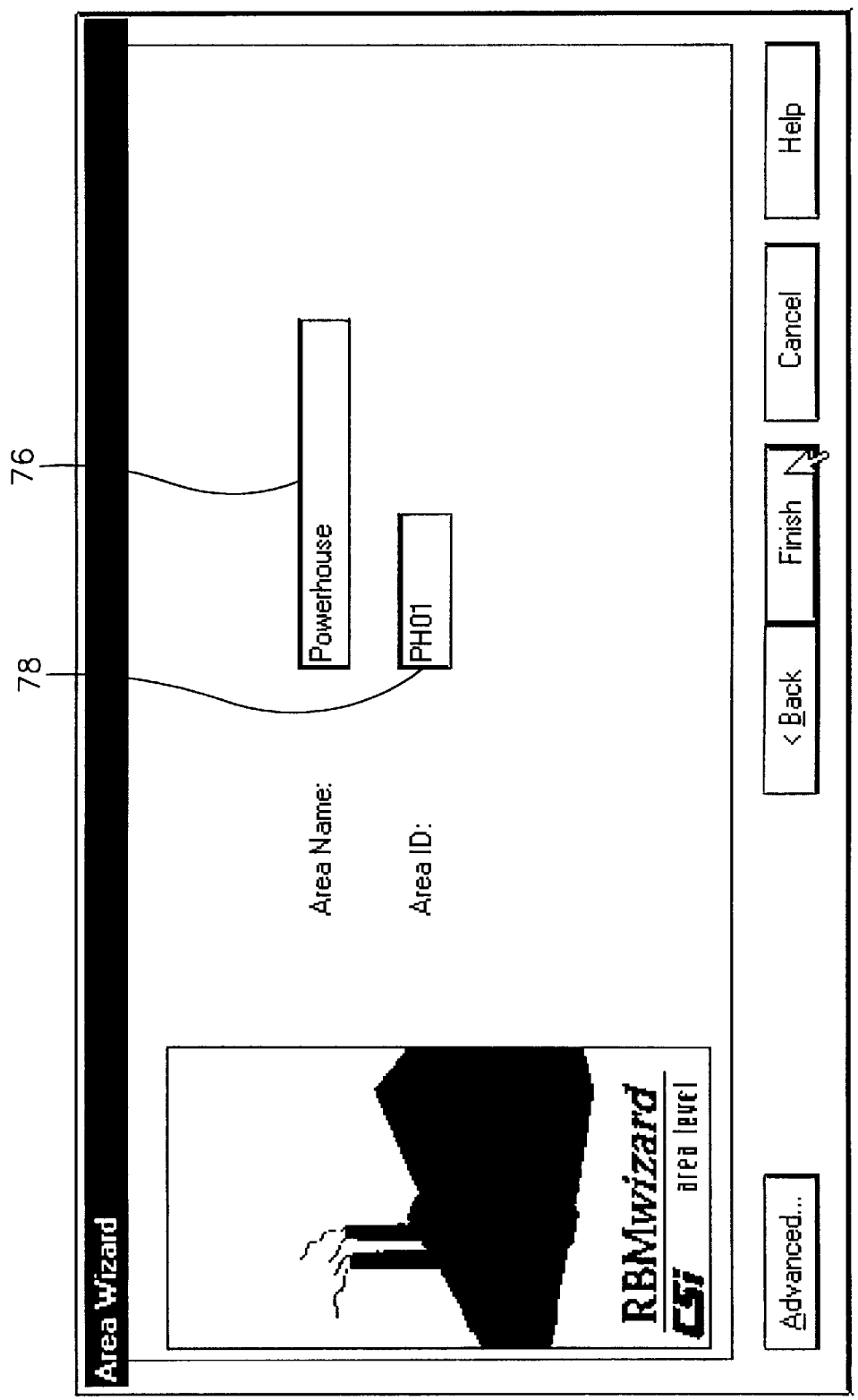
FIG. 5 is a user interface screen prompting the user to define information corresponding to the location of equipment to be monitored in accordance with the new predictive maintenance database being created.

The user 48 is next prompted in FIG. 5 to provide an area name 76 and an area identification 78. The area name 76 is typically a descriptive word name for the facility, such as "powerhouse", and the area identification 78 is typically a shortened term or group of characters that the user 48 can identify. Here, the user 48 has chosen the identification "PH01" to represent powerhouse #1.

Figure 6:
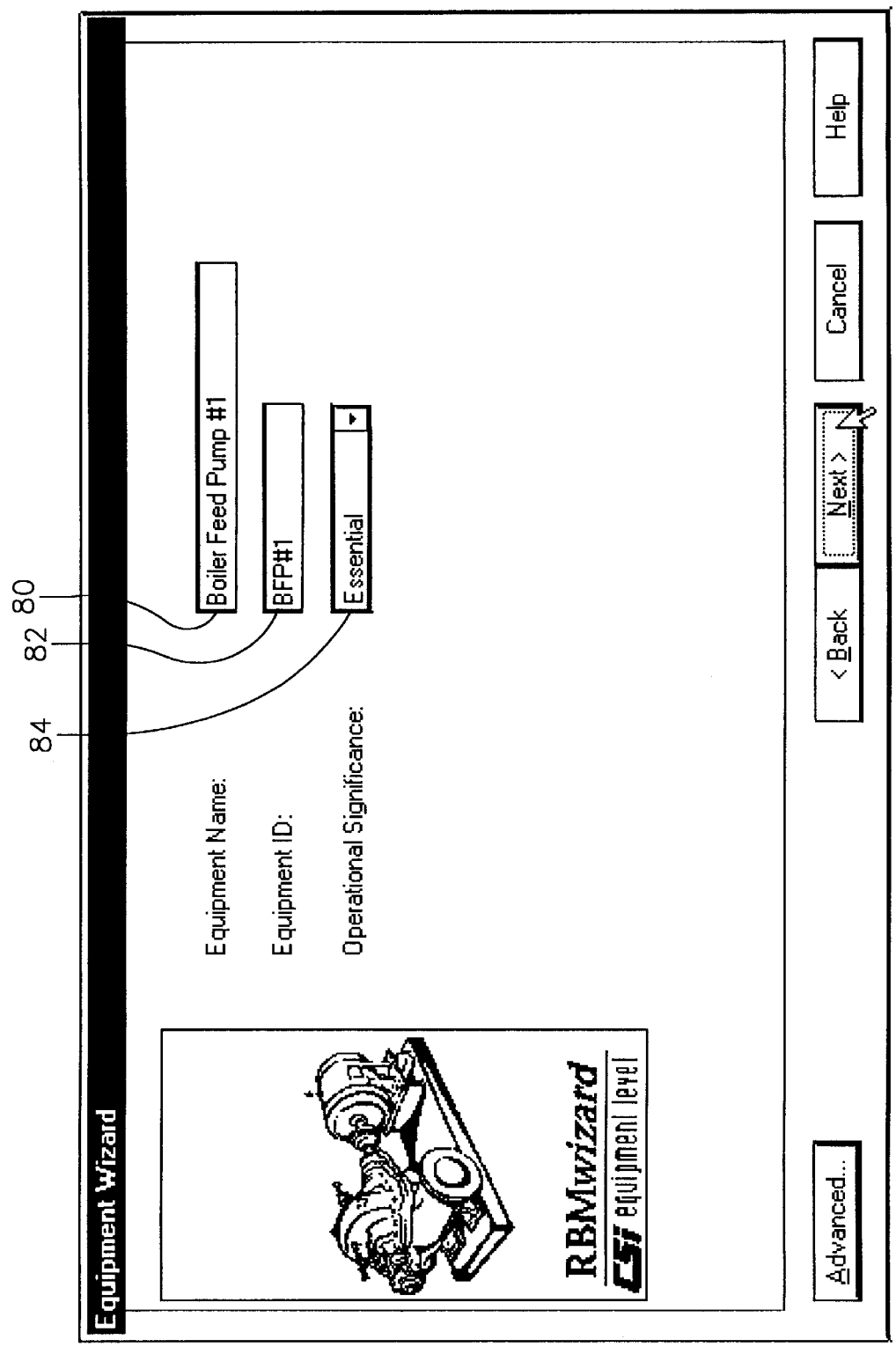
FIG. 6 is a user interface screen prompting the user to define information corresponding to the type of equipment to be monitored and the operational significance of the equipment.

In FIG. 6, the user 48 provides an equipment name 80, an equipment identification 82, and an operational significance 84. As described above, values for operational significance of equipment include "critical", "essential", "inportant", "secondary", and "non-essential". The program 40 adjusts the measurement technique based on this input value. For example, a boiler feed pump which is "essential" to the operation of the powerhouse would be monitored at shorter intervals than one which is "non-essential". In addition, more measurement points and types of measurement points would be created.

Figure 7:
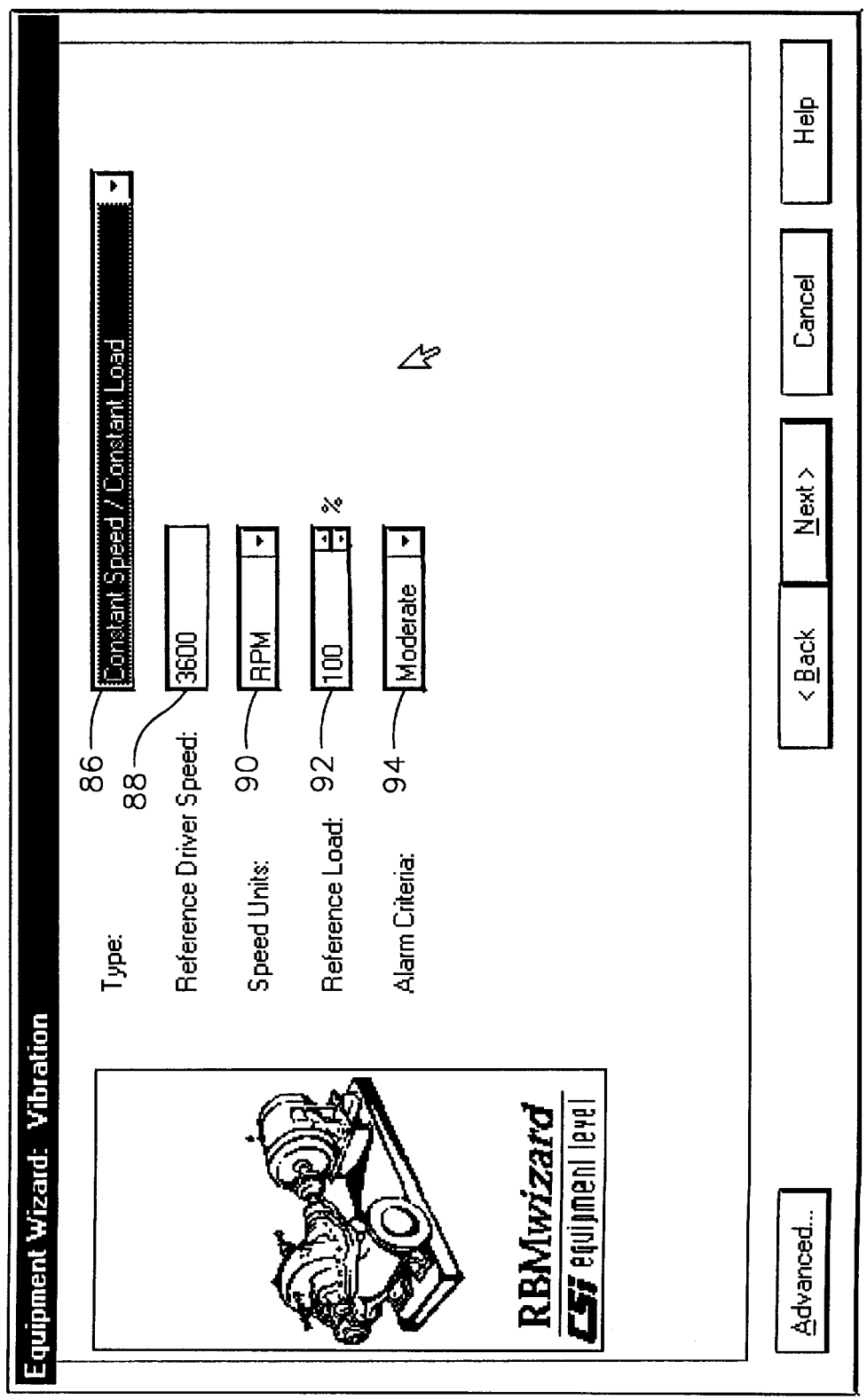
FIG. 7 is a user interface screen prompting the user to define information for use by the program of FIG. 2 in creating vibration monitoring elements of the predictive maintenance database.

Since the user 48 selected "periodic vibration" in FIG. 4 as the measurement technology, the user 48 is prompted in FIG. 7 to specify various equipment parameters effecting vibration including the equipment or component type 86, a reference driver speed 88 of the equipment, speed units 90, a reference load 92 corresponding to the reference operating speed 88, and an alarm criteria 94. Alarm levels are adjusted automatically by the program 40 based on the alarm criteria selection 94.

Figure 8:
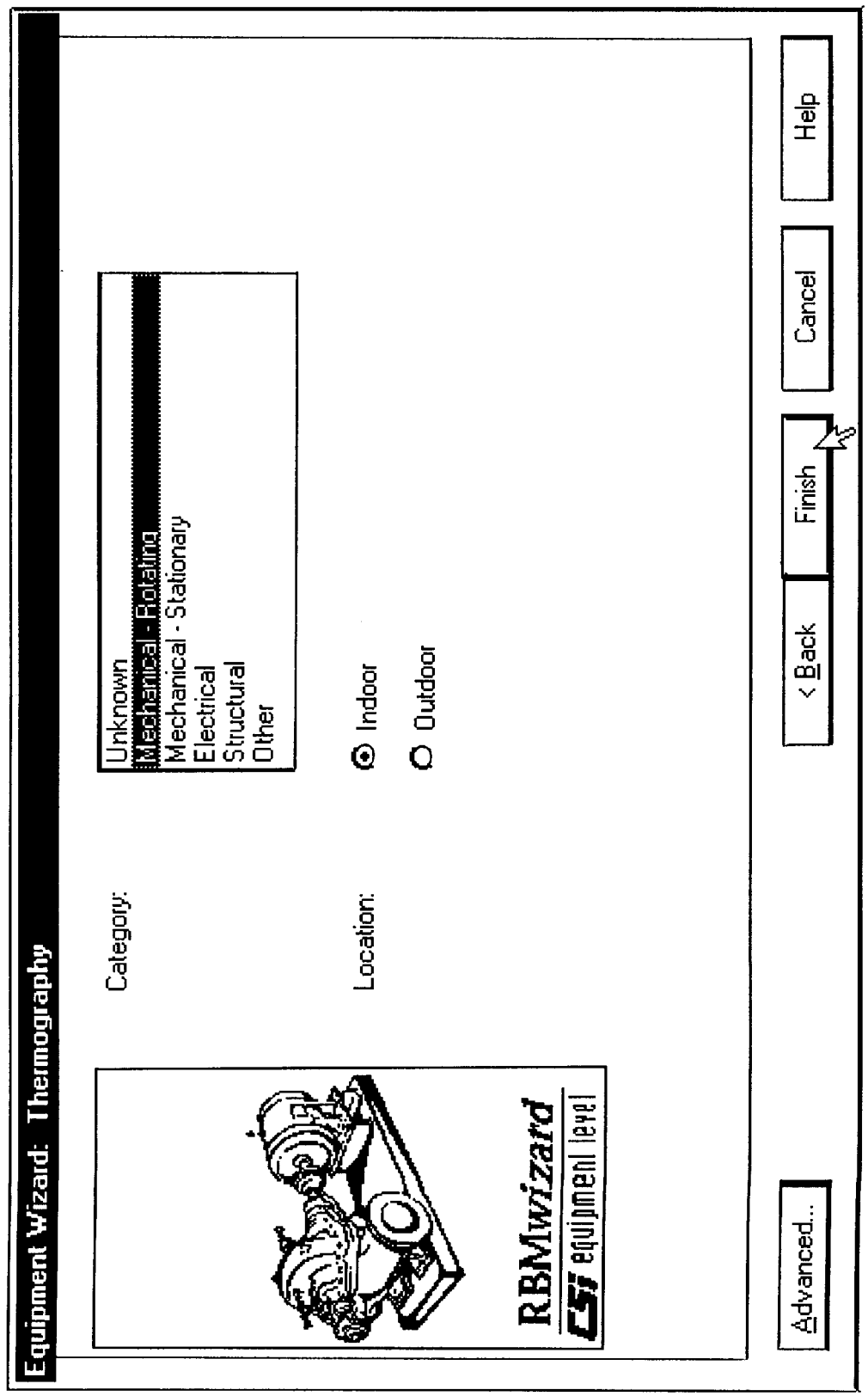
FIG. 8 is a user interface screen prompting the user to define information for use in creating thermography monitoring elements of the predictive maintenance database.
Figure 9:
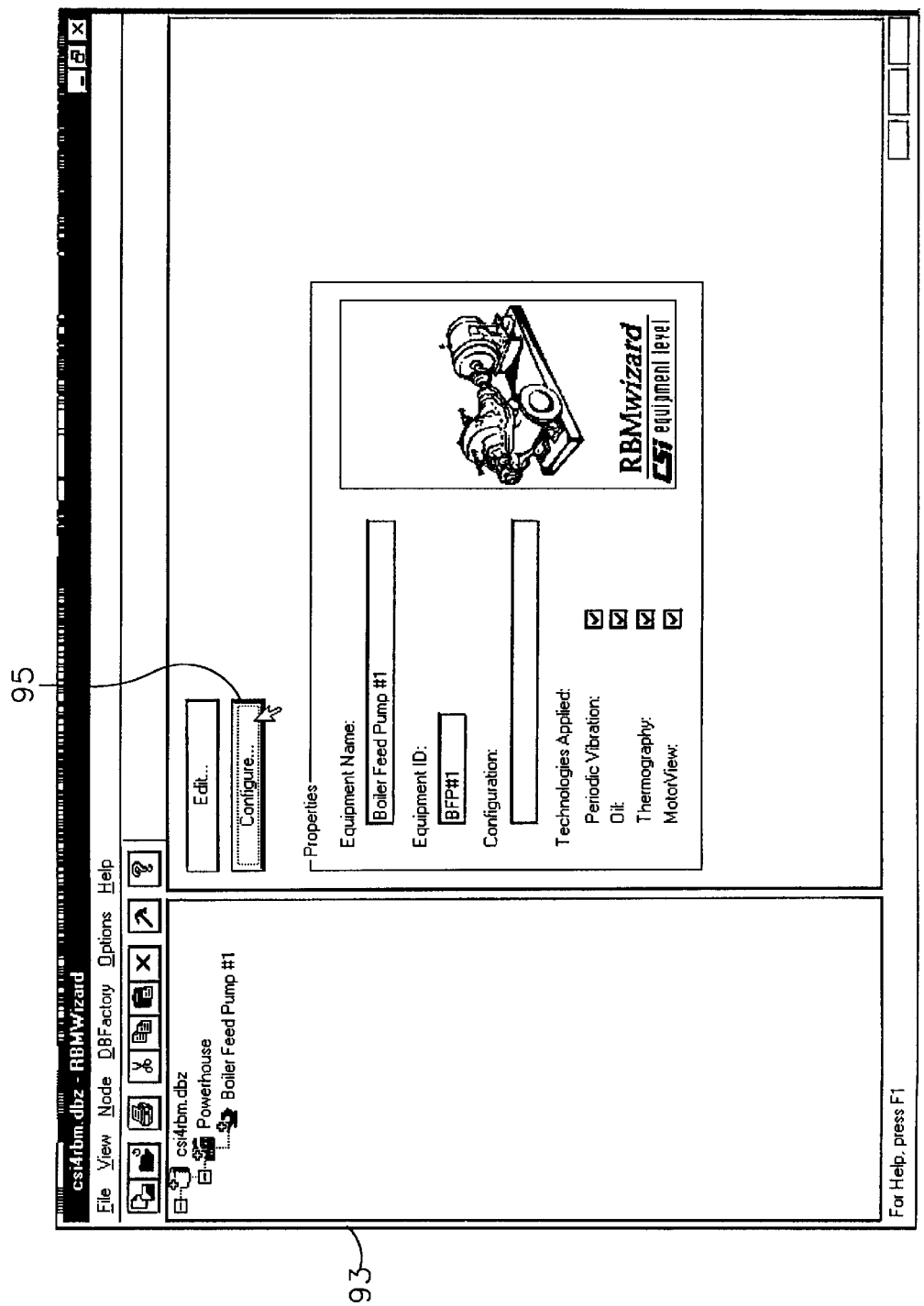
FIG. 9 is a user interface screen of a main program screen which provides a tree structure of database files and enables the user to launch a detailed configuration of equipment represented by a file shown in the tree structure.

In FIG. 8, the user 48 is asked to provide setup information required by the technologies selected in FIG. 4. This information is used later during the detailed component setup.

A name for the equipment (Boiler feed Pump #1) has now been created within the "powerhouse" area and the equipment is ready to go through a more detailed configuration. The detailed configuration portion of the program 40 is that portion of the program 40 which asks for information that enables the measurement information to be set up correctly. A detailed configuration of the boiler feed pump #1 is being launched from the main program screen shown in FIG. 9. This is accomplished by selecting the file entitled "Boiler Feed Pump #1" from the file tree structure shown in box 93 and then selecting the "Configure" button 95.

Figure 10:
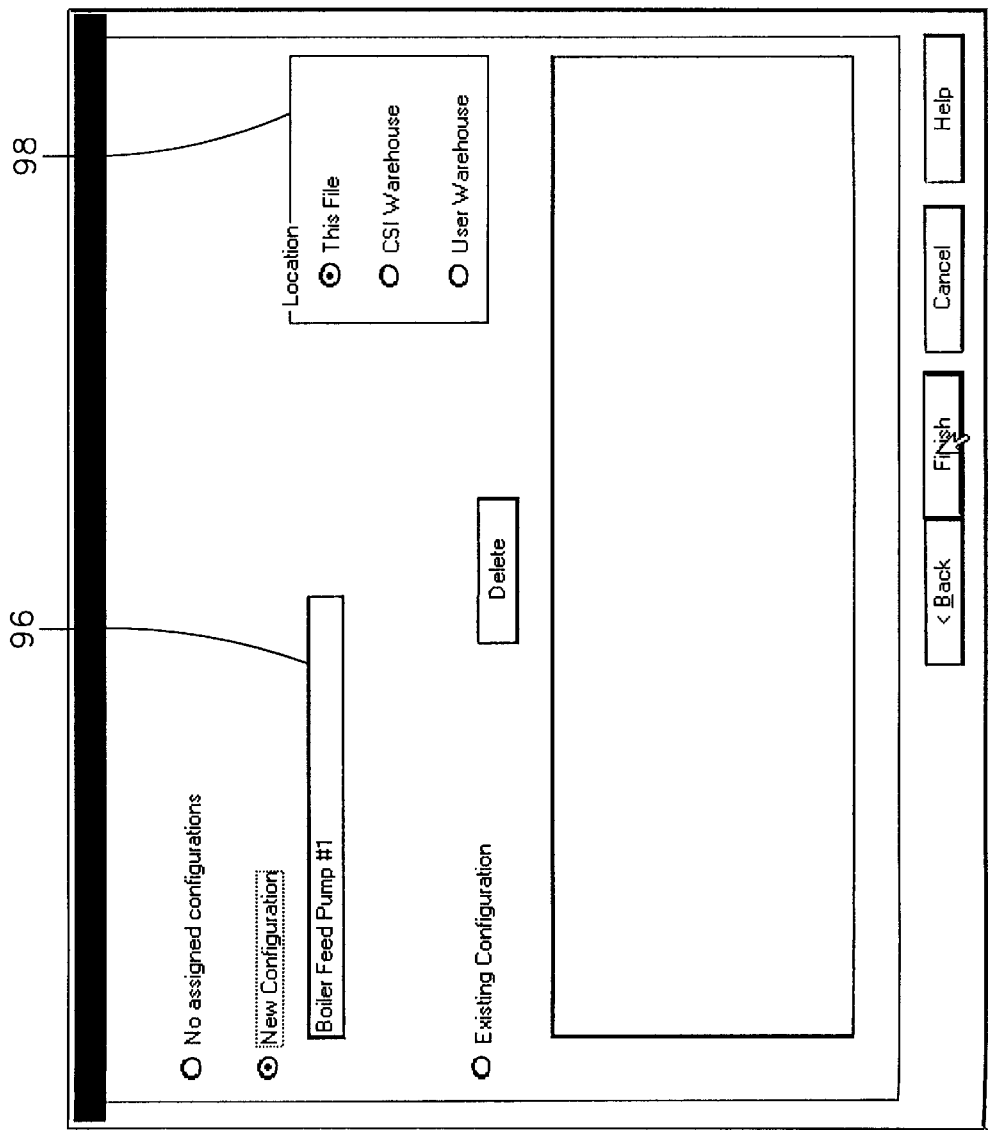
FIG. 10 is a user interface screen from which the user has initiated definition of a new equipment configuration file entitled "Boiler Feed Pump #1" defining physical characteristics of a boiler feed pump to be monitored.

In FIG. 10, the user 48 has defined a new configuration file title "Boiler Feed Pump #1" shown at window 96. Configuration information, including component types, couplings between components, and physical characteristics of components, are stored in the specified file. If desired, the user 48 may elect to save configuration information in a user-defined warehouse file 98. A read-only warehouse file is also provided as part of the program 40. At the screen shown in FIG. 10, the user 48 may select a configuration which is already stored in one of the warehouse files, thus avoiding the need to define a configuration when the equipment (or like equipment) has been previously configured.

Figure 11:
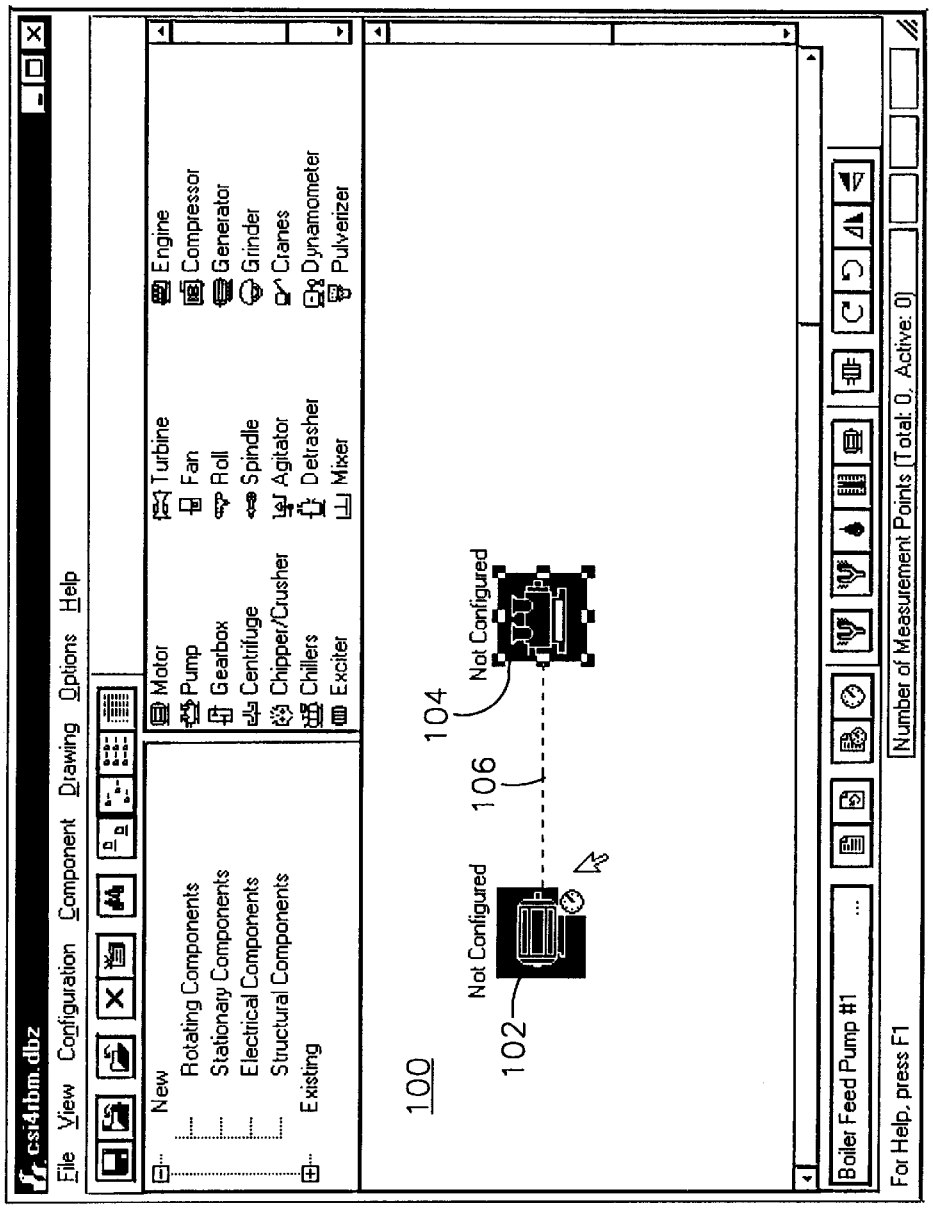
FIG. 11 is a user interface screen for defining components and component connectivity of the new configuration.

At the component design studio shown in FIG. 11, the user 48 is asked to identify components of the new configuration. Since the boiler feed pump #1 includes a motor and a pump, each of the components are selected from the list of rotating components and displayed in the lower window 100 as an unconfigured motor 102 and an unconfigured pump 104. A dashed line 106 connecting the motor 102 and pump 104 represents an unconfigured coupling. These components may be configured for each technology that should be applied to the specific equipment.

A typical procedure for configuring the components shown in FIG. 11 will now be described. The motor 102 will be configured first, then the pump 104, and last the coupling 106 between the two.

Figure 12:
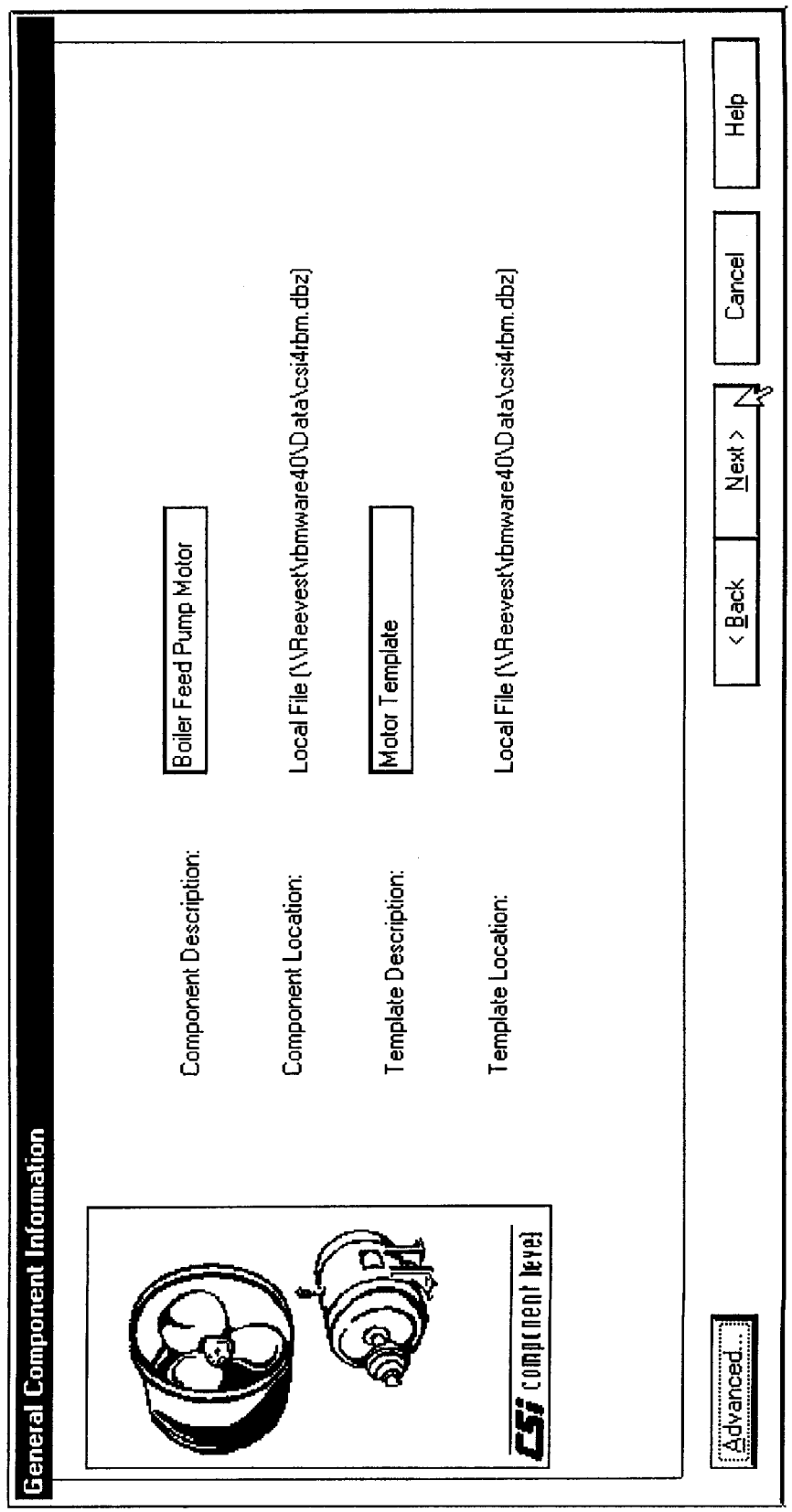
FIG. 12 is a user interface screen prompting the user to define general motor configuration information.
Figure 13:
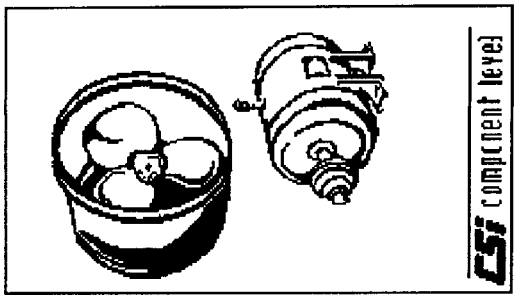
FIG. 13 is a user interface screen prompting the user to define information corresponding to motor type.
Figure 14:
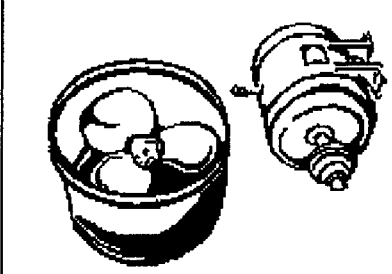
FIG. 14 is a user interface screen prompting the user to define physical characteristics of the motor.

General information relating to the motor is provided at the screens shown in FIGS. 12 and 13. This information is needed both for use in creating the data collection methods and also for the programs that analyze the data.

Rotating equipment such as motors posses characteristics that will generate specific vibration frequencies when the equipment is running. The amplitude at these frequencies is used to determine the condition of the equipment. During the detailed configuration of the equipment, the program 40 asks the user 48 to input this information at the screen shown in FIG. 14, if known. For example, the user may input the number of phases, poles, rotor bars and stator slots, if known, for a synchronous motor. The inference engine 46 uses this information in part to select appropriate analysis parameter information.

Figure 15:
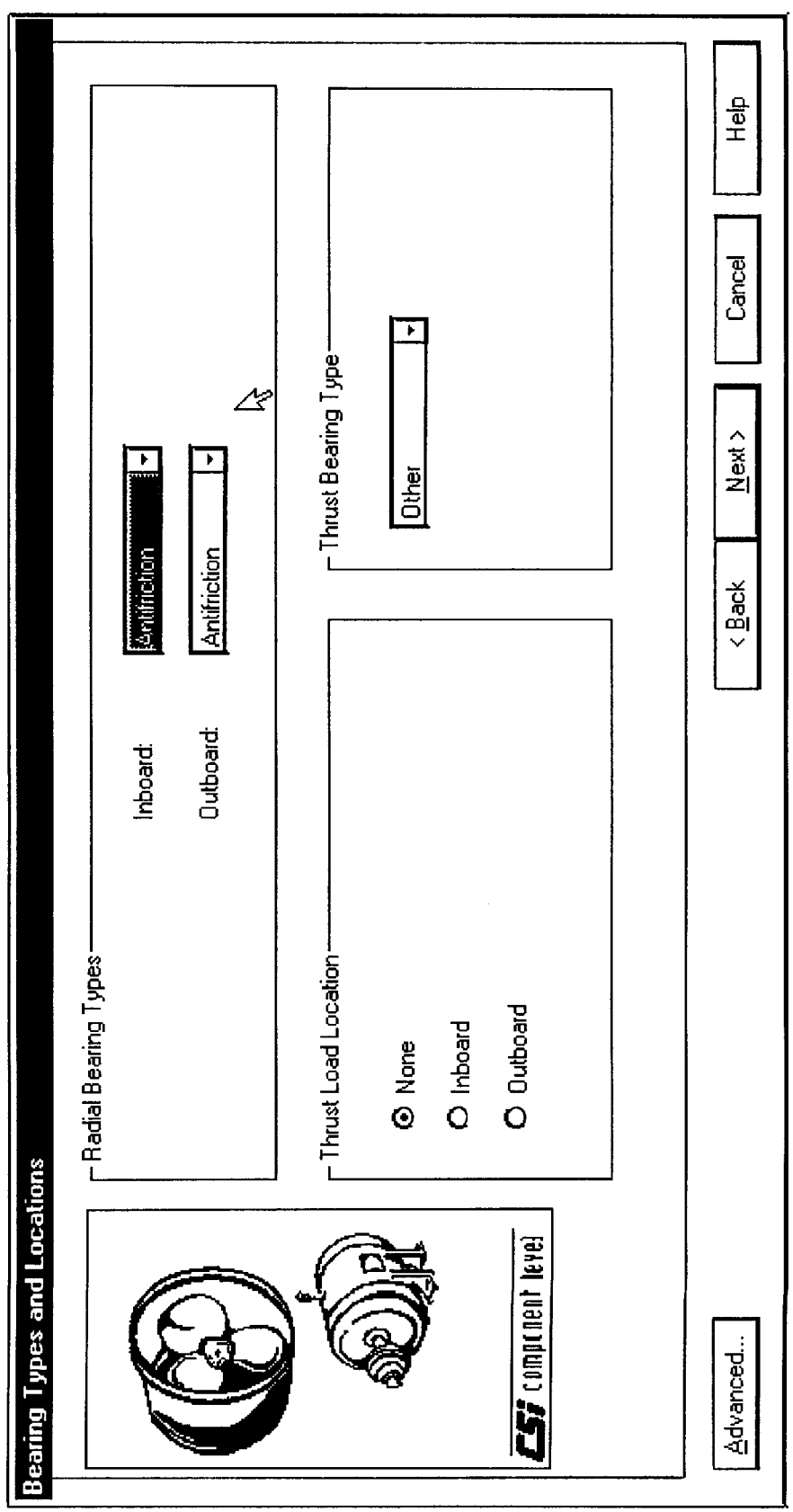
FIG. 15 is a user interface screen prompting the user to define bearing types.
Figure 16:
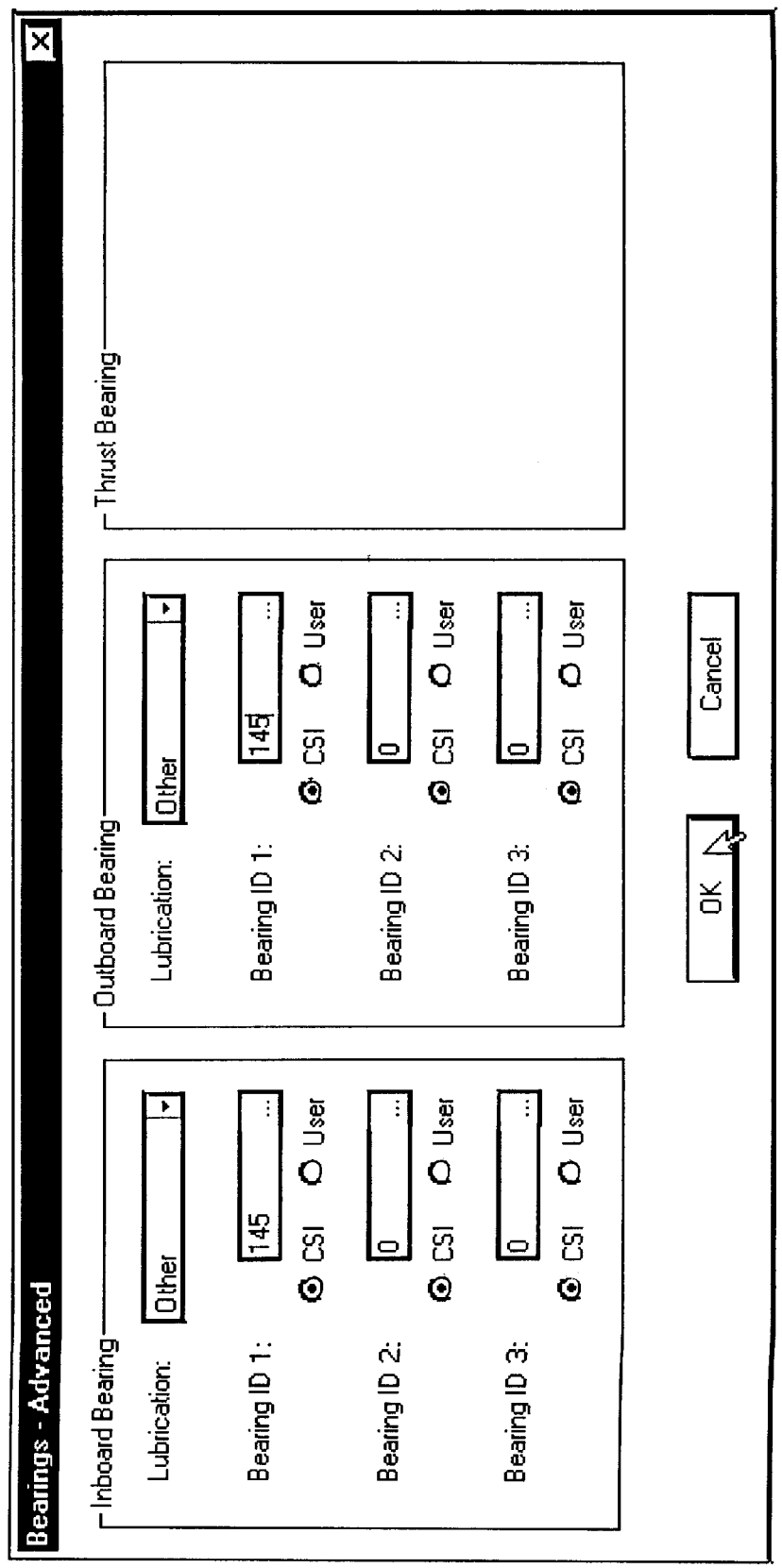
FIG. 16 is a user interface screen which enables the user to select bearing information from a list of known bearings.
Figure 17:
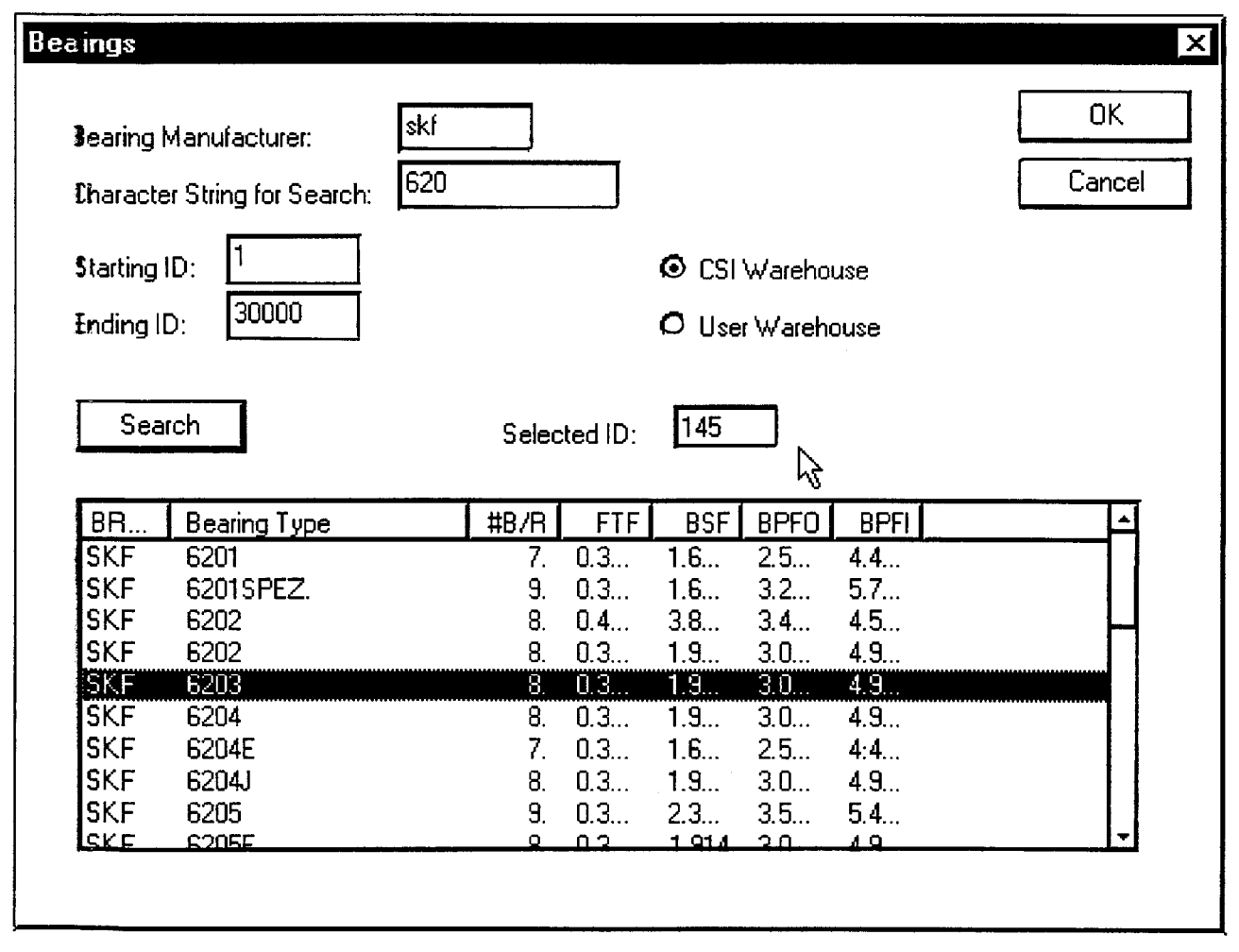

The user 48 is next taken to the screen shown in FIG. 15 where the user 48 is asked to select motor bearing types and thrust load location, if applicable. Bearings are an important element relating to the health of rotating equipment and are treated as such by the program 40. Bearing information is important in the setup of the measurement methods as well as the analysis of the data. FIG. 16 shows a screen from which bearings may be looked up from a list of known bearings, and FIG. 17 shows a screen that enables the user 48 to look up bearings from master lists and import them into the component definition.

Figure 18:
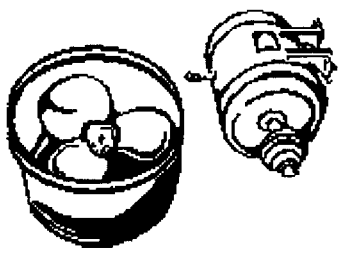
FIG. 18 is a user interface screen showing motor vibration measurement points selected by the program of FIG. 2.

In FIG. 18, the program 40 has processed the motor information entered by the user 48 (including the selected component type and the selected physical characteristics) and determined the best or optimal measurement points 103 for the motor. The best or optimal points chosen are those for which a check mark appears in the column titled "Active?". A unique measurement point identifier (PID) 105 is generated and associated with each measurement point 103. In an alternate embodiment of the user interface screen shown in FIG. 18, an image of the motor is obtained from stored equipment diagram files 62 (FIG. 2) and the measurement points 103 are indicated on the motor image. In typical conventional methods, the user 48 must possess substantial knowledge of predictive maintenance practices in order to identify the best measurement points 103. As seen in FIG. 18, the program 40 has identified these points for him.

Figure 19:
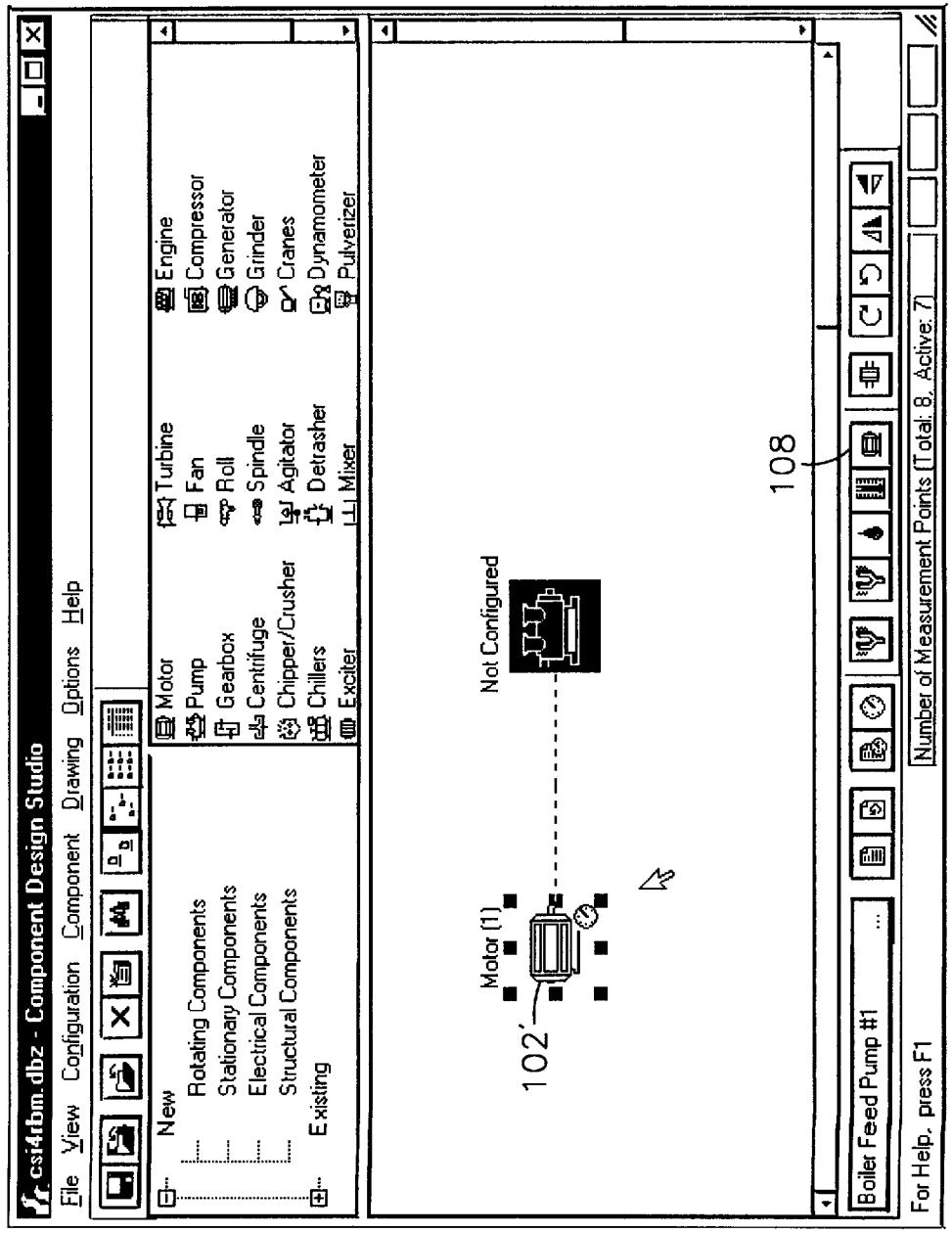
FIG. 19 is a user interface screen showing that the motor is configured for the vibration technology selected in FIG. 4 and the user is initiating configuration of the motor for another technology.

In FIG. 19, the motor 102' is now configured for the vibration technology selected back in FIG. 4. The user 48 now chooses to configure the motor technology by selecting the motor icon 108 at the bottom of the screen.

Figure 20:
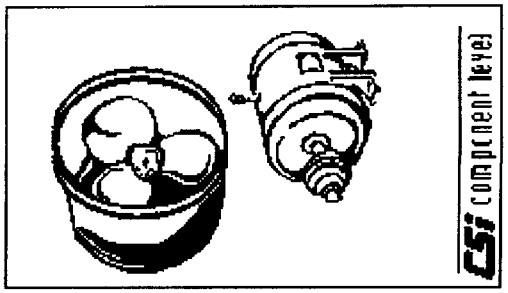
FIG. 20 is a user interface screen prompting the user for general motor information.
Figure 21:
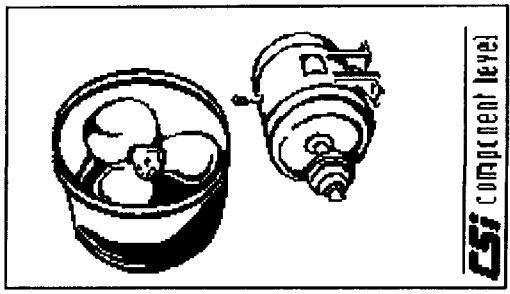
FIG. 21 is a user interface screen prompting the user for information corresponding to rated operating parameters of the motor.

As seen in FIGS. 20 and 21, the motor technology requests additional motor information from the user 48 (for example, identification number, frame size, insulation class, rated RPM, rated power, rated voltage, and rated current). The information provided in FIG. 20 is used to determine measurement parameters for collecting data while the information provided by the user 48 in FIG. 21 is used for analysis of the data.

Figure 22:
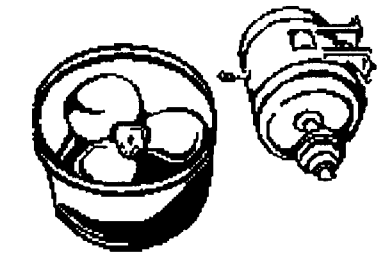
FIG. 22 is a user interface screen showing motor measurement points selected by the program of FIG. 2.

FIG. 22 shows measurement points that are selected for the motor based on the information provided in FIGS. 20 and 21. The measurement methods are also altered based on that information.

Figure 23:
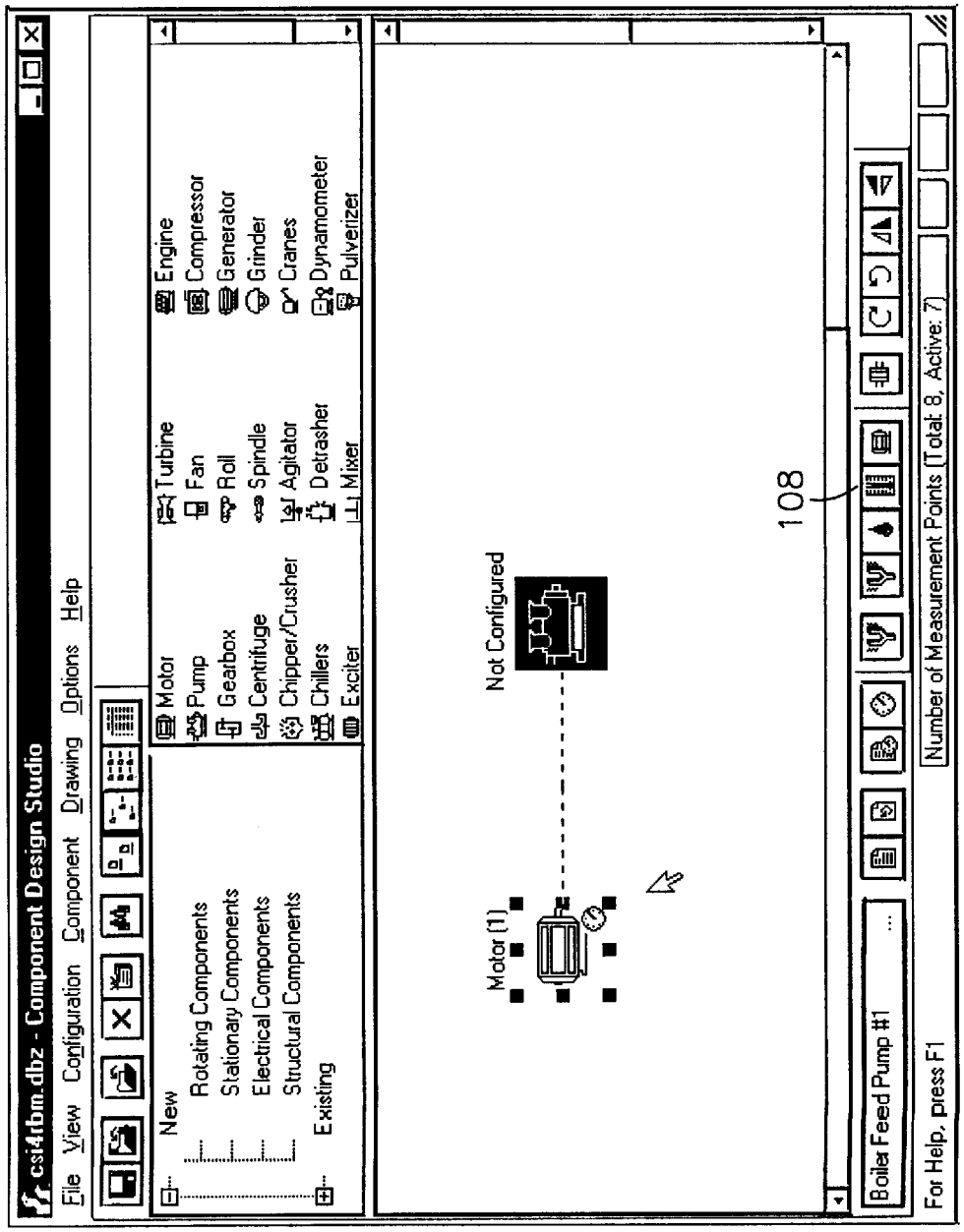
FIG. 23 is a user interface screen in which the user initiates configuration of the motor for thermography data collection.
Figure 24:
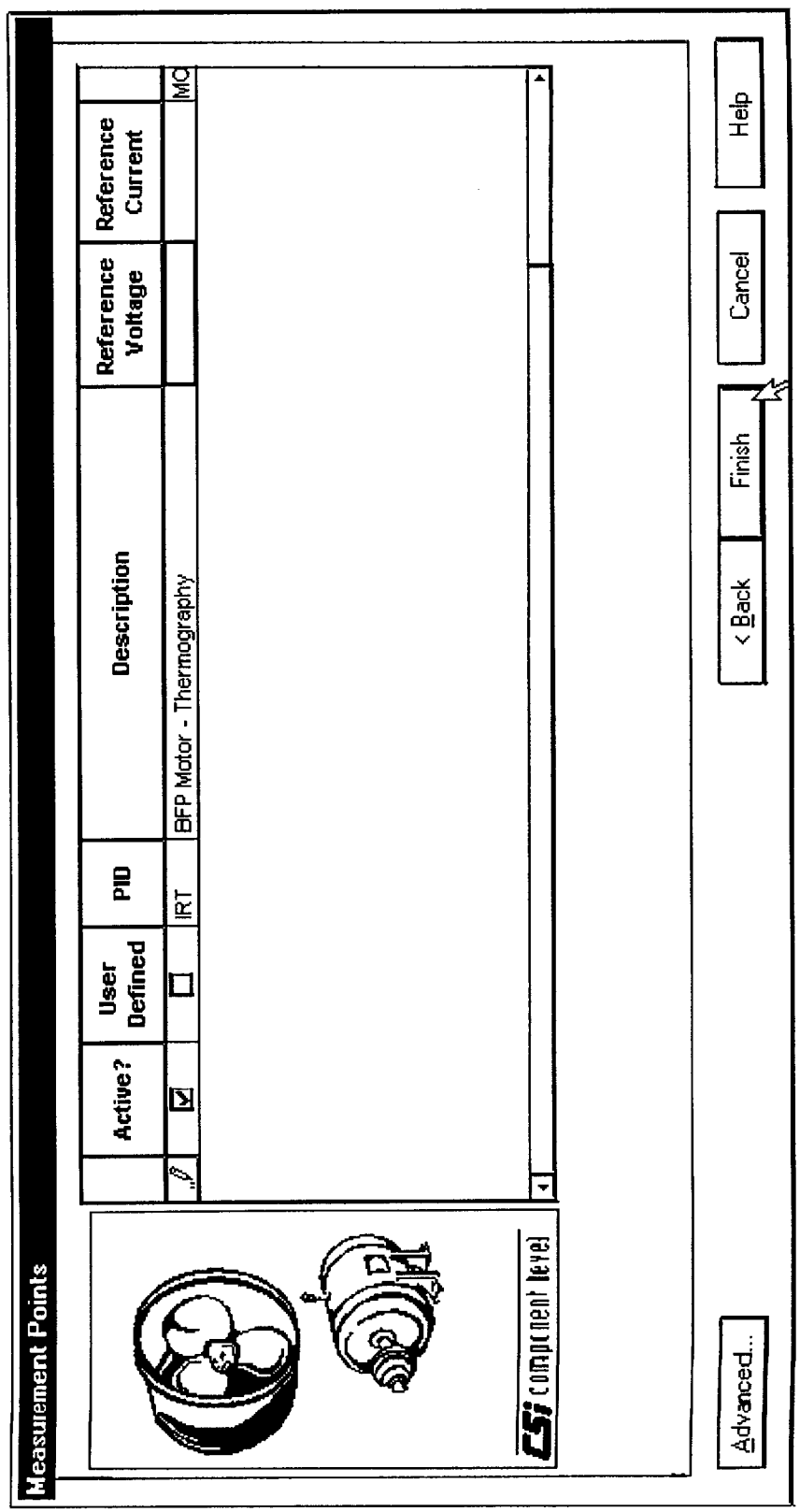
FIG. 24 is a user interface screen which enables the user to provide information for use in selecting thermography measurement points for the motor.

In FIG. 23, the user 48 may select icon 110 at the bottom of the screen to configure the motor for infrared thermography data collection. Thermography measurement points are set up in the predictive maintenance database based on the information provided at the screen shown in FIG. 24.

Figure 25:
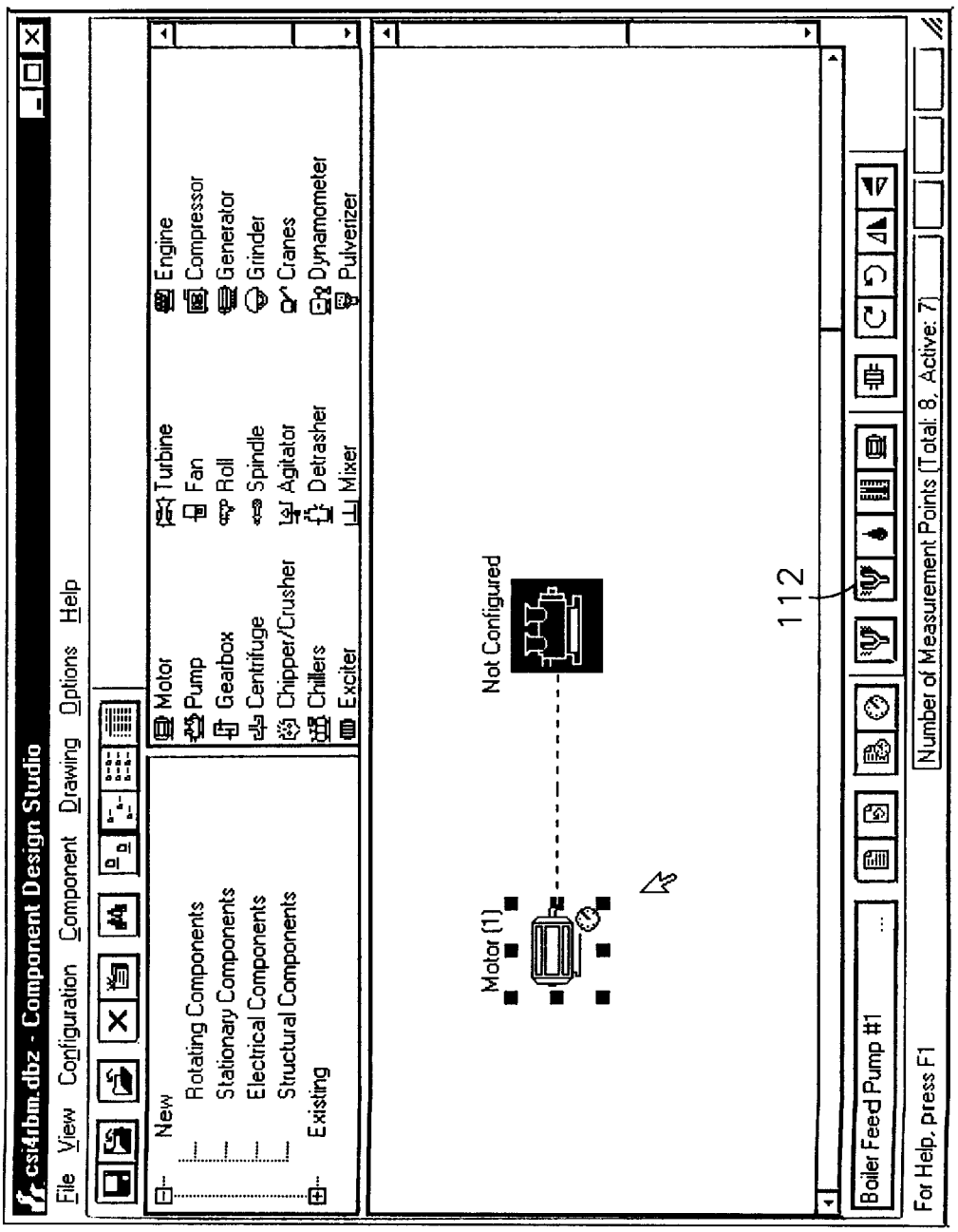
FIG. 25 is a user interface screen which enables the user to initiate configuration of the pump for vibration technology.

The user 48 selects icon 112 shown at the bottom of the screen of FIG. 25 to configure the driven component (i.e., the pump) for the vibration technology. This selection takes user 48 to the screen shown in FIG. 26 which prompts the user 48 to provide the requested information. Often, a user may not know all of the configuration information that the program 40 requests. In such a case, the user 48 simply needs to answer what is known and the program 40 will create an optimal database from the information that is available. Users who know more information about the equipment details can enter this information into the screen shown in FIG. 26 and by selecting the advanced screen button 114 located in the lower left hand corner of the screen. The additional information will be reflected in the setup of the actual predictive maintenance database as it is built.

Figure 27:
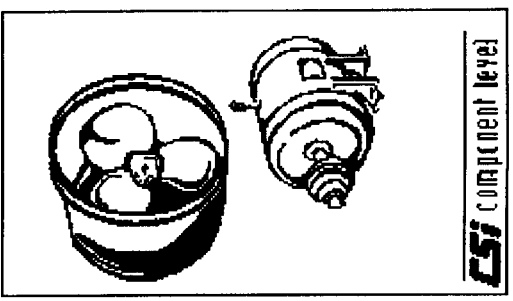
FIG. 27 is a user interface screen prompting the user for additional pump information.

Additional information is requested in FIG. 27. Information relating to the pump type 116, pump support 118, pumped fluid 120, number of stages 121 and number of inlet/outlet impeller vanes 123, is used by the program 40 to establish measurement parameters, while information such as inlet type 122 and number of inlet/outlet diffuser vanes 125 are used to determine specific analysis frequencies.

Figure 26:
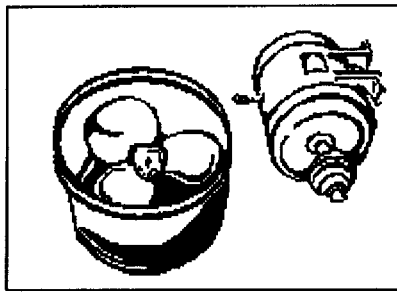
FIG. 26 is a user interface screen prompting the user for general pump information.
Figure 28:
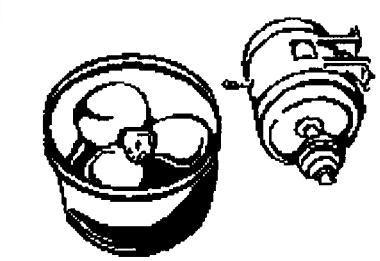
FIG. 28 is a user interface screen showing pump vibration measurement points selected by the program of FIG. 2.

Measurement points 124 (FIG. 28) are established by the program 40 based on the information entered in FIGS. 26 and 27, and the measurement points 124 are displayed on the screen shown in FIG. 28. Each measurement point is identified by a unique measurement point identifier (PID) 126. The measurement points are used by the program 40 to establish the measurement parameters and locations.

Figure 29:
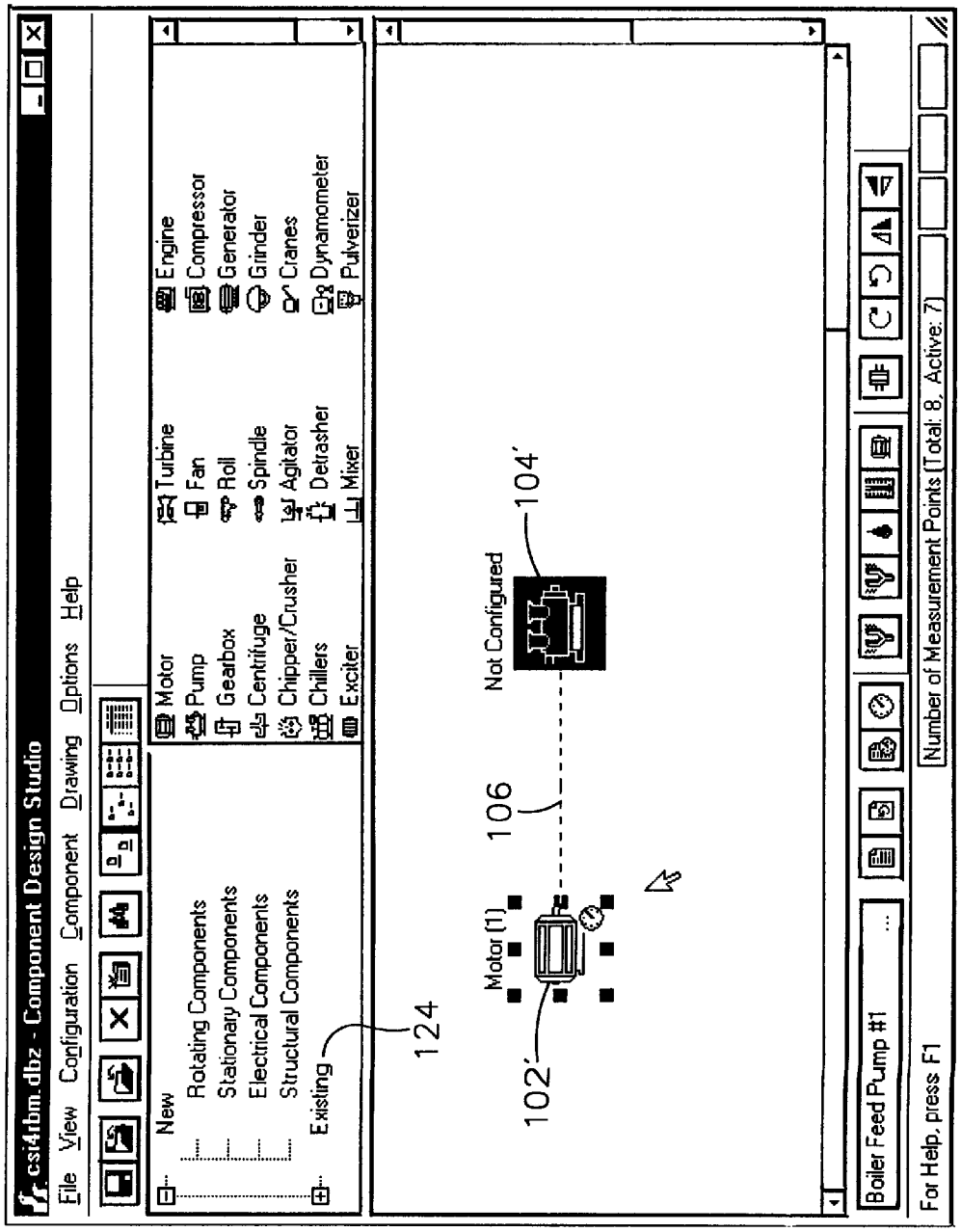
FIG. 29 is a user interface screen showing the pump and motor components as being configured with an unconfigured coupling between the pump and motor.

The user 48 is taken to the component design studio 44 (FIG. 2) in FIG. 29 where the coupling 106 between the configured motor 102' and the configured pump 104' is defined. The coupling 106 attaches the driver, in this case a motor 102', and a driven unit, in this case a pump 104'. The type of coupling can effect the speed of the driven unit.

In the program 40, the user 48 simply inputs the type of coupling and any speed ratio information. Coupling types can be found by expanding the menu selection under "Existing" shown at 124. This information enables the program 40 to calculate the correct measurement point speeds. The speed at each measurement point is an important piece of information used by the program 40 to establish analysis parameters which control how data is measured and subsequently analyzed.

Figure 30:
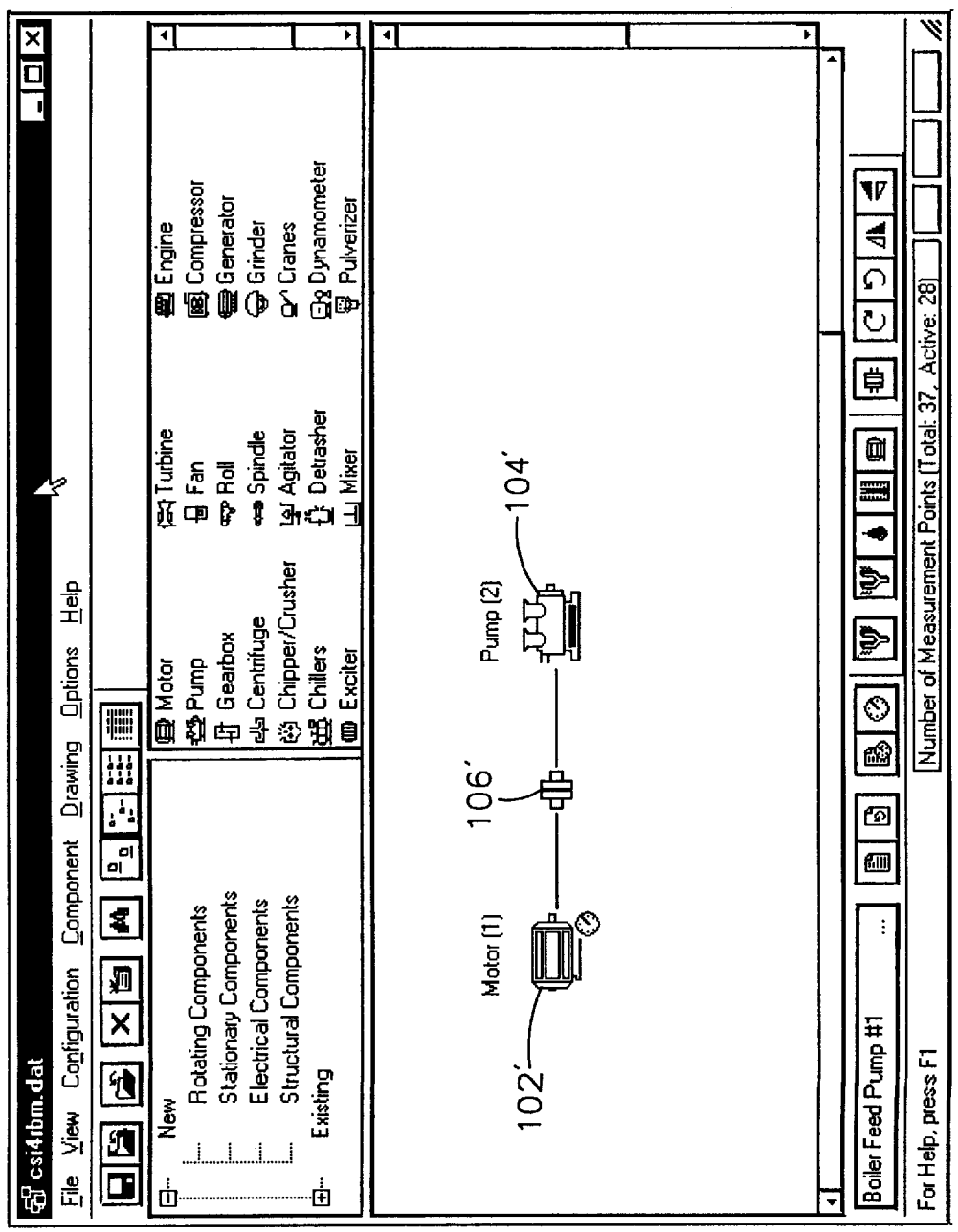
FIG. 30 is a user interface screen showing the pump, motor, and coupling as being configured.
Figure 31:
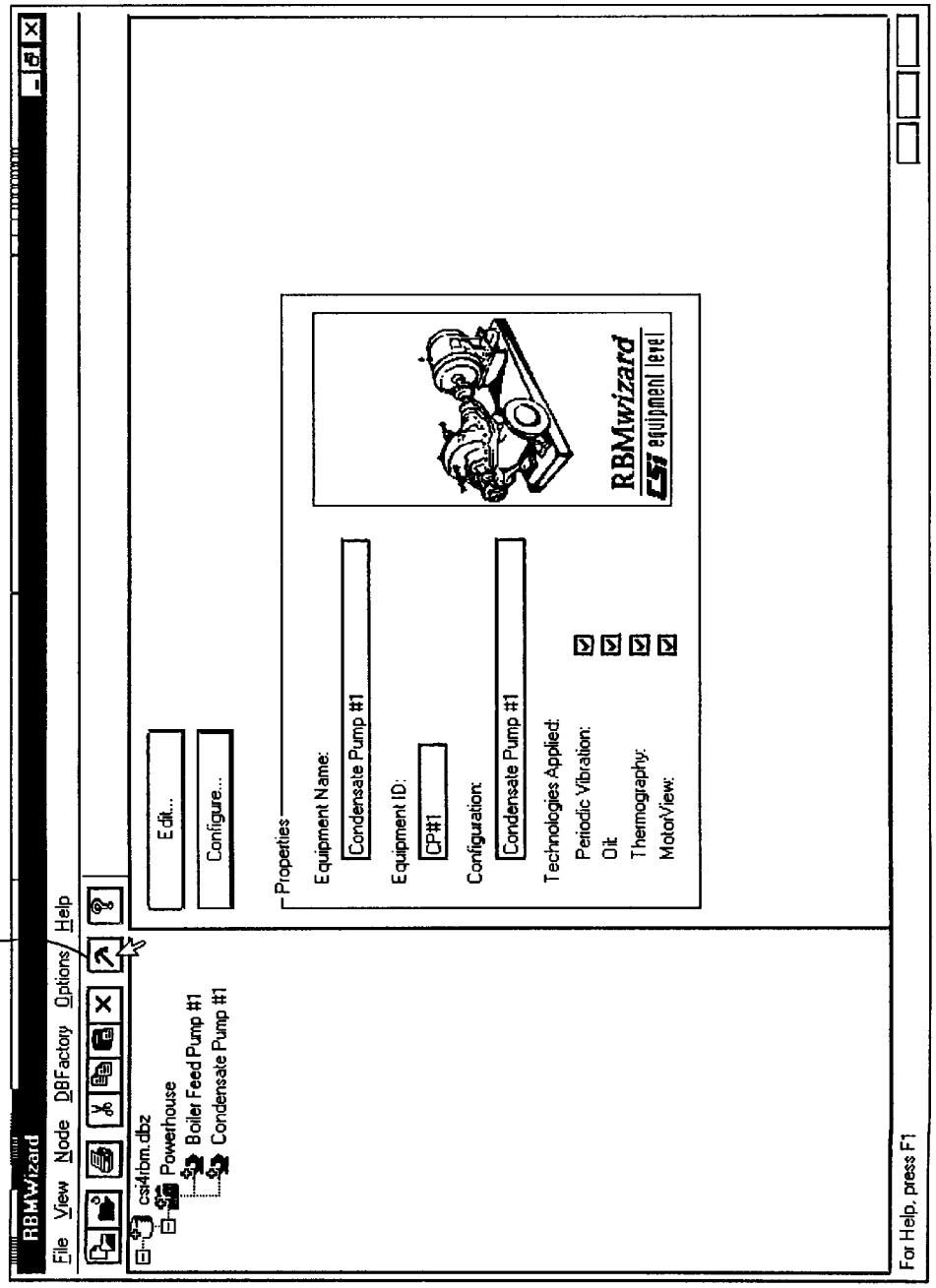
FIG. 31 is a user interface screen from which the user may initiate creation of a predictive maintenance database in accordance with the invention.
Figure 32:
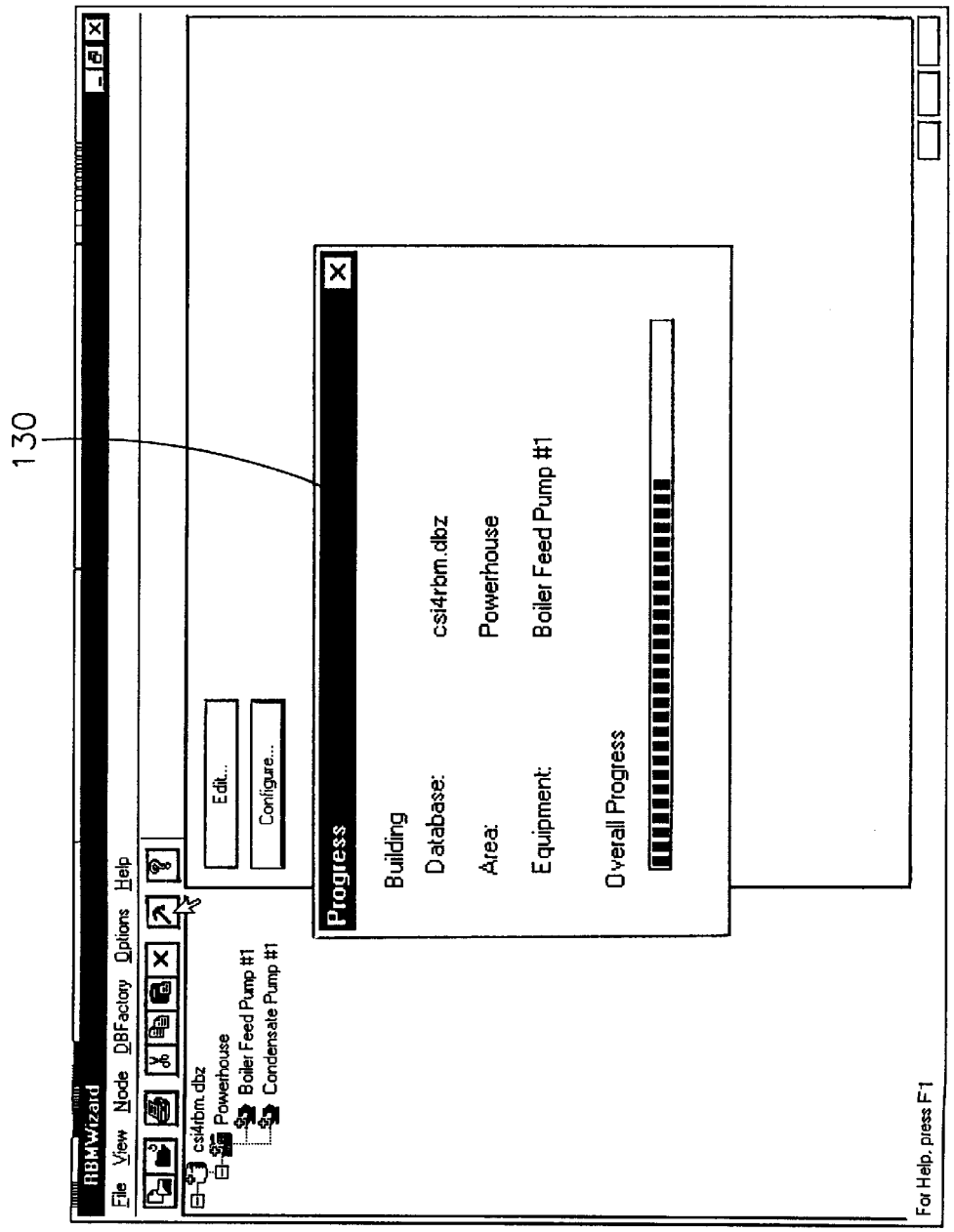
FIG. 32 is a user interface screen showing the progress of the program of FIG. 2 while creating a predictive maintenance database.

The "boiler feed pump #1" is now configured in FIG. 30, including a configured coupling 106'. The user 48 is now ready to instruct the program 40 to create a predictive maintenance database for the configured equipment. The user 48 accomplishes this by returning to the main program screen, shown in FIG. 31 (see also FIG. 9), and clicking the hammer icon 128. As shown in FIG. 32, pop-up progress screen 130 enables the user 48 to monitor the progress of the program 40 as the database is created. A predictive maintenance database file is created and can be viewed and edited with a commercially available database program 54 (FIG. 2), such as DBASE, as shown in FIGS. 33–41.

Figure 33:
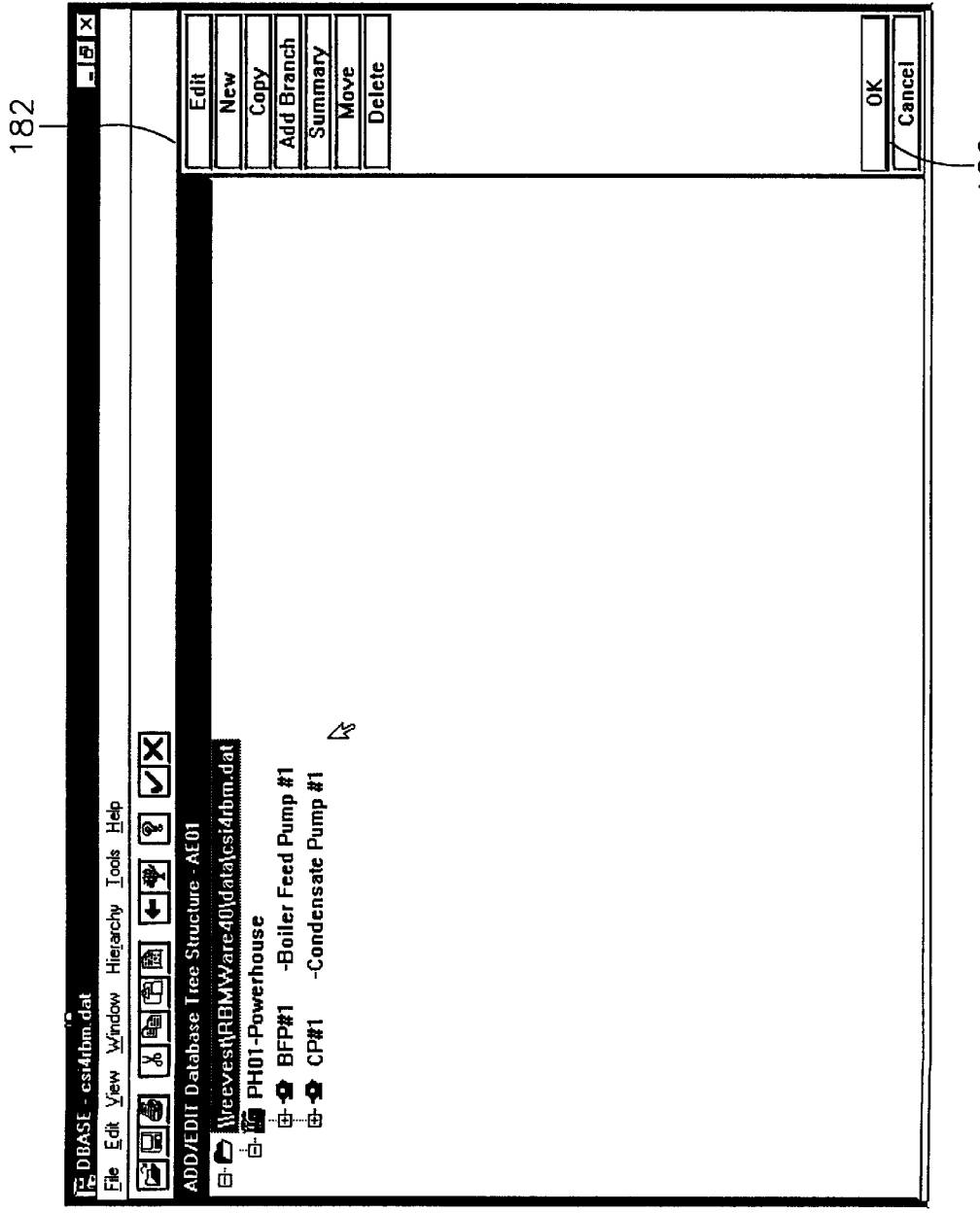
FIG. 33 is a user interface screen of a main program screen for a database viewing program which enables viewing and editing of information contained in predictive maintenance database files created in accordance with the present invention.

FIG. 33 provides a view of the main program screen from the DBASE program. The screen indicates to the user 48 that two equipment configurations ("Boiler Feed Pump #1" and "Condensate Pump #1") are included within the PH01-Powerhouse area of the database. From the screen shown in FIG. 33, the user 48 may edit, move, delete, and generally manipulate data contained in the database by use of the appropriate buttons shown in the upper right-hand portion of the screen. These buttons are generally indicated at 182. To examine the measurement points output by the program 40 for the Boiler Feed Pump #1, the user 48 selects "Boiler Feed Pump #1" and then clicks the "OK" button 180 located in the lower right-hand portion of the screen.

Figure 34:
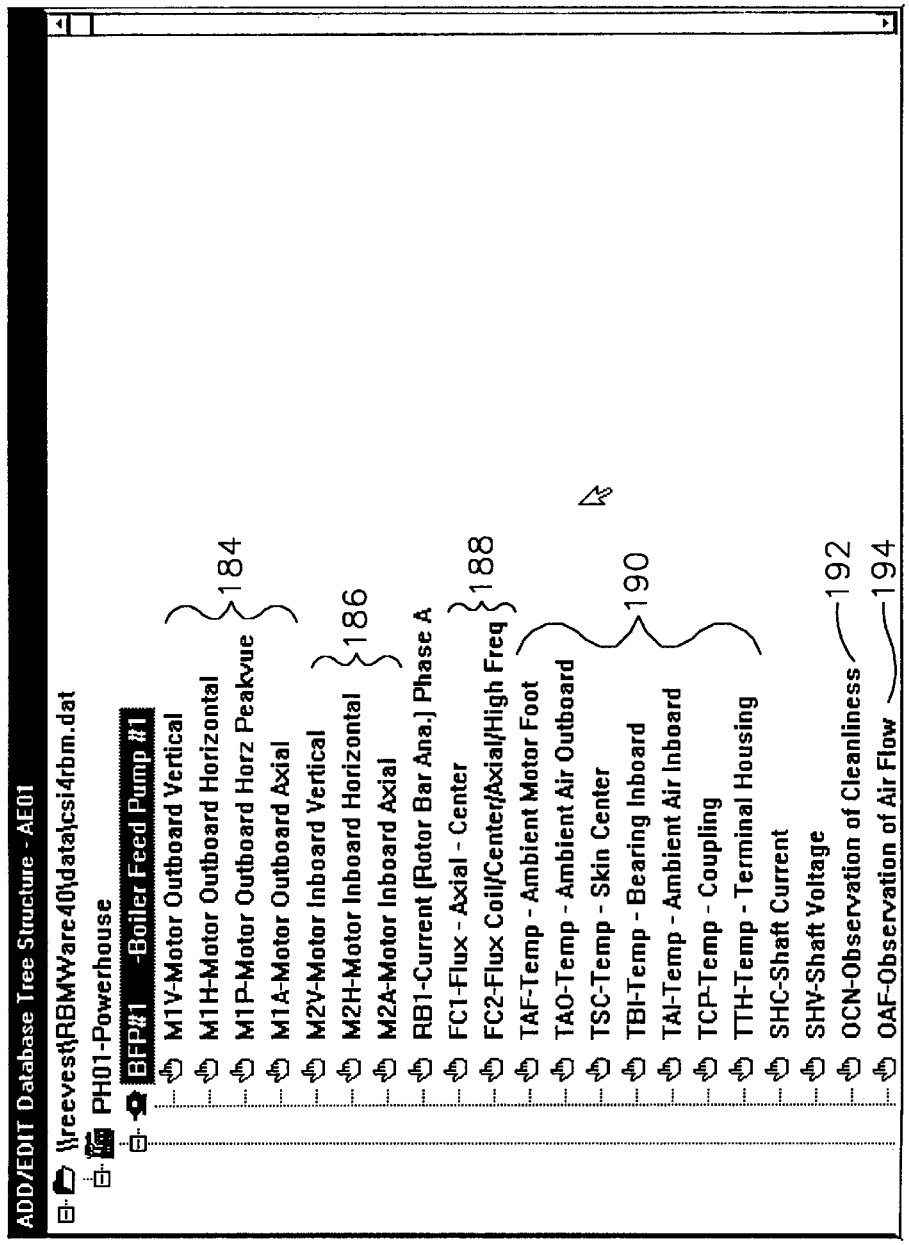
FIG. 34 is a user interface screen of the database viewing program which displays measurement points created by the main program.

A list of measurement points created by the program 40 to monitor the "Boiler Feed Pump #1" is shown in FIG. 34. Included in the list are points for measuring vibrational displacement at the outboard side of the motor 184, vibrational displacement at the inboard side of the motor 186, motor leakage flux 188, temperature 190, and others. The list also includes points for visual observations made by the user 48, including observation of motor cleanliness 192 and observation of air flow through the motor 194.

Figure 35:
FIG. 35 is a user interface screen of the database viewing program showing detailed measurement point information.

FIGS. 35–41 illustrate various detailed information which is included in the database for each measurement point. Some of the information is based on data input to the program 40 by the user 48. As shown in FIG. 35, the user 48 is able to view and edit measurement point information including a measurement point identifier 192, measurement point description 194, measurement units and code 196, motor rpm at the measurement point 198, monitoring schedule 200, and number of values in statistical calculations 202. The screen shown in FIG. 35 also shows that data collection set information 204 (used during actual field data collection) is included in the database. The data collection set information includes an analysis parameter set 206 and an alarm limit set 206.

Additional measurement point information shown in FIG. 36 includes probe type 204, sensor orientation 206, sensor position 208, sensitivity of the sensor 210, highest and lowest acceptable signal levels 212, and other detailed information.

At the screen shown in FIG. 37, the user 48 is provided a descriptive list of analysis parameters which are included in the analysis parameter set 206 created by the program 40. Included in the list is an AC motor rolling bearing analysis parameter 212, a peakvue analysis parameter 214, an electric current-rotor bar condition parameter 216, motor shaft current and voltage measurement parameters 218, and others.

The analysis parameter sets control the manner in which data is collected. These sets control two basic items. The first is time waveform and frequency spectrum data collection along with any special signal processing. The user 48 may view and edit spectrum and waveform information contained in the database for each of the analysis parameters listed in FIG. 37. For example, in FIG. 38 the user 48 is able to view detailed information relating to waveform and frequency data collection parameters for analysis parameter number 1 entitled "AC MTR, ROLLING BRG (1600)." Included in this information is the spectral frequency setup 220, low frequency signal conditioning limit 222 (for noise elimination), upper and lower frequency limits 224, number of spectral lines to be acquired 226, number of averages 228, and type of analysis window 230.

The second item in the parameter analysis set is the parameter bands (i.e., frequency ranges in which the amplitude is measured) that will be measured and trended by the DBASE database program. As shown in FIG. 39, the analysis parameter sets are scalar values that correspond to waveform characteristics or integrated energies over specified frequency ranges in the spectrum. These may include the maximum peak to peak value 232 in the waveform, crest factor 234, a narrow frequency interval around on times turning speed (TS) 236, the amplitude of all frequencies in a wide interval from 3.5 to 10.5×TS, and others. Each of the parameter bands is displayed in FIG. 39 according to a descriptive title, units type, type of parameter, and lower and upper frequencies. Additionally, each parameter band is selected by the program 40 based on information, including type of equipment and component information, that was input to the program 40 by the user 48.

As described above, the program 40 also creates alarm limit sets which correspond to the analysis parameter sets. Alarm limit sets typically vary between different types of equipment and are generally dependent on expected amplitude levels. In FIG. 40, the DBASE database program has displayed by descriptive title a list of alarm limit parameters. Included in the list is an AC motor rolling bearing (moderate) 242, Peakvue (moderate) 244, skin temperature 246, roller element bearing temperature 248, shaft current and voltage alarms 250, and others.

Each alarm limit set contains amplitude limits which are compared to the trended data in the analysis parameter bands. The amplitude levels are based on the type of equipment input to the program 40 by the user 48 and the unexpected operational conditions. FIG. 41 shows the alarm limits for the twelve analysis parameters given in FIG. 40. Included in FIG. 41 is a column specifying for each alarm limit the units code 252, alarm type 254, an alarm limit value indicative of a significant failure or fault 256, an alarm limit value indicative of a less severe failure or alert 258, and other information.

As this example has shown, a user who knows very few equipment details, or a user who knows all equipment details, can use the program 40 to create a predictive maintenance database. The program 40 creates a predictive maintenance database that is more than adequate for data collection and analysis purposes, even when few details are known about the equipment. The more information that can be input into the program 40, the more detailed the measurement points, analysis parameter sets, and alarm limit sets will be.

Referring again to FIG. 30, the "boiler feed pump #1" configuration may be reused to define other like configurations for the creation of additional configurations in predictive maintenance databases. In addition, each of the components 102', 104', 106' and their corresponding templates may be reused in defining other equipment configurations, as illustrated in Example 2 given below.

EXAMPLE 2

In this example, FIGS. 42–52 will be used to illustrate the ability of the program 40 to reuse already configured components when configuring equipment.

Figure 42:
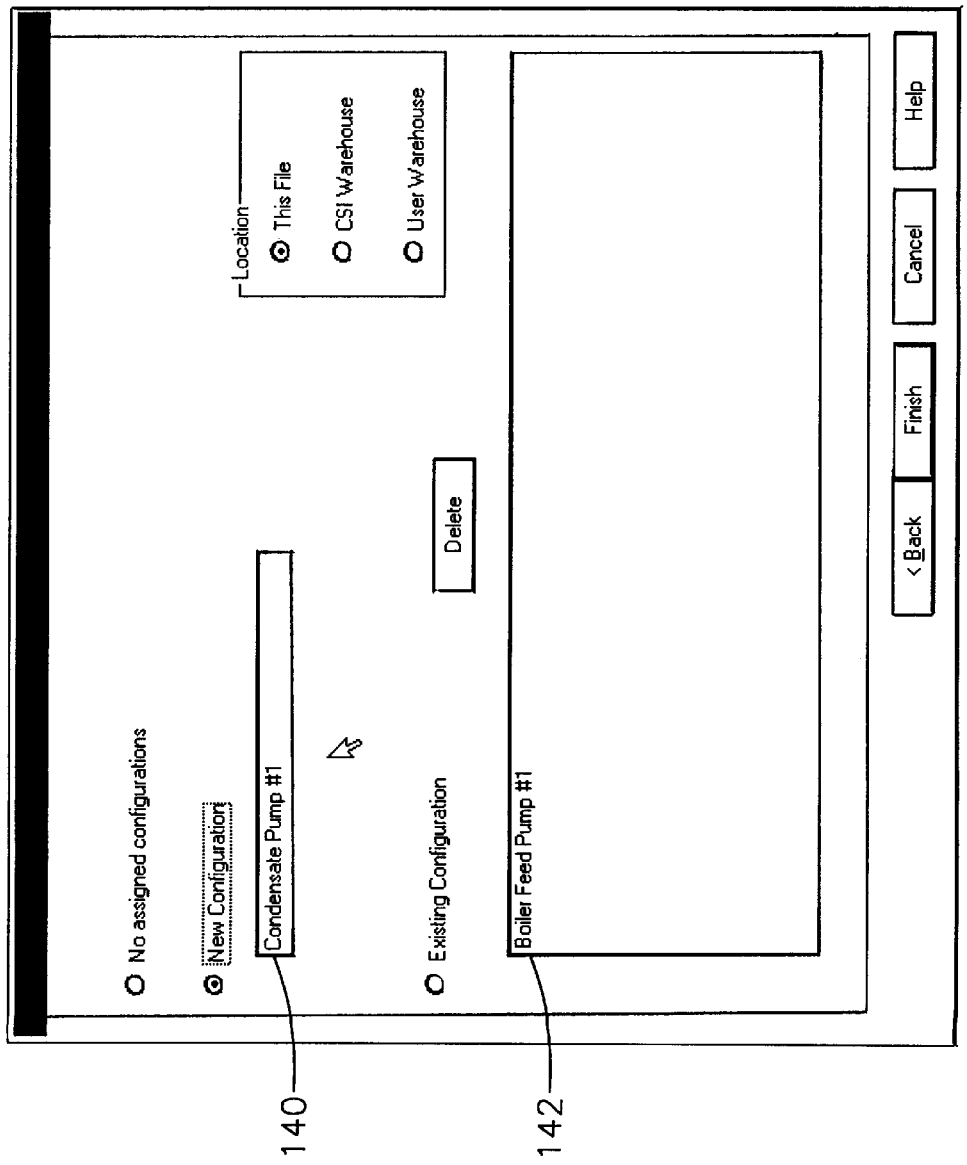
FIG. 42 is a user interface screen from which the user has initiated definition of a new equipment configuration file entitled "Condensate Pump #1" defining physical characteristics of a condensate pump to be monitored.

As shown in box 140 of FIG. 42 (see also FIG. 10), the new configuration created in this example will be called "condensate pump #1". Completed configurations are listed in box 142.

Figure 43:
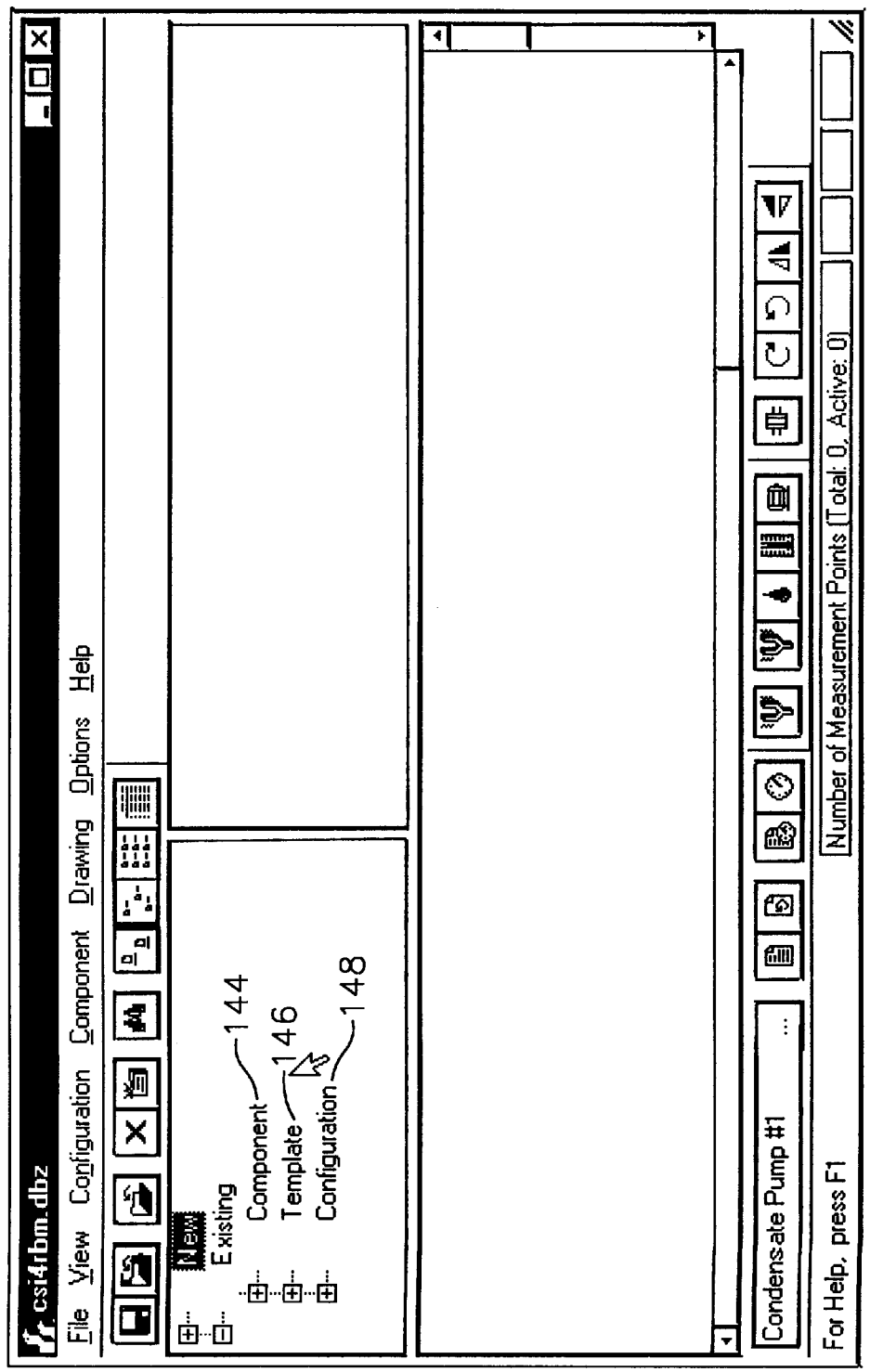
FIG. 43 is a user interface screen prompting the user to specify whether existing configuration information will be used to configure the condensate pump.

At the screen shown in FIG. 43, the user 48 is prompted to specify whether existing configuration information will be used. Existing information can be recalled from one of three types of stored information, including component information 144, template information 146, and configuration information 148. Component information includes the appropriate template information as well as bearing setup information. Template information contains detailed machine setup information (excluding bearing setup information) and is stored in a component warehouse 64 (either a read-only warehouse or a user-defined warehouse). Elements of a component that are not changeable are considered as template information. Configuration information includes complete equipment train information, which usually consists of at least one driver and one driven component connected by a coupling. The user 48 clicks the template 146 selection and is taken to the screen shown in FIG. 44.

Figure 44:
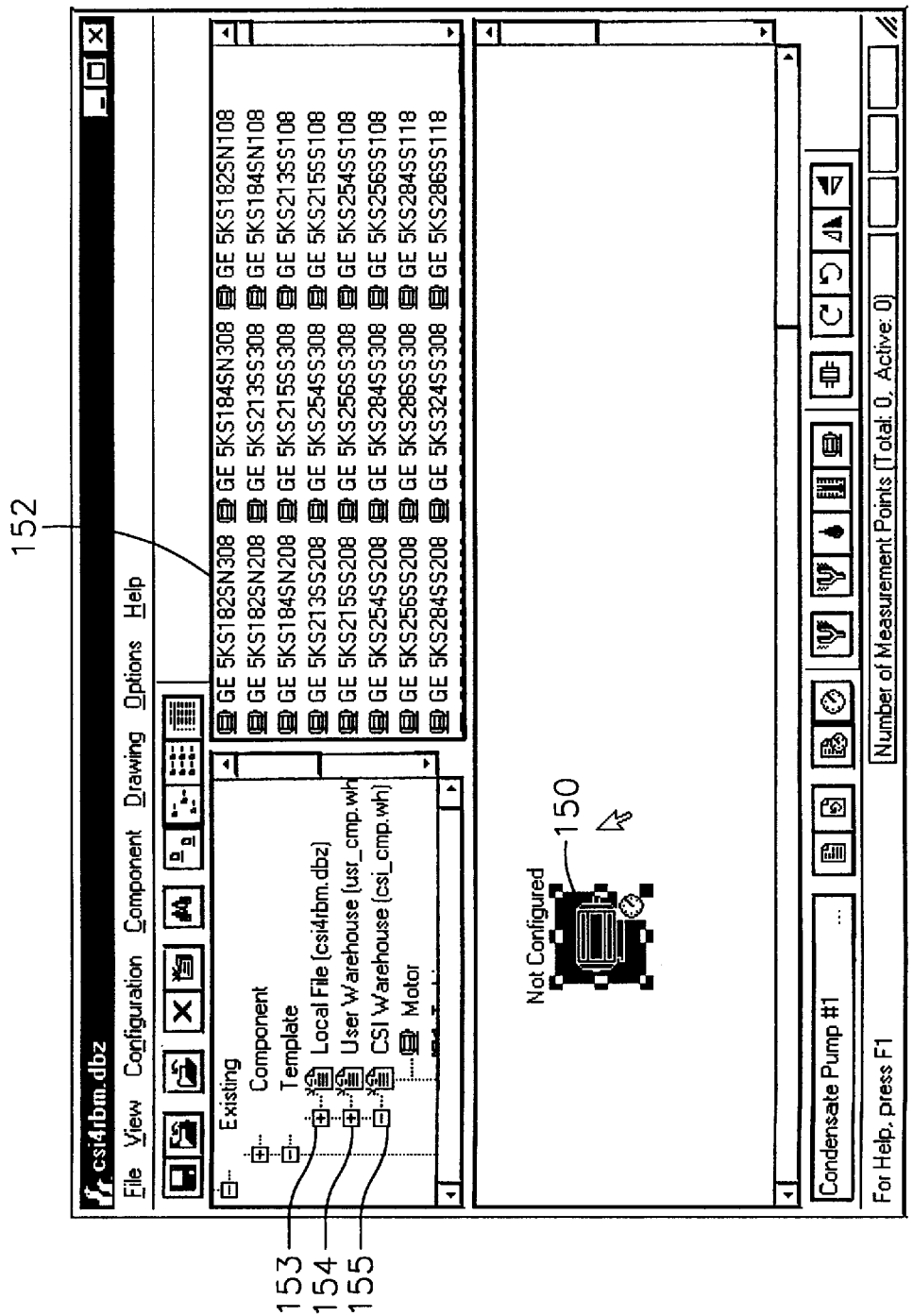
FIG. 44 is a user interface screen which enables the user to select from a list of known motor types for use in configuring the condensate pump.

In FIG. 44, it can be seen that the template 146 may be selected from a local file 153, a user-defined component warehouse 154, or a read-only component warehouse 155. The local file 153 includes templates that the user 48 will reuse only in the present database. Typically, such templates are created for equipment that can be found at only one site. The user warehouse 154 includes templates which have been configured and stored by the user 48 and can be edited, and the supplier warehouse 155 includes templates provided by the program 40 supplier and cannot be edited. A list of standard motor types contained in the supplier warehouse 155 are displayed in box 152, and a motor 150 has been selected from the list. Although there is template information present in the component warehouse 155 for the selected motor 150, the motor 150 is considered to be unconfigured at this point since the physical characteristics have not yet been defined.

Figure 45:
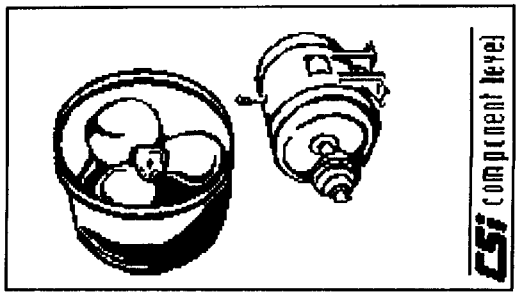
FIG. 45 is a user interface screen prompting the user for general information corresponding to the condensate pump motor.
Figure 46:
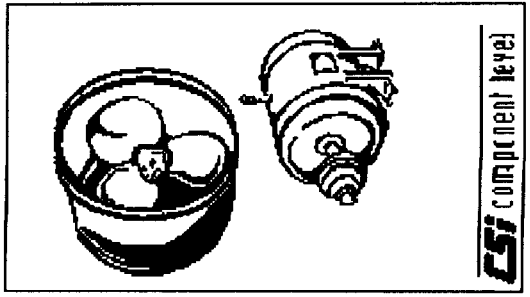
FIG. 46 is a user interface screen for displaying motor construction information.

General component definition information is provided by the user 48 in FIG. 45 (see also FIG. 12). The motor component will be created based on the information contained in the template identified in box 156, which is grayed out and not editable since this template is part of a predefined component warehouse that was provided with the program 40. Information corresponding to motor construction and bearing types is grayed out in FIGS. 46 and 47 (see also FIG. 14) as well. Thus, while the information can be displayed, it is not changeable by the user 48.

Figure 47:
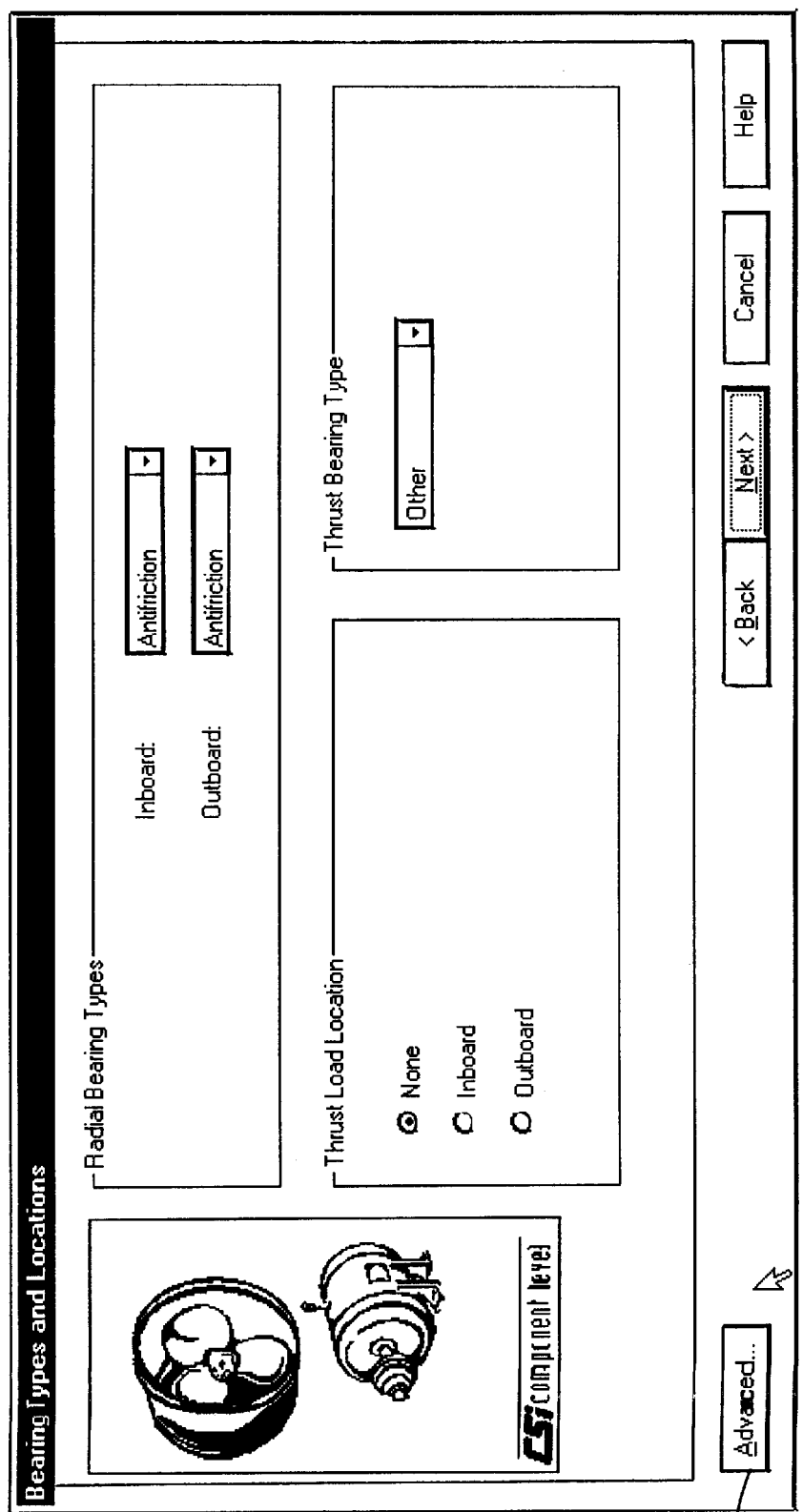
FIG. 47 is a user interface screen for displaying motor bearing information.
Figure 48:
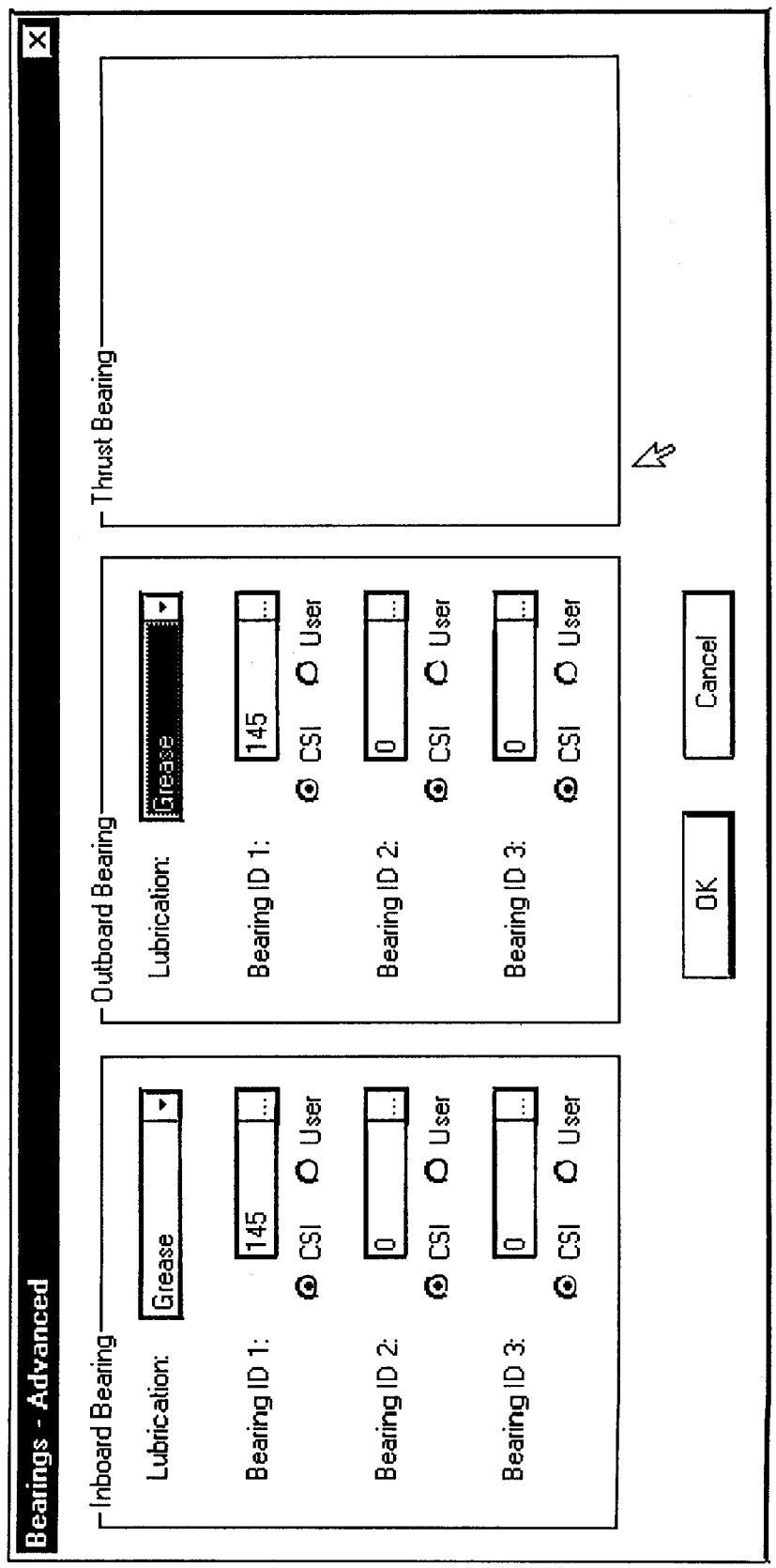
FIG. 48 is a user interface screen for displaying additional bearing information.

Detailed bearing information is required, however, and this information is defined by clicking the "Advanced" button 158 which brings up the screen shown in FIG. 47. By clicking on next, the bearing screen shown in FIG. 48 is displayed. The bearing information shown in this screen has been input by the user 48.

Figure 49:
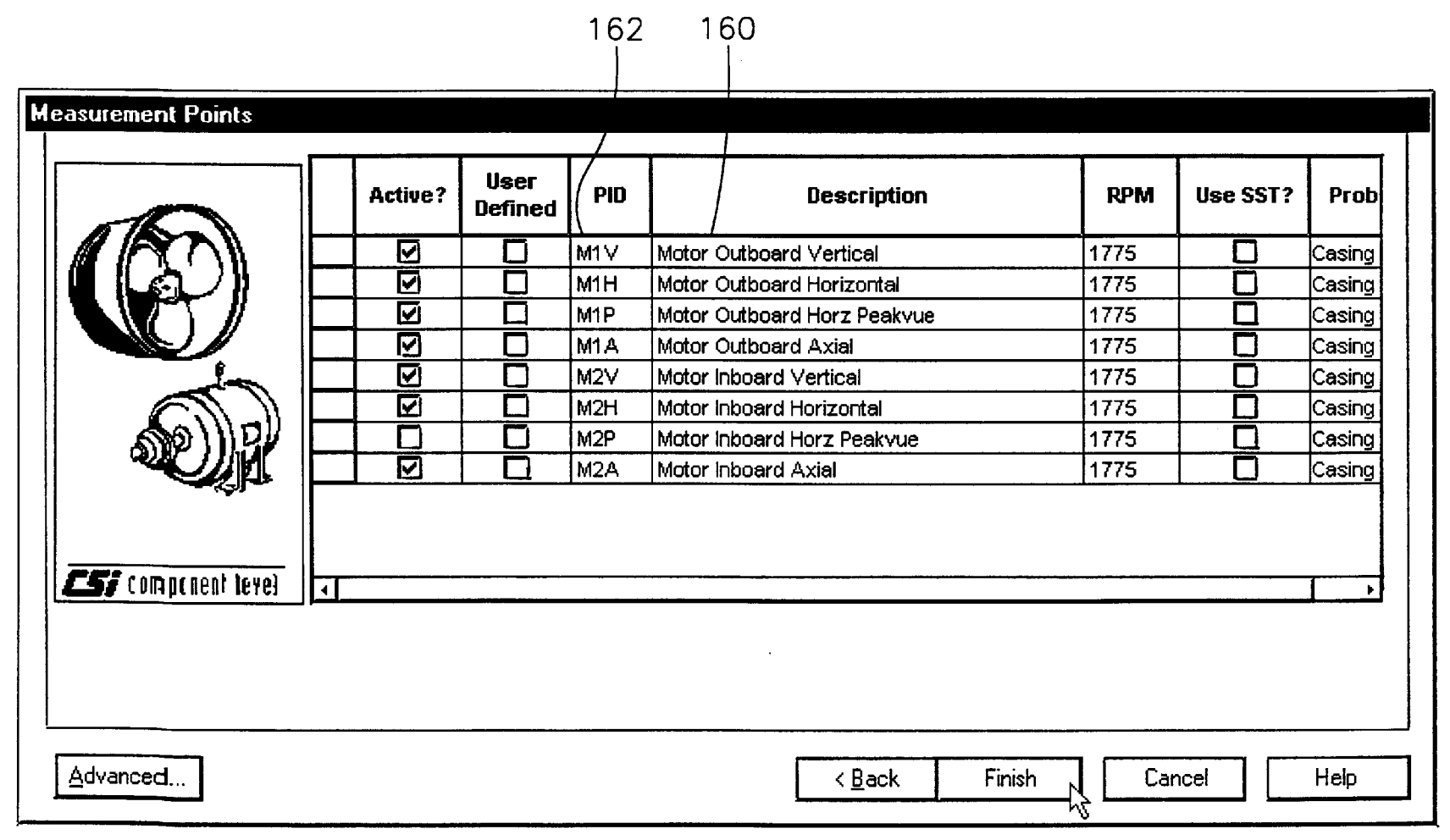

After the above information has been provided, measurement points 160 and corresponding identifiers 162 are created and displayed as shown in FIG. 49. The measurement points 160 can be edited by the user 48.

Figure 50:
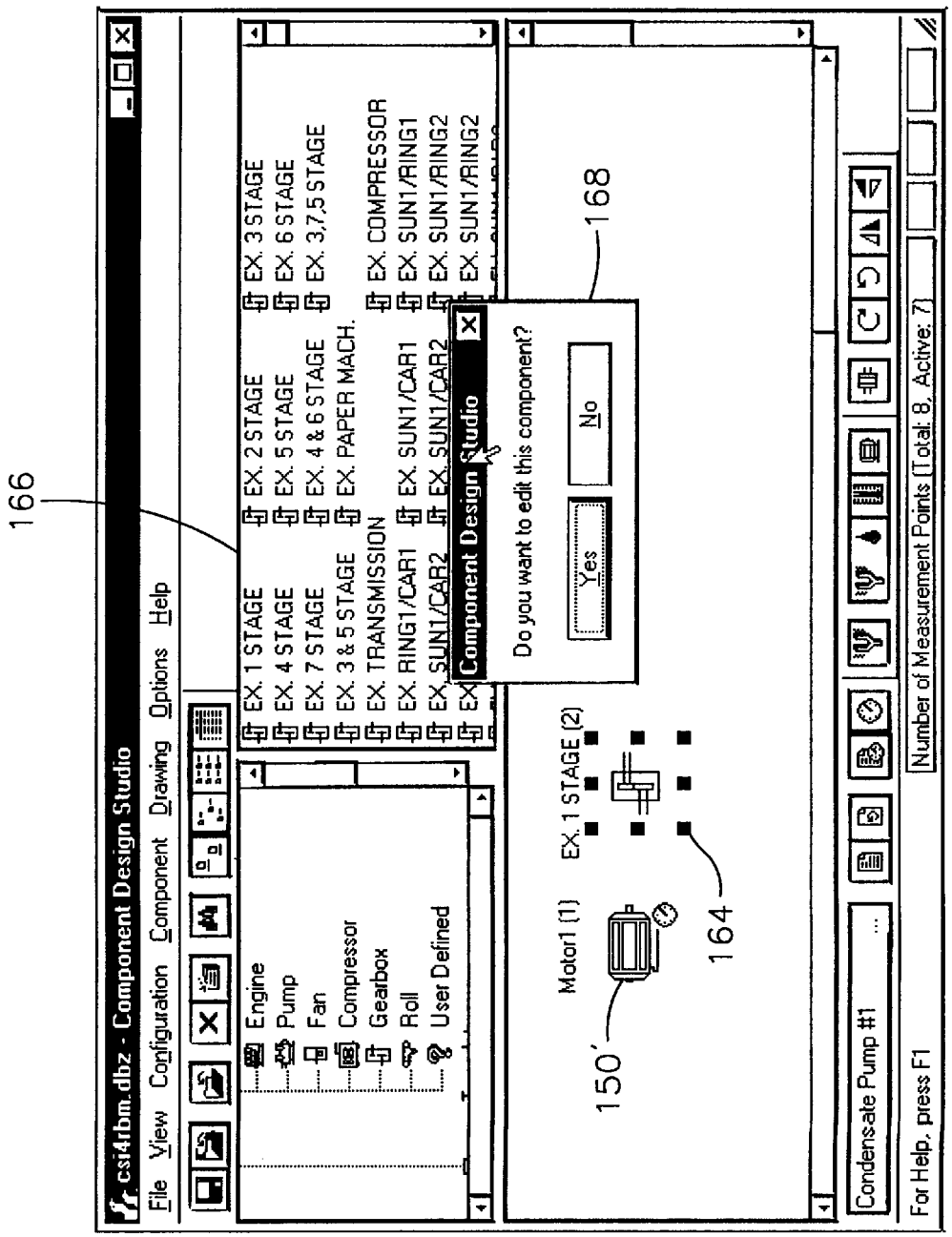
FIG. 50 is a user interface screen showing configured and unconfigured components of the condensate pump.
Figure 51:
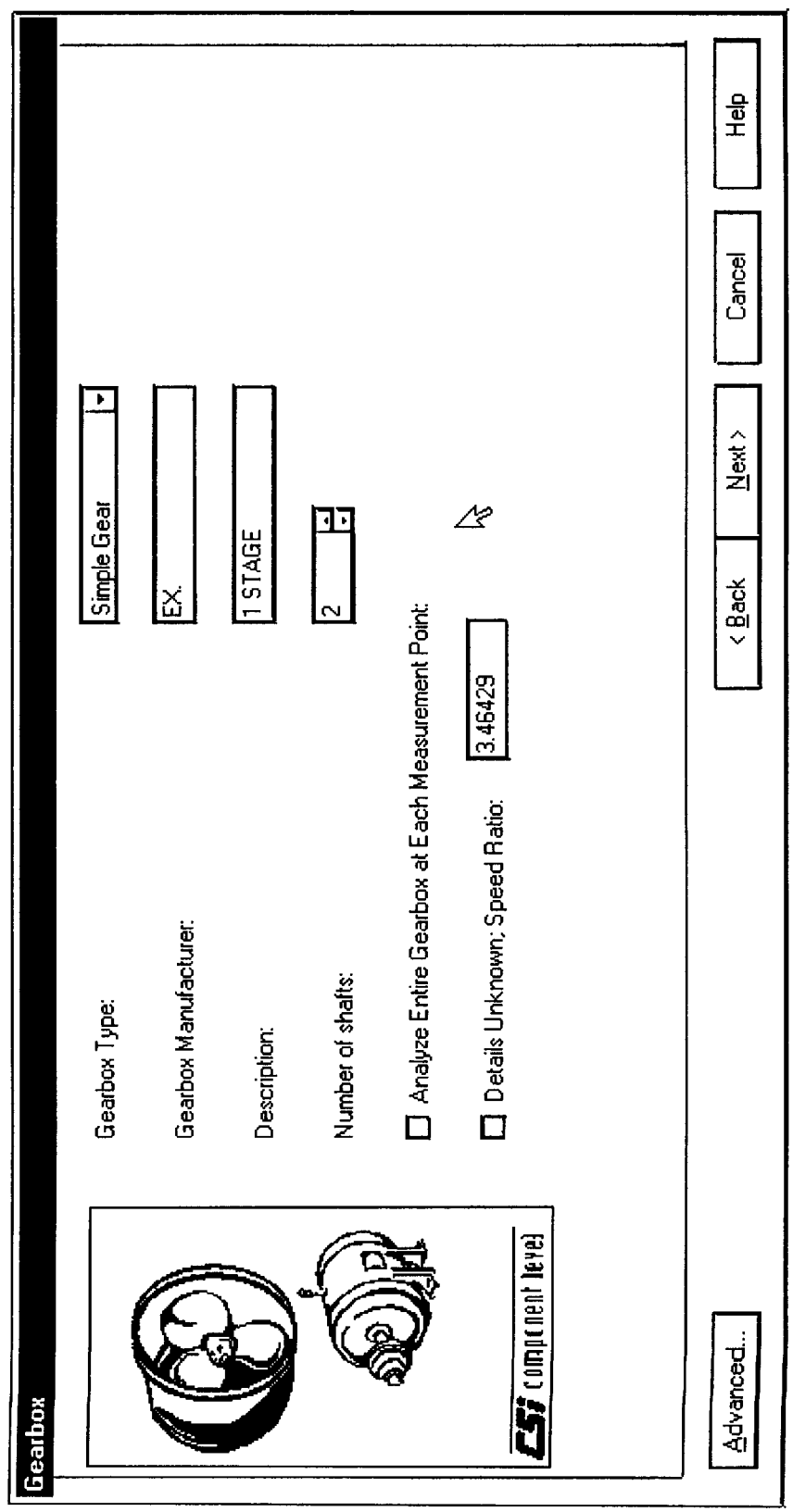
FIG. 51 is a user interface screen showing information corresponding to a component of the condensate pump.

In FIG. 50, the motor 151' is now configured. The user 48 has selected a gearbox 164 from a list of predefined gearbox components displayed in box 166. A popup box 168 prompts the user 48 as to whether the gearbox should be edited. Clicking "Yes" takes the user 48 to the screen shown in FIG. 51. Since all information relating to the gearbox has been predefined in the component warehouse, the user 48 may only examine the information shown in FIG. 51.

Figure 52:
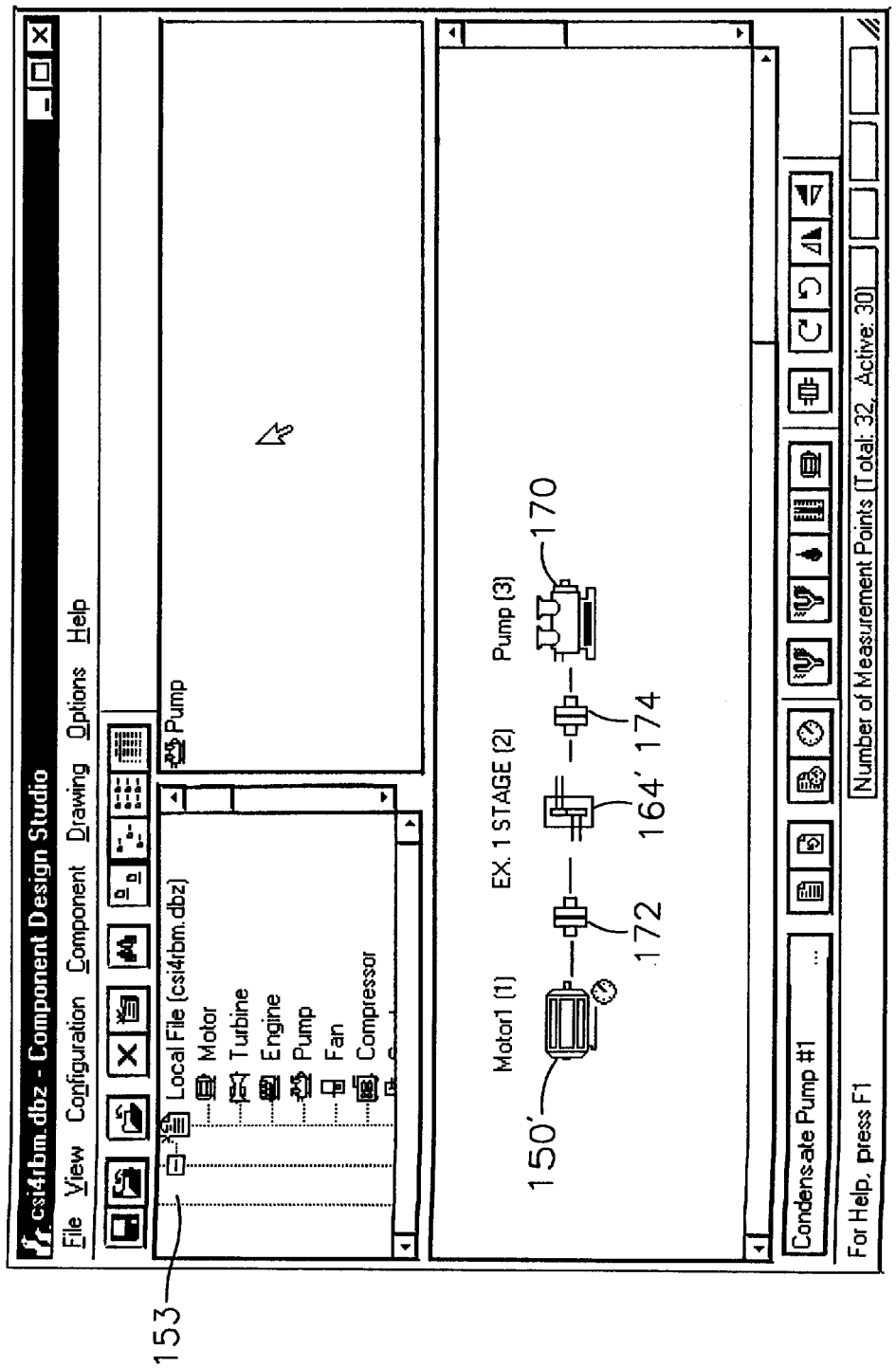
FIG. 52 is a user interface screen showing a completely configured condensate pump.
Figure 54:
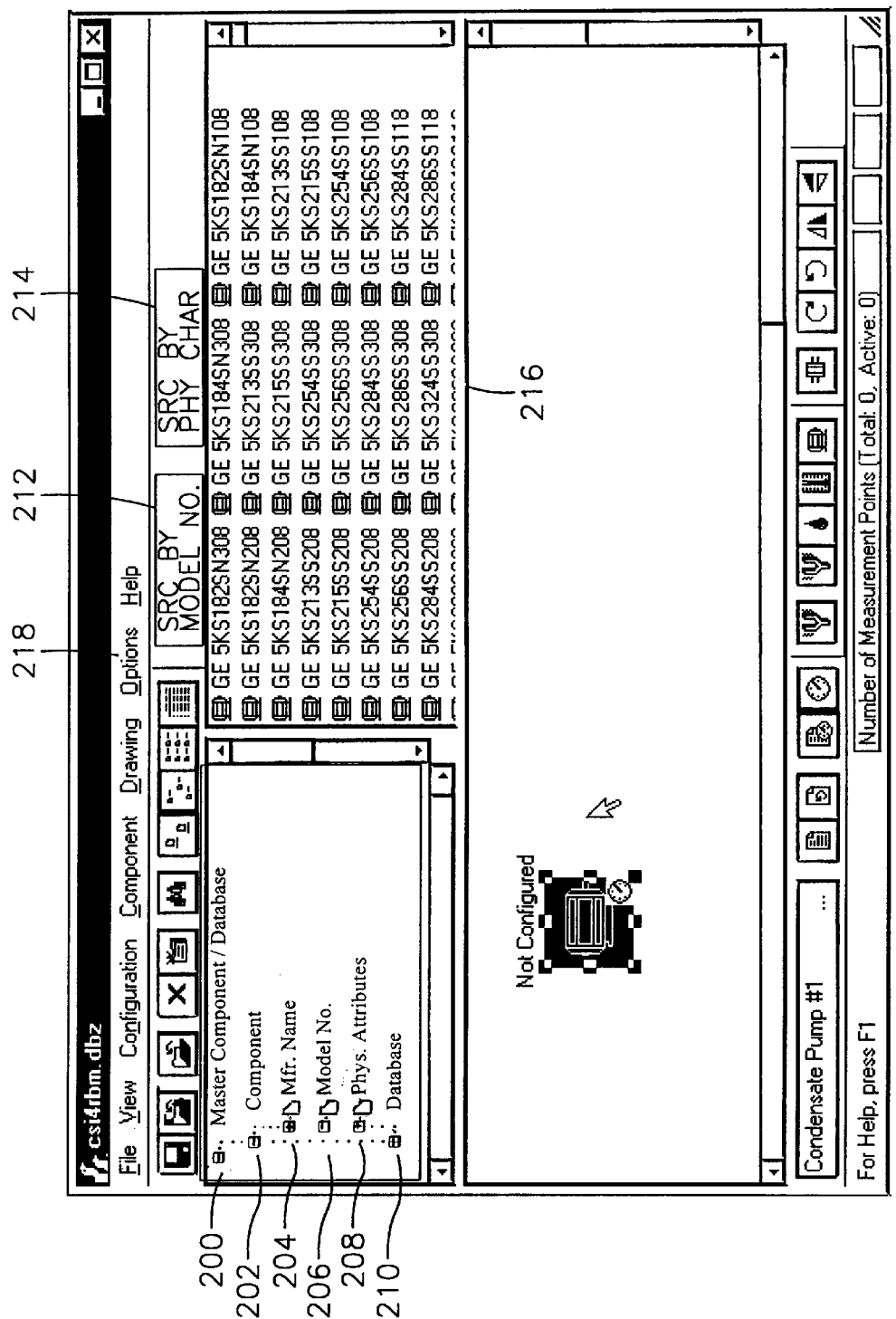
FIG. 54 is a user interface screen showing a master component/database file and related data fields for constructing a predictive maintenance database using a lookup technique.

In FIG. 52, the "condensate pump #1" configuration has been completed. The configuration includes the motor 150', gearbox 164', a pump 170 which was selected from the local file 153 and not edited, a coupling 172 interconnecting the pump 150' and gearbox 164', and a coupling 174 interconnecting the pump 170 and gearbox 164'. The user 48 is now ready to insert this information into his predictive maintenance database as described above with reference to FIGS. 31–33 (note that FIG. 32 includes the "condensate pump #1") and to view or edit the new database information as described in FIGS. 34–41.

As previously mentioned, there is no unique correct knowledge base 52 or inference engine 46. Both must necessarily be constructed according to a particular application. The knowledge base 52 is a set of information and rules. The information is physical data and the rules relate different types of physical data one to the other. For example, a rule could relate a particular motor type of a particular physical description to a set of measurement points. The knowledge base 52 does not directly relate anything to a predictive maintenance database.

The inference engine 46 relates data in the knowledge base 52 and data generated by the knowledge base and its rules, collectively or individually, to a particular set of data in a predictive maintenance database. Since these concepts are somewhat complicated, they may best be understood by reference to a simplified example of a knowledge base 52 and inference engine 46 as given below in Example 3.

EXAMPLE 3

In this example, information for a predictive maintenance database will be created for an AC induction motor. The following information was known about the motor and was input to the program 40 to configure the motor:

Number of Phases: 3
Number of Poles: 2
Number of Rotor Bars: 68

Number of Stator Slots: 54
Inboard Bearing: antifriction
Outboard Bearing: antifriction
Shaft RPM: 3575
Probe Type: casing
Line Frequency: 60 Hz Based on this information, the following steps illustrate how the analysis parameter and alarm limit sets were created by the program 40. It is worth noting that it is common for a user 48 to not know all of the information given above. As previously described, minimal information is needed for the program 40 to create the analysis parameter sets and alarm limit sets. For rotating equipment such as AC induction motors, the absolute minimum information needed is the specification of an equipment type and the speed of the equipment.

Analysis Parameter Set Creation

Step 1: The first rule for an AC induction motor is to create the analysis parameter (AP) set and alarm limit (AL) set based on bearing type and name the sets as follows:
Create AP Set="AC MTR,ROLLING BRG"
Create AL Set="AC MTR,ROLLING BRT"

Step 2: Next, following rules for AC motors, the inference engine 46 will in the measurement details of the analysis parameter set as follows:
Set the Maximum Analysis Frequency=70.5 Orders
Set the Minimum Analysis Frequency=0.0 Orders
Set the Lines of Resolution=1600 lines
Set Number of Averages=5
Set Spectral Averaging Mode=Normal Mode
Set Window Type=Hanning
Set Spectral Weighting=None
Set Perform 1/3 Octave Analysis=False
No special signal processing parameters will be used.
A special time waveform will be collected in acceleration units with the maximum time in the waveform based on a spectral Fmax of 80 orders with 1024 points in the waveform.

The number of lines of resolution selected was based on the following rules:
IF 3000<Turning Speed, THEN
Set # Lines=1600
IF 800<Turning Speed≦3000, THEN
Set # Lines=800
IF Turning Speed≦800, THEN
Set # Lines=400

Since the Turning Speed=3575 was greater than 3000, the number of lines set=1600.

Step 3: The remaining details of the parameter set forth above are default settings for this type of AC induction motor. For this type motor, the rules provide that the following parameter bands will be measured for trending:
Peak to Peak Waveform band (Overall Amplitude)
Crest Factor Waveform band (Overall Amplitude)
Subharmonic Frequency band (0.0 to 0.8 orders)
1×Turning Speed Frequency band (0.8 to 1.4 orders)
2×Turning Speed Frequency band (1.4 to 2.4 orders)
3×to 8×Turning Speed Frequency band (2.4 to 8.4 orders)
9×to 25×Turning Speed Frequency band (8.4 to 25.4 orders)
25×to 75×Turning Speed Frequency band (24.4 to 75.4 orders)
1 kHz to 20 kHz High Frequency band (1000 to 20,000 Hz)

Step 4: The following parameters bands will be created based on certain rules:
2×Line Frequency band (115 to 125 Hz)
The creation of this band is dependent on the Line Frequency and the following rule:
SET LF=Line Frequency, THEN
SET HZ AP Band to Monitor: High freq=(2*LF)+5, Low Freq=(2*LF)−5
The default value will be 60 Hz, which is the line frequency standard in North America.
Based on the above rule, the parameter band for 2×Line Frequency band will trend the frequency range between 115 Hz to 125 Hz.

Step 5: Next, the inference engine 46 creates a parameter band to trend the frequency related to the number of rotor bars and a parameter band to trend the frequency related to the number of stator slots.
Rotor Bar Pass Frequency band (63.0 to 73.0 orders)
Stator Slot Frequency band (49.0 to 59.0 orders)

These frequency ranges were determined based on the following rule:
IF Number of Stator Slots and Rotor Bars is known,
ANDIF Number of Stator Slots>21
AND Number of Stator Slots is divisible by 3, THEN
Assume # of Rotor Bars and Stator Slots is correct
ELSE Assume Stator and Rotor Bars is incorrect and use 0.0 for each.
Rotor Bars pass freq range=(#rotor bars−5) to (#rotor bars+5) orders
Sator Slot pass freq range=(#stator slots−5) to (#stator slots+5) orders Based on the number of rotor bars=68 and the number of stator slots=54 and the above rule, the Rotor Bar Pass Frequency band will trend the amplitude of the frequencies between 63.0 and 73.0 orders while the Stator Slot Frequency band will trend the amplitude of the frequencies between 49.0 to 59.0 orders.

Alarm Limit Set Creation

The alarm limit set created by the inference engine 46 will include alarm limits appropriate for each of the parameter bands described above. The alarm limit values are based on the type of equipment and the alarm criteria specified by the user 48. For this example, the alarm criteria was set to moderate. If the alarm criteria had been set to "smooth", the default alarm levels would be set at alarm limits which are lower than those for the "moderate" setting. Conversely, if the alarm criteria had been specified as "rough", the default alarm levels would be set at alarm limits higher than those for the "moderate" setting.

Measurement Points

FIG. 53 is a table of candidate measurement points which the program 40 uses as rules to determine, based on the operational significance defined by the user 48, which measurement points will be generated for an AC induction motor. The values of 1–5 are used in FIG. 53 to indicate operational significance where "critical" corresponds to an operational significance value of "1", "essential" corresponds to "2", "important" corresponds to "3", "secondary" corresponds to "4", and "non-essential" corresponds to "5". In this example, the operational significance of the motor was set as "essential" which equates to an operational significance of "2" in the table shown in FIG. 53. Accordingly, each candidate measurement point for which a check mark appears in column 2 was selected as a measurement point for the motor.

In summary, the above examples and description explain how the analysis parameter sets, alarm limit sets, and measurement points are selected by the program 40 based on information provided to the program 40 by the user 48. The selections are made based on rules known by the program's inference engine 46. The inference engine rules are preferably accepted industry practices which are likely to be unknown to a novice user of the program 40.

The rules are designed to produce a predictive maintenance database which will allow the user 48 to collect predictive maintenance data more correctly for each type of equipment that is to be monitored, even when minimal information is known about each piece of equipment, thereby enabling the user 48 to achieve a greater degree of analysis accuracy with significantly less information, experience, and time.

It will be appreciated, however, that the rules are not invariable. For example, in some applications it may be unnecessary or undesirable to determine operational significance, and in such case, there would be no need for rules related to operational significance. Thus, the rules can and should be changed for different circumstances.

Lookup Technique

While it is preferred to use an inference engine 46 and knowledge base 52 as described above, the invention may be implemented with a more simplistic lookup technique or combination of both the lookup technique and the inference engine technique. In the latter case, the user can choose between the two techniques.

As shown in FIG. 53, the lookup technique is selected from the pull-down menu labeled "Options" 218. The lookup technique is preferably implemented by providing a Master Component/Database file 200 that contains at least two fields of data, namely, a component identification field 202 and a database information field 210, each corresponding to a particular component, such as a motor or a pump. While it would be possible to use a single component identification field and a single database information field, in most applications these two "fields" will actually be a group of related fields. For example, the component identification field may include a separate field for the manufacturer's name 204, the model number 206, and each physical attribute 208 such as the horsepower rating of a motor or the number of rotor bars in a motor. Likewise, the database information field will normally include many different fields such as those disclosed in FIGS. 34–41.

To build a database using the lookup technique, the user 48 first uses the component identification field 202 to find and select a record in the master component/database file 200 corresponding to the component to be monitored. When the component record is selected, either automatically or by the user 48, the database information (or record) found in the master component/database file 200 is added to the database that is being built.

As mentioned above, the component identification field 202 may contain a number of fields containing physical attributes or physical descriptions of the component or a manufacturer and model number, and it preferably has both. To select a component, the user 48 first names the component in the same manner as discussed above with reference to FIG. 6. The user 48 may also provide an operational significance and alarm information as discussed above, but this is not required.

After naming the component, a corresponding component record may be found in the master component/database file 200 by two basic techniques. In one technique, the user 48 provides physical criteria describing the physical component. For example, the user may provide the following physical criteria of a component such as a motor: 3 phases, 2 poles, 68 rotor bars, 54 stator slots, rated RPM of 3575, rated horsepower of 25, rated voltage of 440 volts and rated current of 200 amps. When the user 48 is finished entering the physical criteria, he initiates a search, such as by clicking on a search button 212, 214, and the program 40 searches the physical attributes in the component identification field 202 for the best fit. The program 40 may automatically select the best fit component record from the master component/database file 200 and automatically add the selected record to the database being built. However, preferably, the program 40 may also display a best fit group of component records and allow the user 48 to select one record. The best fit group would usually include all of the component records that exactly fit the physical criteria provided by the user 48, plus additional records that had physical attributes that were near the physical criteria provided by the user 48.

The best fit group of records is prioritized with the most likely candidate record listed earlier or higher in the best fit group. Priority may be based on the closeness of the fit and/or the prevalence or popularity of the component in the market. For example, a component priority could be proportional to the quantity of the component manufactured or the quantity of the components in use in a particular market.

When the user 48 selects one record from the best fit group, such as by clicking on it, that selected record is associated with the name of the component previously provided by the user 48, and the combined information is added to the database being created as another record. In this lookup technique, the database information is contained in the master component/database file 200 and there is no need to perform any operations on the information in the master component/database file 200 in order to generate database information for the database being created.

The other way of selecting a component record from the master component/database file 200 is by using the manufacturer and model number. In this case, the user 48 inputs the model number, which preferably includes the manufacturer as shown in block 216 of FIG. 53 (i.e., "GE" represents General Electric as the manufacturer), and the program 40 searches the identification field for a record having the exact model number. If an exact match is found, it is either automatically chosen and the database being created is updated with the chosen record as described above, or the record having the exact match is displayed. Whether the selection is made automatically or manually is preferably determined by a user option.

If more than one exact match is found, all of the exact matches are displayed and the user is requested to select one. If no exact matches are found, a best fit group is displayed in the manner described before. The group is prioritized in an order based upon the closeness of the model number in a record as compared to the model number provided by the user and based upon the popularity or prevalence of each component in the group.

The searching capabilities described above provide significant advantages over known predictive database programs. While it was certainly possible to copy portions of databases produced by prior art programs and attach such copies to another database, there was no specialized searching capability for finding what needed to be copied. To the extent that one database was used to make another, it was generally a manual process. In the lookup technique described herein, the searching capability enables the user to build a database systematically using some information about the machine or machines for which the database is being built. The searching feature is flexible in that a variety of information may be used to conduct the search, including physical information, model numbers or manufacturers. In addition the program provides for building a configuration composed of more than one machine and using the lookup technique for building a database for the overall configuration. In such case the lookup technique searches the master component/database file 200 first for the specific combination of machines, such as a particular pump, coupling and pump. If the specific combination is found, it is used to construct the database. If the combination is not found, the master component/database file 200 is searched for the individual machines seperately and the database information for each machine is combined to produce the database for the overall configuration.

It will be appreciated that the lookup technique requires the use of a master component/database file 200 that is typically much larger than any file necessary when the inference engine technique is used. To facilitate operations, the master component/database file 200 may actually exist as a number of files. For example, a separate file may be created for different types of components. A separate file may be provided for pumps, gear boxes, motors, etc. Also, separate files may be provided for different sub-categories of components, such as induction motors versus synchronous motors. Also, conventional searching techniques and enhancements would be used for searching and finding data within the files. Preferably, the data in all of the fields would be indexed to enhance searching.

If alarm information and/or operational significance information is to be included in the lookup technique, the database generated by the technique must reflect the operational significance and/or the alarm level provided by the user 48. One way to incorporate operational significance into the lookup technique is to provide multiple entries (records) for the same component, with a separate record for each operational significance. In other words, if there were three levels of operational significance that a user 48 could choose, each component in the master component/database file 200 would require three separate records, one for each operational significance. Likewise, if alarm levels are used, each component must have a separate record for each alarm level. If both operational significance and alarm level is provided, the master component/database file 200 should have a separate record for each combination of operational significance and alarm level. For example, a first record must be provided for alarm level one, operational significance one, and a second record must be provided for alarm level one, operational significance two. It will be appreciated that the use of alarm levels and operational significance can cause the master component/database file 200 to grow dramatically.

To avoid this type of growth in the size of the files, one may blend the inference engine technique and the lookup table technique. For example, the lookup technique could be used to produce preliminary database information based solely on the component identity ignoring alarm level and operational significance. Then, an inference engine 46 or a set of rules can be used to modify the preliminary database information based upon both the alarm levels and the operational significance provided by the user 48.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A method for establishing a predictive maintenance database in a computer that defines information needed for a user to monitor components in accordance with a predictive maintenance plan, comprising:

identifying a component type corresponding to a particular component to be monitored;

providing a master file of information that includes at least component identification information and corresponding additional information related to measurements needed by the predictive maintenance plan;

searching the master file for component identification information corresponding to the identified component type to produce at least one set of component identification information and selecting a set of selected component identification information from the at least one set of component identification information; and constructing database information for a predictive maintenance database for the component to be monitored using the set of selected component identification information and the additional information corresponding to the set of selected component identification information.

2. The method of claim 1 wherein said providing step further comprises:

providing a knowledge base in the computer that defines relationships between monitoring practices, component types and physical characteristic information for component types; and providing an inference engine in the computer;

and wherein said constructing step further comprises:

operating in part on said knowledge base with said inference engine to construct database information.

3. The method of claim 1 wherein said providing step includes providing component identification information in the form of a model number for components, and wherein said searching step includes selecting a best fit set of component identification information representing the closest relationship between a set of component identification information and the identified component type.

4. The method of claim 1 wherein said searching step includes searching the master file based on model number.

5. The method of claim 1 wherein said searching step includes searching the master file based on physical criteria of the component.

6. A method for establishing a predictive maintenance database in a computer that defines information needed to monitor components in accordance with a predictive maintenance plan, comprising:

identifying a component type corresponding to a particular component to be monitored;

identifying physical characteristic information corresponding to the identified component type and the particular component to be monitored;

providing a knowledge base in the computer that defines relationships between monitoring practices, component types and physical characteristic information for component types;

providing an inference engine in the computer for operating in part on said knowledge base to construct predictive maintenance databases; and constructing information for a predictive maintenance database for each component to be monitored using the inference engine operating on the knowledge base, the selected component type and the selected physical characteristic information.

7. The method of claim 6 wherein constructing said database information further comprises defining the type of data to be measured for the identified component type and defining measurement points on the component from which data will be measured.

8. The method of claim 6 wherein said constructing step further comprises defining an analysis parameter set including set-up parameters for use by a data collection instrument to collect data in accordance with the predictive maintenance database.

9. The method of claim 6 wherein said constructing step includes defining an alarm limit set including alarm limits delineating normal and abnormal component operation for data measured in accordance with the database.

10. The method of claim 6 wherein said constructing step includes recommending a plurality of measurement points for measuring operating characteristics of the component in accordance with the predictive maintenance plan.

11. The method of claim 10, wherein said constructing step further comprises specifying a recommended type of component operating characteristic to be measured at each of said plurality of measurement points.

12. The method of claim 11, wherein said constructing step further comprises specifying a recommended alarm limit delineating normal and abnormal component operation for a recommended type of component operating characteristic to be measured at a particular one of the plurality of measurement points.

13. The method of claim 10, further comprising:
providing and displaying an image illustrating the component type; and
displaying locations on the component image corresponding to one or more of said plurality of measurement points.

14. The method of claim 6, further comprising obtaining data in accordance with the predictive maintenance database.

15. The method of claim 6, further comprising specifying an operational significance of the selected component type.

16. The method of claim 6, further comprising editing information contained in the knowledge base.

17. The method of claim 6, further comprising storing the identified component type and physical characteristic information as stored user-defined components, and selecting one of the stored user-defined components to thereby identify a component type and physical characteristic information for establishing additional predictive maintenance databases.

18. The method of claim 6 wherein said identifying steps include:
providing a warehouse containing a list of component types and associated physical characteristic information; and
selecting a component type from said list.

19. The method of claim 18, further comprising modifying information contained in the warehouse.

20. The method of claim 6 further comprising specifying a measurement technology for use in monitoring a component type and wherein said constructing step produces a predictive maintenance database corresponding to said measurement technology.

21. A programmable apparatus for establishing a predictive maintenance database defining information needed to monitor components in accordance with a predictive maintenance plan, the apparatus comprising:

a memory having a knowledge base defining relationships between monitoring practices, component types and physical characteristic information for component types;
a data processor having an inference engine for operating in part on said knowledge base to construct database information for a predictive maintenance database; and
a user interface for inputting user commands to the data processor including commands that:
(a) identify a component type corresponding to a particular component to be monitored;
(b) identify physical characteristic information corresponding to the identified component type and the particular component to be monitored; and
said data processor further comprising means for constructing information for a predictive maintenance database for each component to be monitored using the inference engine operating on the knowledge base, the selected component type and the selected physical characteristic information.

22. The apparatus of claim 21 wherein said data processor is further operable to operate in part on said knowledge base to construct a predictive maintenance database defining measurement points, monitoring schedules, data to be measured, and alarm limits delineating normal and abnormal component operation to be applied to the measured data.

23. The apparatus of claim 21 wherein said data processor is further operable to construct a predictive maintenance database by defining an analysis parameter set which includes set-up parameters for use by a data collection instrument to collect data in accordance with the predictive maintenance plan.

24. The apparatus of claim 21 wherein said data processor is further operable to construct a predictive maintenance database by defining an alarm limit set including a plurality of alarm limits delineating normal and abnormal component operation for data measured in accordance with the database.

25. The apparatus of claim 21, further comprising:
a display connected to said data processor for displaying the images of the component types.

26. A method for establishing a predictive maintenance database in a computer that defines information needed for a user to monitor components in accordance with a predictive maintenance plan, comprising:
displaying a plurality of component groups, prompting a user to select at least one of the component groups, and receiving a user input identifying a selected component group corresponding to a particular component to be monitored;
displaying a plurality of component types corresponding to the selected group, prompting the user to select at least one of the component types, and receiving a user input identifying a selected component type corresponding to the particular component to be monitored;
displaying physical characteristic types corresponding to the selected component type, prompting the user to provide physical characteristic information corresponding to the physical characteristic types to further define the particular component to be monitored, and accepting physical characteristic information provided by the user;
providing a knowledge base in the computer that defines relationships between monitoring practices and component types and physical characteristic information for component types;
providing an inference engine in the computer for constructing database information for a predictive maintenance database based in part on said knowledge base;

using the knowledge base to select measurement specifications based on the selected component type and the physical characteristic information provided by the user; and constructing database information for the predictive maintenance database for the particular component to be monitored using the inference engine operating on the knowledge base, the selected component type, the selected physical characteristic information, and the user defined measurement specifications.

27. The method of claim 26, further comprising prompting a user to accept or modify the measurement specifications and producing user defined measurement specifications based on the user's response to said prompting.

28. The method of claim 26, further comprising obtaining predictive maintenance data in accordance with the predictive maintenance database constructed for the components to be monitored.

29. The method of claim 28 further comprising the step of comparing predictive maintenance data to a criterion, and indicating an alarm condition when the criterion is met.

30. The method of claim 26 further comprising: defining the type of data to be measured for the identified component type, and constructing the predictive maintenance database to correspond to the type of data.

31. The method of claim 26 wherein said constructing step includes defining an analysis parameter set including set-up parameters for use by a data collection instrument to collect data in accordance with the predictive maintenance database.

32. The method of claim 26 wherein said constructing step includes defining an alarm limit set including alarm limits delineating normal and abnormal component operation for data measured in accordance with the database.

33. The method of claim 26, further comprising storing the selected component type and the selected physical characteristic information for use in establishing further predictive maintenance databases.

34. A method for establishing a predictive maintenance database in a computer that defines information needed for a user to monitor a configuration of components defined by a plurality of interconnected components in accordance with a predictive maintenance plan, comprising:

defining a configuration of components by:
displaying a first plurality of component groups,
prompting a user to select at least one of the component groups to produce a first selected group,
receiving a user input identifying a first selected component group, corresponding to a first component in the configuration;
displaying a first plurality of component types corresponding to the first selected group,
prompting the user to select at least one of the component types to produce a first selected component type,
receiving a user input identifying a first selected component type corresponding to the first component;
displaying physical characteristic types corresponding to the first selected component type,
prompting the user to provide physical characteristic information corresponding to the physical characteristic types to further define the first selected component type,
accepting physical characteristic information provided by the user;
displaying a second plurality of component groups,
prompting a user to select at least one of the component groups to produce a second selected group,
receiving a user input identifying a second selected component group corresponding to a second component in the configuration;
displaying a second plurality of component types corresponding to the second selected group,
prompting the user to select at least one of the component types to produce a second selected component type,
receiving a user input identifying a second selected component type corresponding to the second component;
displaying physical characteristic types corresponding to the second selected component type,
prompting the user to provide physical characteristic information corresponding to the physical characteristic types to further define the second selected component type,
accepting physical characteristic information provided by the user corresponding to the second selected component type;
displaying a plurality of spatial orientations, interconnection arrangements, and types of couplings,
prompting the user to select a spatial orientation, interconnection arrangement, and coupling type,
receiving user inputs identifying a selected spatial orientation, interconnection arrangement, and coupling type to define a selected configuration corresponding to a physical interconnection between the first and second selected component types;

providing a knowledge base in the computer that defines relationships between monitoring practices, component types, and physical characteristic information for configuration types;

providing an inference engine in the computer for constructing database information for a predictive maintenance database based in part on said knowledge base;

using the knowledge base to select measurement specifications based on the selected configuration and the physical characteristic information provided by the user; and constructing database information for the predictive maintenance database for the particular configuration to be monitored using the inference engine operating on the knowledge base, the selected configuration, the selected physical characteristic information, and the user defined measurement specifications.

35. The method of claim 34, further comprising storing the selected configuration, the selected physical characteristic information, and the user defined measurement specifications for establishing further predictive maintenance databases.

36. A data processing apparatus for defining component configurations, the data processing apparatus including a user interface for receiving commands and data from a user and comprising:

a component design studio for displaying a plurality of component types, for responding to user inputs, to select a component type and for displaying the selected component type;

a first user interface screen responsive to user input and the selected component type for prompting the user to provide physical parameter information related to the selected component type and for accepting parameter information provided by the user; and processing means for defining a component configuration based upon at least the selected component type and the parameter information.

37. The apparatus of claim 36 further comprising:
a second user interface screen responsive to the selected component type for prompting the user to provide analysis information related to analysis of data and for accepting the analysis information that is input by the user; and
wherein said processing means is responsive to the selected component type, the parameter information and the analysis information for defining a component configuration.

38. The apparatus of claim 36 wherein said component design studio further comprises means for displaying a plurality of predictive measurement technologies and for responding to user inputs to select at least one predictive maintenance technology.

39. The apparatus of claim 38 when said first user interface screen is responsive to the selected predictive maintenance technology for prompting the user to provide parameter information corresponding to the selected predictive maintenance technology.

40. The apparatus of claim 36 further comprising:
a second user interface screen responsive to user input and the selected component type for prompting the user to provide analysis information related to analysis of data and for accepting analysis information;
said processing means being responsive to the selected component type, the parameter information and the analysis information for defining a component configuration;
said component design studio further comprising means for displaying a plurality of predictive maintenance technologies and for responding to user inputs to select at least one predictive maintenance technology; and
said first user interface screen and said second user interface screen being responsive to the selected predictive maintenance technology for prompting the user to provide, respectively, parameter information and analysis information corresponding to the selected predictive maintenance technology.

41. The apparatus of claim 36 wherein said computer design studio graphically displays a plurality of component types including couplings for being selected by a user, selects a plurality of component types based on user input, graphically displays the plurality of selected component types, graphically represents the position of each selected component type to each of the other selected component types and graphically represents couplings connected between other component types.

42. A method for graphically associating a plurality of machine components in a computer to define an equipment configuration for use in establishing a predictive maintenance database for the equipment configuration, comprising:
identifying a first component type corresponding to a first component to be monitored, said first component type having a plurality of first physical component parameters;
specifying first component information corresponding to one or more of said plurality of first physical component parameters;
producing a first component configuration from the identified first component type and first component information;
identifying a second component type corresponding to a second component to be monitored, said second component type having a plurality of second physical component parameters;
specifying second component information corresponding to one or more of said plurality of second physical component parameters;
producing a second component configuration from the identified second component type and second component information;
defining a physical coupling between the first component type and the second component type; and
producing an equipment configuration from the first component configuration, the second component configuration, and the physical interconnection.

43. The method of claim 42, further comprising:
associating with the first component type at least one of a plurality of measurement technologies to produce one or more selected measurement technologies; and
constructing a predictive maintenance database based on the identified first component type, the first component information, and said one or more selected measurement technologies.

44. A method for establishing a predictive maintenance database in a computer that defines information needed to monitor components in accordance with a predictive maintenance plan, comprising:
identifying a component type corresponding to a particular component to be monitored;
identifying physical characteristic information corresponding to the identified component type and the particular component to be monitored;
providing a set of rules in the computer which define relationships between monitoring practices, component types and physical characteristic information for component types;
associating a type of data to be collected with the identified component type and the identified physical characteristic information; and
constructing a predictive maintenance database for the particular component to be monitored using the set of rules operating on the identified component type, the identified physical characteristic information, and the type of data to be collected.

45. The method of claim 44 wherein said step of associating includes associating a vibration measurement technology as the type of data to be collected.

46. A programmable apparatus for establishing a predictive maintenance database defining information needed to monitor components in accordance with a predictive maintenance plan, the apparatus comprising:
a memory having a master file of information in the computer that includes at least component identification information and corresponding predictive maintenance database information that specifies the types of measurements needed by the predictive maintenance plan for each component in the master file;
a user interface for inputting user commands including commands that provide component identification information and thereby identify components to be monitored;
a data processor for receiving commands from the user interface and having a search engine for searching the master file for component identification information corresponding to an identified component to produce at least one set of component identification information and selecting a set of selected component identification information from the at least one set of component identification information; and said data processor further comprising means for constructing database information for a predictive maintenance database for an identified component to be monitored using the set of selected component identification information and the predictive database information corresponding to the set of selected component identification information.

47. The apparatus of claim 46 wherein said component identification information is selected from the following group: a manufacturer name for components, a model number for component, and physical criteria corresponding to physical characteristics of components.

48. The apparatus of claim 46 wherein said predictive database information is selected from the following group: a type of measurement analysis to be performed in accordance with the predictive maintenance plan, measurement point locations identifying points on components where predictive maintenenance data is to be measured in accordance with the predictive maintenance plan, and spectral analysis parameters to be employed for collection of spectral data.

49. The apparatus of claim 46 wherein said search engine further comprises means for automatically selecting a best fit set of component identification information representing the closest relationship between a set of component identification information and the identified component type.

50. The apparatus of claim 46 wherein said search engine further comprises means for producing a plurality of records of component identification information and selecting a best fit set of component identification information from the plurality of records of component identification information.

51. The apparatus of claim 46 wherein said search engine further comprises means for searching the master file based on at least one of the following group: manufacturer name, model number, and physical criteria of the component.

* * * * *

(12) EX PARTE REEXAMINATION CERTIFICATE (8240th)
United States Patent
Piety et al.

(10) Number: US 6,192,325 C1
(45) Certificate Issued: May 17, 2011

(54) METHOD AND APPARATUS FOR ESTABLISHING A PREDICTIVE MAINTENANCE DATABASE

(75) Inventors: Kenneth R. Piety, Knoxville, TN (US); Christopher G. Hilemon, Knoxville, TN (US); Todd W. Reeves, Knoxville, TN (US); Miodrag Glumac, Knoxville, TN (US); Michael D. Rich, Powell, TN (US)

(73) Assignee: Computational Systems, Inc., Knoxville, TN (US)

Reexamination Request:
No. 90/009,648, Dec. 8, 2009

Reexamination Certificate for:
Patent No.: 6,192,325
Issued: Feb. 20, 2001
Appl. No.: 09/153,690
Filed: Sep. 15, 1998

(51) Int. Cl.
*G06N 5/00* (2006.01)

(52) U.S. Cl. ................. 702/184; 702/183; 702/185; 714/5; 714/40

(58) Field of Classification Search .................. None
See application file for complete search history.

(56) References Cited

U.S. PATENT DOCUMENTS

| | | | |
|---|---|---|---|
| 4,520,674 A | 6/1985 | Canada et al. |
| 5,233,546 A | 8/1993 | Witte |
| 5,633,811 A | 5/1997 | Canada et al. |
| 5,663,894 A | 9/1997 | Seth et al. |
| 5,680,025 A | 10/1997 | Bowers, III et al. |
| 5,696,885 A | 12/1997 | Hekmatpour |
| 5,710,723 A | 1/1998 | Hoth et al. |
| 5,870,699 A | 2/1999 | Canada et al. |

OTHER PUBLICATIONS

"The MICROLOG Collector Model 6200," User Manual, Palomar Technology International, index and pp. 2–1–5–4 and appendix (1990).

Berry, "Proven Method for Specifying Both 6 Spectral Alarm Bands As Well As Narrowband Alarm Envelopes Using Today's Predictive Maintenance Software Systems ($3^{rd}$ Edition)," Technical Associates of Charlotte, Inc., North Carolina, pp. 7–1–70–56 (1993).

Brochure from SKF USA, Inc., "Trouble Free Operation Through Condition Monitoring," pp. 1–16 (1991).

Condition Monitoring Catalog from SKF USA, Inc., table of contents, pp. A–1–E–4, glossary and index (1991).

Diagnostic Instruments DI–1100 Operator's Guide Issue 2.2, table of contents, pp. R1, table of contents, 1–1–9–7, appendices A–1–D2 and index, Diagnostic Instruments Limited, 2 Michaelson Square, Kirkton Campus, Livingston, UK EH54 7DP (Mar. 1995).

(Continued)

*Primary Examiner* — Eric B Kiss

(57) ABSTRACT

The invention provides a computerized method and apparatus which enables a user, even one who has little or no predictive maintenance skills, to establish a predictive maintenance database that defines information needed to monitor equipment in accordance with a predictive maintenance plan. The type of equipment components to be monitored and associated physical characteristics of the components are input to a computer as an equipment configuration, which may include one or more interconnected components. The computer includes a knowledge base that defines relationships between monitoring practices, component types, and physical characteristic information for component types. A predictive maintenance database is constructed for the components using the inference engine operating on the knowledge base, the selected component type, and the selected physical characteristic information. Multiple measurement technologies may be specified for each component. Preferably, for each measurement technology specified, the predictive maintenance database includes measurement points, an analysis parameter set, and an alarm limit set. Equipment configurations may be defined by the user, or they may be stored in a configuration/component warehouse with little or no configuration definition required of the user.

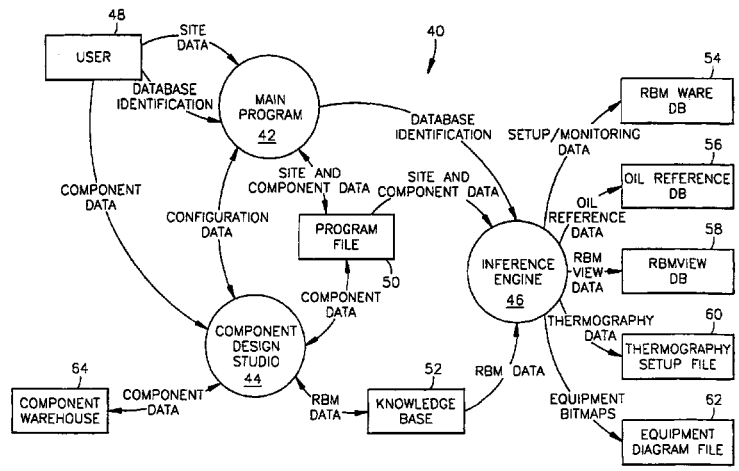

OTHER PUBLICATIONS

Diagnostic Instruments DI–650 Operator's Guide Issue 1, pp. R1, table of contents, 1–1–7–10, appendices A1–C2 and index, Diagnostic Instruments Limited, 2 Michaelson Square, Kirkton Campus, Livingston, UK EH54 7DP (Aug. 1997).

Tranter, Jason, "Operating and Using ExpertALERT for Voyager—Version 2.045," Jan. 1999, 407 pages.

Hewlett–Packard, "Data Sheet—HP 3561A Signal Analyzer," circa 1983, 3 pages.

Hewlett–Packard, "Service Manual—HP 3561A Dynamic Signal Analyzer—vol. 1," Feb. 1984, 324 pages.

Hewlett–Packard, "Service Manual—HP 3561A Dynamic Signal Analyzer—vol. 2," Feb. 1984, 272 pages.

Hewlett–Packard, "Effective Machinery Measurements using Dynamic Signal Analyzers," Dec. 1997, 88 pages.

Hewlett–Packard, "The Fundamentals of Signal Analysis," Jan. 1995, 68 pages.

Hewlett–Packard, "Hewlett–Packard Journal—vol. 35—No. 12," Dec. 1984, 38 pages.

Motorola, "Technical Data—DSP56ADC16," circa 1989, 28 pages.

Motorola, "Technical Data—DSP56ADC16," Dec. 7, 1992, 26 pages.

Cheval, Eric for Motorola, "Application Note—Logarithmic/Linear Conversion Routines for DSP56000/1," Feb. 1990, 44 pages.

Motorola, "Engineering Bulletin—Converting DSP56001—Based Designs to the DSP56002," circa 1995, 25 pages.

Motorola, "Technical Data—DSP56001 Rev. 3," May 4, 1998, 65 pages.

Motorola, "Technical Data—DSP56002," circa 1996, 111 pages.

Park, Sangil for Motorola, "Motorola Digital Signal Processors—Principles of Sigma–Delta Modulation for Analog–to–Digital Convereters," Apr. 1993, 71 pages.

Wowk, Victor, "Machinery Vibration—Measurement and Analysis," McGraw–Hill, 1991, 367 pages.

Den Hartog, J.P., "Mechanical Vibrations—$4^{th}$ Edition," Dover Publications, Inc., Jul. 1984, 465 pages.

Goldman, Steve, "Vibration Spectrum Analysis—A Practical Approach," Industrial Press Inc., 1991, 237 pages.

Vibrotek, Inc., "DREAM® for Windows Application Software—Versions 3.0, 3.1, 3.3—User's Manual," circa 2005, 185 pages.

Vibrotek, Inc., "Products—Dream For Windows," http://www.vibrotek.com/dream_win.php, accessed May 20, 2009, 13 pages.

Vibrotek, Inc., "Vibration Monitoring Condition Diagnostics—DREAM," circa 2004, 4 pages.

Tranter, Jason, "Operating and Using ExpertALERT for Voyager—Version 1.0," Jan. 1998, 285 pages.

Hamilton, Keith for Diagnostic Instruments, "DI–550/DI–1100/EMONITOR dataline/DI–225–D File Format Specification," May 17, 2009, 14 pages.

Diagnostic Instruments, "DI–1100 and DI–225–D Data Collector Communication Programming Guide—Issue 1.02," Feb. 2003, 21 pages.

Diagnostic Instruments, "DI–225–D Measurement Functional Parameters," Dec. 4, 2000, 8 pages.

Diagnostic Instruments, "DI–1100 and DI–225–D Data Collector Communication Protocols—Issue 2.02," May 2003, 92 pages.

Diagnostic Instruments, Source Code, circa 1998, 94 pages.

Fowlie, Jim for Diagnostic Instruments, "Accelerometer List and Spreadsheet," Nov. 27, 1998, 2 pages.

Diagnostic Instruments, "Optimising the operating life of the BP5 Battery—Issue 1," Jan. 1999, 3 pages.

Diagnostic Instruments, "Optimising the operating life of the BP4 Battery—Issue 1–1," Feb. 1999, 5 pages.

Diagnostic Instruments, "BP–4 & BP–5 Battery Replacement Guide," Jan. 1999, 6 pages.

Diagnostic Instruments, "BP–4 Battery Management Procedure," circa Jan. 1999, 1 page.

Howieson, Donald D. for Diagnostic Instruments, "Technical Support Note—BP–4 & ICU–1," Jan. 1999, 5 pages.

Howieson, Donald D. for Diagnostic Instruments, "Technical Support Note—BP–5 & ICU–2," Jan. 1999, 5 pages.

Fowlie, Jim for Diagnostic Instruments, "DI–1100 Hardware Block Diagram," Apr. 11, 1998, 3 pages.

Fowlie, Jim for Diagnostic Instruments, "DI–1100 Hardware Block Diagram," Oct. 24, 1998, 4 pages.

Fowlie, Jim for Diagnostic Instruments, "Build History," Feb. 19, 1999, 2 pages.

Gilmartin, Mike for Diagnostic Instruments, "Diagnostic Instruments Limited Year 2000 Compliance," 5 pages.

Diagnostic Instruments, "DI–1100—Operator's Guide," circa 1997, 95 pages.

Diagnostic Instruments, "DI–1100 IS—Operator's Guide," circa 1997, 31 pages.

Howieson, Donald D. for Diagnostic Instruments, "DI–1100 Key Features, Functions & Benefits," Dec. 14, 1998, 11 pages.

Howieson, Donald D. for Diagnostic Instruments, "Introduction to Diagnostic Instruments," Jan. 11, 1999, 14 pages.

Howieson, Donald D. for Diagnostic Instruments, "DI Service Contracts," Dec. 14, 1998, 7 pages.

Howieson, Donald D. for Diagnostic Instruments, "Overview Presentation of Diagnostic Instruments' Condition Monitoring Products Division," May 11, 1998, 67 pages.

Diagnostic Instruments, "DI–1100 DSP—Press Release / Newsbrief / Manual Changes," circa 1998, 2 pages.

Diagnostic Instruments, "IP Ratings," circa 1998, 2 pages.

Fowlie, Jim for Diagnostic Instruments, "Who has a requirement for Intrinsically Safe (IS) Equipment," Dec. 14, 1998, 16 pages.

Fowlie, Jim for Diagnostic Instruments, "IS Group Differences: Differences between DI–1100–IS–GI and DI–1100–IS–G2," Oct. 27, 1998, 1 page.

Diagnostics Instruments, "Balancing Application Manual—DI–1100 DI–Card: Operator's Guide—Issue 1.0," circa 1997, 29 pages.

Houldsworth, John for Diagnostic Instruments, "The Basics of Noise," Oct. 17, 1998, 37 pages.

Diagnostics Instruments, Excerpts from "PL302—Machine Analyser—Operating Manual (Analyser Mode)—Operator Reference Section—Revision 1.0," circa 1998, 8 pages.

Email from McGlone, John to Neely, Andy re: PL302 questions, sent Mar. 5, 1998, 1 page.

Hewlett–Packard, "1991: Test & Measurement Catalog—Signal Analyzers," circa 1990, pp. 152–156.

Technology for Energy, "The TEC Model 1330 Smart Meter Plus—Data Sheet," circa 1990, 2 pages.

ENTEK Scientific Corporation, "TEC Model 1330 Smart Meter Plus—Data Sheet," circa 1993, 2 pages.

ENTEK Scientific Corporation, Excerpts from "ENTEK Quickload—B & K Type 2526 Manual—Second Edition," circa 1993, 6 pages.

Bruel & KJ/ER, "Data Collector—Type 2526—Product Info," circa 1993, 4 pages.

Palomar Technology International, "SD Microlog—Computer–Aided Portable Monitoring System—Data Sheet," circa 1989, 6 pages.

Akhmetov, Daouren and Dote, Yasuhiko, "General Parameter Neural Networks with Fuzzy Self–Organization," Proceedings of the Artifical Neural Networks in Engineering (ANNIE 1996) Conference, vol. 6, Nov. 10–13, 1996, pp. 191–196.

Lindgaard, Gitte, "Human performance in fault diagnosis: can expert systems help?," Interacting with Computers, vol. 7, No. 3, Sep. 1995—Elsevier Science Ltd B.V, pp. 254–272.

Hall, Gardiner A., Schuetzle, Jaesm, LaVallee, David, and Gupta, Uday, "An Architecture for the Development of Real–Time Fault Diagnosis Systems Using Model–Based Reasoning," Telematics and Informatics, vol. 9, Nos. 3/4, Summer/Fall 1992, Pergamon Press Ltd., pp. 163–172.

Benkhedda, Hassen and Patton, Ron J., "Fault Diagnosis Using Quantitative and Qualitative Knowledge Integration," IEE Conference Publication, No. 427/2, circa 1996, pp. 849–854.

Garga, Amulya, "A Hybrid Implicit/Explicit Automated Reasoning Approach for Condition–Based Maintenance," ASNE Intelligent Ships Symposium II, Nov. 25–26, 1996, pp. 393–405.

Bavishi, Sanjiv and Chong, Edwin K.P., "Automated Fault Diagnosis Using a Discrete Event Systems Framework," IEEE International Symposium on Intelligent Control, Aug. 16–18, 1994, pp. 213–218.

Acosta, G., Alonso, C., Acebes, L., Sanchez, A., and De Prada, C., "Knowledge Based Diagnosis: Dealing with Fault Modes and Temporal Constraints," IECON Proceedings (Industrial Electronics Conference) vol. 2, circa 1994, pp. 1419–1424.

Bernieri, Andrea, Betta, Giovanni, and Liguori, Consolatina, "On–Line Fault Detection and Diagnosis Obtained by Implementing Neural Algorithms on a Digital Signal Processor," IEEE Transactions on Instrumentation and Measurement, vol. 45, No. 5, Oct. 1996, pp. 894–898.

Bazu, Marius, "A Combined Fuzzy–Logic & Physics–of–Failure Approach to Reliability Prediction," IEEE Transactions on Reliability, vol. 44, No. 2, Jun. 1995, p. 237.

Chang, Liung, "Object–Oriented Expert Systems for Fault Diagnosis," Proceedings of the IEEE Conference on Systems, Man, and Cybernetics, vol. 5, circa 1993, pp. 102–107.

Dash, P. K. and Rauta, S., "A New Approach to Estimation of Signal Components for Fault Detection," Journal of Institution Electronics and Telecommunications Engineers, vol. 42, No. 1, Jan.–Feb. 1996, pp. 21–26.

Fax from Yun, Jason to Gay, Cathy re: Product Specification—Model: UG–32F01–SEBT5–B, Mar. 17, 1994, 29 pages.

Randall, R.B., "Frequency Analysis—$3^{rd}$ Edition," Sep. 1987, pp. 165–172.

Thompson, Charles D. for Motorola, "A VLSI Sigma Delta A/D Converter for Audio and Signal Processing Applications," circa 1989, pp. 2569–2572.

Pichler, M. and Tranter, Jason, "Computer Based Techniques for Predictive Maintenance of Rotating Machinery," EEC (Electric Energy Conference), Oct. 6–9, 1987, pp. 216–226.

DLI Engineering Corporation, "ExpertALERT—Expert Automated Diagnostic System: Operating Manual," circa 1992, 290 pages.

DLI Engineering Corporation, "Reference Manual—AdvancedALERT™ Predictive Maintenance System—Version 6.18," Jul. 1993, 570 pages.

Analog Devices, "Application Note (AN–283)—Sigma–Delta ADCs and DACs," circa 1991, 16 pages.

Tranter, Jason, "Operating and Using Voyager—Version 1.03," Jun. 1999, 267 pages.

Tranter, Jason, "Operating and Using ExpertALERT for Voyager—Version 2.5," Jun. 2001, 450 pages.

Computational Systems, Inc., "Autostat—Automated Statistical Limits—User's Manual," Jun. 1997, 98 pages.

Technical Associated of Charlotte, Inc., "Installation & Instruction Booklet for BandAID Software," circa 1993, 36 pages.

Hewlett–Packard, "Model 3561A Dynamic Signal Analyzer—Operating Manual," circa 1983, 212 pages.

Linear Technology, "LTC1293/LTC1294?LTC1296—Single Chip 12–Bit Data Acquisition System Data Sheet," circa 1992, 28 pages.

Computational Systems, Inc., "Machine Component and Configuration Handbook—Guide to Configuring Machines and Components for Nspectr," circa 1997, 251 pages.

Computational Systems, Inc., "MasterTrend for Windows—User's Manual," Mar. 1997, 400 pages.

Computational Systems, Inc., "Model 2115—Machinery Analyzer—User's Manual" circa 1993, 196 pages.

Diagnostic Rolling Element Analysis Module (DREAM) for Window 95, Version 1.0, User's Manual, Copyright © 1997 VAST, Inc.

Expert Alert, Version 8.0, User's Guide, © Copyright 1997 Predict.

US 6,192,325 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6 and 8 are determined to be patentable as amended.

New claims 52-65 are added and determined to be patentable.

Claims 1-5, 7 and 9-51 were not reexamined.

6. A method for establishing a predictive maintenance database in a computer that defines information needed to monitor components in accordance with a predictive maintenance plan, comprising:
  identifying a component type corresponding to a particular component to be monitored;
  identifying physical characteristics information corresponding to the identified component type and the particular component to be monitored;
  providing a knowledge base in the computer that defines relationships between monitoring practices, component types and physical characteristics information for component types;
  providing an inference engine in the computer for operating in part on said knowledge base to construct predictive maintenance databases; and
  constructing information for a predictive maintenance database for each component to be monitored using the inference engine operating on the knowledge base, the selected component type and the selected physical characteristic information,
  *wherein the physical characteristic information includes a turning speed associated with the component to be monitored, and*
  *wherein the inference engine constructs in the predictive maintenance database a plurality of vibration frequency parameter bands to be trended for a measurement point on the component to be monitored,*
  *wherein the frequencies included within each of the parameter bands are determined by the inference engine based at least in part on the component type and the physical characteristic information of the component to be monitored including the turning speed.*

8. [The method of claim 6] *A method for establishing a predictive maintenance database in a computer that defines information needed to monitor components in accordance with a predictive maintenance plan, comprising:*
  *identifying a component type corresponding to a particular component to be monitored;*
  *identifying physical characteristic information corresponding to the identified component type and the particular component to be monitored;*
  *providing a knowledge base in the computer that defines relationships between monitoring practices, component types and physical characteristic information for component types;*
  *providing an inference engine in the computer for operating in part on said knowledge base to construct predictive maintenance databases;*
  *constructing information for a predictive maintenance database for each component to be monitored using the inference engine operating on the knowledge base, the selected component type and the selected physical characteristic information; and*
  wherein said controlling step further comprises defining an analysis parameter set including set-ep parameters for use by a data collection instrument to collect data in accordance with the predictive maintenance database.

*52. The method of claim 8 wherein the analysis parameter set and its parameter bands are associated in the predictive maintenance database with an alarm limit set containing alarm limits corresponding to the parameter bands of the analysis parameter set.*

*53. The method of claim 8 wherein the physical characteristic information includes a turning speed associated with the component to be monitored, and wherein parameter bands of the analysis parameter set defined in the predictive maintenance database by the inference engine include frequencies determined by the inference engine based at least in part on the turning speed associated with the component to be monitored.*

*54. The method of claim 53 wherein the parameter bands include a first parameter band and a second parameter band, the frequencies of the second parameter band being different than the frequencies of the first parameter band, wherein the frequencies of the first parameter band include the turning speed associated with the component to be monitored and the frequencies of the second parameter band include a multiple of the turning speed associated with the component to be monitored.*

*55. The method of claim 53 wherein for each of the parameter bands the inference engine defines in the predictive maintenance database at least one alarm limit.*

*56. The method of claim 53 wherein at least one of the parameter bands defines a frequency interval that includes a plurality of multiples of the turning speed associated with the component to be monitored.*

*57. The method of claim 56 wherein the at least one of the parameter bands includes the frequencies of three times the turning speed associated with the component to be monitored, four times the turning speed associated with the component to be monitored, five times the turning speed associated with the component to be monitored, six times the turning speed associated with the component to be monitored, seven times the turning speed associated with the component to be monitored, and eight times the turning speed associated with the component to be monitored.*

*58. The method of claim 53 further comprising trending, in the predictive maintenance database, for each of a plurality of parameter bands, a value representing an amplitude of a corresponding parameter band.*

*59. The method of claim 53 further comprising trending, in the predictive maintenance database, for each of a plurality of parameter bands, a value representing an integrated energy of a corresponding parameter band.*

*60. The method of claim 6 wherein the plurality of parameter bands include at least one parameter band that defines a frequency interval around the turning speed.*

*61. The method of claim 6 wherein the plurality of parameter bands includes a first parameter band and a second*

*parameter band, the frequencies of the second parameter band being different than the frequencies of the first parameter band, wherein the frequencies of the first parameter band include the turning speed associated with the component to be monitored and the frequencies of the second parameter band include a multiple of the turning speed associated with the component to be monitored.*

*62. The method of claim 6 wherein for each of the parameter bands the inference engine defines in the predictive maintenance database at least one alarm limit.*

*63. The method of claim 6 wherein the physical characteristic information includes at least one of a number of phases, a number of poles, a number of rotor bars, a number of stator slots, and a line frequency of the component to be monitored, and wherein the frequencies included within at least one of the parameter bands are determined by the inference engine based at least in part on the at least one of the number of phases, the number of poles, the number of rotor bars, the number of stator slots, and the line frequency.*

*64. The method of claim 6 further comprising trending, in the predictive maintenance database, for each of a plurality of parameter bands, a value representing an amplitude of a corresponding parameter band.*

*65. The method of claim 6 further comprising trending, in the predictive maintenance database, for each of a plurality of parameter bands, a value representing an integrated energy of a corresponding parameter band.*

\* \* \* \* \*